US012511346B2

(12) United States Patent
Shaaban et al.

(10) Patent No.: US 12,511,346 B2
(45) Date of Patent: Dec. 30, 2025

(54) SYSTEMS AND METHODS FOR ENABLING RELEVANT DATA TO BE EXTRACTED FROM A PLURALITY OF DOCUMENTS

(71) Applicant: Fulcrum Global Technologies Inc., Chicago, IL (US)

(72) Inventors: Ahmed Farouk Shaaban, South Barrington, IL (US); Venkat Thandra, South Barrington, IL (US); Dino Eliopulos, South Barrington, IL (US); Andrew Kenneth Blazaitis, Rochester, MN (US); Kennedy Muthukrishnan, South Barrington, IL (US)

(73) Assignee: Fulcrum Global Technologies Inc., Chicago, IL (US)

( * ) Notice: Subject to any disclaimer, the term of this patent is extended or adjusted under 35 U.S.C. 154(b) by 597 days.

(21) Appl. No.: 17/501,681

(22) Filed: Oct. 14, 2021

(65) Prior Publication Data

US 2022/0121881 A1 Apr. 21, 2022

Related U.S. Application Data

(60) Provisional application No. 63/093,425, filed on Oct. 19, 2020.

(51) Int. Cl.

*G06K 9/00* (2022.01)
*G06F 16/93* (2019.01)

(Continued)

(52) U.S. Cl.

CPC .......... *G06F 18/2148* (2023.01); *G06F 16/93* (2019.01); *G06V 30/19173* (2022.01); *G06V 30/414* (2022.01); *G06V 30/10* (2022.01)

(58) Field of Classification Search

CPC .. G06F 18/2148; G06F 16/254; G06F 40/263; G06F 16/93; G06F 16/353;

(Continued)

(56) References Cited

U.S. PATENT DOCUMENTS 6,597,808 B1 * 7/2003 Guo .................. G06V 30/1444 382/173
10,796,383 B2 10/2020 Shaaban et al.

(Continued)

FOREIGN PATENT DOCUMENTS

CN 110427488 A * 11/2019 ............ G06F 16/35
WO 2016004123 A1 1/2016

(Continued)

OTHER PUBLICATIONS

Zheng, L., Wang, S., Guo, P., Liang, H., & Tian, Q. (2015). Tensor index for large scale image retrieval. Multimedia Systems, 21, 569-579. (Year: 2015).*

(Continued)

*Primary Examiner* — Gregory A Morse
*Assistant Examiner* — Kevin M Coomber
(74) *Attorney, Agent, or Firm* — Global IP Counselors, LLP

(57) ABSTRACT

Systems and methods for enabling target data to be extracted from documents are disclosed herein. In an embodiment, a method of enabling target data to be extracted from documents includes accessing a database including a plurality of documents including target data, for each of multiple of the documents, creating a region tensor based on extracted text including the target data, for each of the multiple of the documents, creating a label tensor based on an area including the target data, and using the region tensor and the label tensor, training an extraction algorithm to extract the target data from additional documents.

17 Claims, 45 Drawing Sheets

(51) Int. Cl.

| | |
|---|---|
| ***G06F 18/214*** | (2023.01) |
| ***G06V 30/19*** | (2022.01) |
| ***G06V 30/414*** | (2022.01) |
| *G06V 30/10* | (2022.01) |

(58) Field of Classification Search

CPC ............. G06V 30/414; G06V 30/1444; G06V 30/1448; G06V 30/1452; G06V 30/412; G06V 30/10; G06V 30/40; G06V 10/82; G06V 30/19173

See application file for complete search history.

(56) References Cited

U.S. PATENT DOCUMENTS

| | | | | |
|---|---|---|---|---|
| 10,896,470 | B2 | 1/2021 | Shaaban et al. | |
| 11,138,566 | B2 | 10/2021 | Shaaban et al. | |
| 11,144,583 | B2 | 10/2021 | Shaaban et al. | |
| 2003/0177000 | A1 | 9/2003 | Mao et al. | |
| 2011/0255782 | A1* | 10/2011 | Welling | G06V 30/262 382/173 |
| 2012/0330977 | A1 | 12/2012 | Inagaki | |
| 2016/0125511 | A1 | 5/2016 | Shaaban et al. | |
| 2016/0140528 | A1 | 5/2016 | Shaaban et al. | |
| 2016/0203530 | A1 | 7/2016 | Shaaban et al. | |
| 2016/0210572 | A1 | 7/2016 | Shaaban et al. | |
| 2017/0004550 | A1 | 1/2017 | Shaaban et al. | |
| 2017/0109834 | A1 | 4/2017 | Shaaban et al. | |
| 2019/0066057 | A1 | 2/2019 | Shaaban et al. | |
| 2019/0156385 | A1 | 5/2019 | Shaaban et al. | |
| 2019/0279161 | A1 | 9/2019 | Shaaban et al. | |
| 2019/0279179 | A1 | 9/2019 | Shaaban et al. | |
| 2021/0012290 | A1 | 1/2021 | Shaaban et al. | |
| 2021/0042378 | A1 | 2/2021 | Shaaban et al. | |
| 2021/0043100 | A1 | 2/2021 | Shaaban et al. | |
| 2021/0049535 | A1 | 2/2021 | Shaaban et al. | |
| 2021/0049714 | A1 | 2/2021 | Shaaban et al. | |
| 2021/0075615 | A1 | 3/2021 | Shaaban et al. | |
| 2021/0100375 | A1 | 4/2021 | Shaaban et al. | |
| 2021/0201018 | A1* | 7/2021 | Patel | G06F 18/22 |
| 2021/0319039 | A1* | 10/2021 | Gerber, Jr. | G06F 16/31 |
| 2022/0121881 | A1 | 4/2022 | Shaaban et al. | |

FOREIGN PATENT DOCUMENTS

| | | | |
|---|---|---|---|
| WO | 2016004126 | A1 | 1/2016 |
| WO | 2016004127 | A1 | 1/2016 |
| WO | 2016004128 | A1 | 1/2016 |
| WO | 2016004129 | A1 | 1/2016 |
| WO | 2016004132 | A1 | 1/2016 |
| WO | 2016004133 | A1 | 1/2016 |
| WO | 2016004135 | A1 | 1/2016 |
| WO | 2016004138 | A2 | 1/2016 |
| WO | 2016004445 | A1 | 1/2016 |
| WO | 2016007334 | A1 | 1/2016 |
| WO | 2016018632 | A1 | 2/2016 |
| WO | 2016029194 | A1 | 2/2016 |
| WO | 2018045126 | A1 | 3/2018 |
| WO | 2019036310 | A1 | 2/2019 |
| WO | 2022086813 | A1 | 4/2022 |

OTHER PUBLICATIONS

Majumder, B. P., Potti, N., Tata, S., Wendt, J. B., Zhao, Q., & Najork, M. (Jul. 2020). Representation learning for information extraction from form-like documents. In proceedings of the 58th annual meeting of the Association for Computational Linguistics (pp. 6495-6504). (Year: 2020).*

Paliwal, S. S., Vishwanath, D., Rahul, R., Sharma, M., & Vig, L. (Sep. 2019). Tablenet: Deep learning model for end-to-end table detection and tabular data extraction from scanned document images. In 2019 international conference on document analysis and recognition (ICDAR) (pp. 128-133). IEEE. (Year: 2019).*

Rashid, S. F., Akmal, A., Adnan, M., Aslam, A. A., & Dengel, A. (Nov. 2017). Table recognition in heterogeneous documents using machine learning. In 2017 14th IAPR International conference on document analysis and recognition (ICDAR) (vol. 1, pp. 777-782). IEEE. (Year: 2017).*

A Search Report in the corresponding International Patent Application No. PCT/US21/55198, dated Jan. 25, 2022.

An extended European Search Report in the corresponding European Patent Application No. 21883603.9, dated Oct. 22, 2024.

Jin Xiongnan Wnkim@ICL Yonsei AC KR et al: "Learning Region Similarity over Spatial Knowledge Graphs with Hierarchical Types and Semantic Relations", Proceedings of the 28th ACM Joint Meeting on European Software Engineering Conference and Symposium on the Foundations of Software Engineering, ACM, New York, NY, USA, Nov. 3, 2019 (Nov. 3, 2019), pp. 669-678, XP058639891.

Cui Yuba et al: 11 3D Object Tracking with Transformer, Oct. 28, 2021 (Oct. 28, 2021), XP093210277, Retrieved from the Internet: URL:https://arxiv.org/pdf/2110.14921.

* cited by examiner

B 10 (Official form)(04/13)

| UNITED STATES BANKRUPTCY COURT DISTRICT OF MASSACHUSETTS | | PROOF OF CLAIM |
|---|---|---|
| B 10 (Official form)(04/13) | Case Number: 15-12119 | COURT USE ONLY |
| NOTE: Do not use this form to make a claim for an administrative expense that arises after the bankruptcy filing. You may file a request for payment of an administrative expense according to 11 U.S.C § 503. | | |
| Name of Creditor (the person or other entity to whom the debtor owes money or property):<br>JPMorgan Chase Bank, National Association | | |
| Name and address where notices should be sent:<br>Chase Records Center<br>Attn: Correspondence Mail<br>Mail Code LA4-5555, 700 Kansas Lane<br>Monroe, Louisiana 71203<br>Telephone # 1-866-243-5851 | | ☐ Check this box if this claim amends a previously filed claim.<br>Court Claim Number:_________<br>(If known)<br>Filed on:_________ |
| Name and address where payment should be sent (if different from above):<br>JPMorgan Chase Bank, N.A.<br>3415 Vision Drive<br>OH4-7142<br>Columbus, Ohio 43219 | | ☐ Check this box if you are aware that anyone else has filed a proof of claim relating to this claim. Attach copy of statement giving particulars. |

1. Amount of Claim as of Date Case Filed: $365,315.99
If all or part of the claim is secured, complete item 4.
If all or part of the claim is entitled to priority, complete item 5.
☒ Check this box if the claim includes interest or other charges in addition to the principal amount of the claim. Attach a statement that itemizes interest or charges.

2. Basis for Claims: Money Loaned
(See instruction #2)

| 3. Last four digits of any number by which creditor identifies debtor: 0595 | 3a. Debtor may have scheduled account as:<br>__________<br>(See instruction #3a) | 3b. Uniform Claim Identifier (optional):<br>__________<br>(See instruction #3b) |
|---|---|---|

| 4. Secured Claim (See instruction #4)<br>Check the appropriate box if the claim is secured by a lien on property or a right of setoff, attach required redacted documents, and provide the requested information. | Amount of arrearage and other charges, as of the time case was filed, included in secured claim, if any: $3,428.49 |
|---|---|
| Nature of property or right of setoff: ☒ Real Estate ☐ Motor Vehicle ☐ Other<br>Describe: 4054 Washington Street, Roslindale, MA 02131 | Basis for perfection: Recorded Mortgage |
| Value of Property:$________ | Amount of Secured Claim: $365,315.99 |
| Annual Interest Rate 6.75% ☒ Fixed or ☐ Variable (when case was filed) | Amount Unsecured: $______ |

5. Amount of Claim Entitled to Priority under 11 U.S.C § 507(a). If any part of the claim falls into one of the following categories, check the box specifying the priority and state the amount.

| | | |
|---|---|---|
| ☐ Domestic support obligations under 11 U.S.C § 507(a)(1)(A) or (a)(1)(B) | ☐ Wages, salaries, or commissions (up to $12,475*) earned within 180 days before the case was filed or the debtor's business ceased, whichever is earlier - 11 U.S.C § 507(a)(4) | ☐ Contributions to employee benefit plan 11 U.S.C § 507(a)(5)<br>Amount entitled to priority:<br>$__________ |
| ☐ Up to $2,775* of deposits toward purchase, lease, or rental of property or services for personal, family, or household use - 11 U.S.C § 507(a)(7) | ☐ Taxes or penalties owed to governmental units - 11 U.S.C § 507(a)(8) | ☐ Other - Specify applicable paragraph of§ 11 U.S.C § 507(a)(__) |

* Amounts are subject to adjustment on 4/1/16 and every 3 years thereafter with respect to cases commenced on or after the date of adjustment.

6. Credits. The amount of all payments on this claim has been credited for the purpose of making this proof of claim. (See instruction #6)

34

FIG. 9A

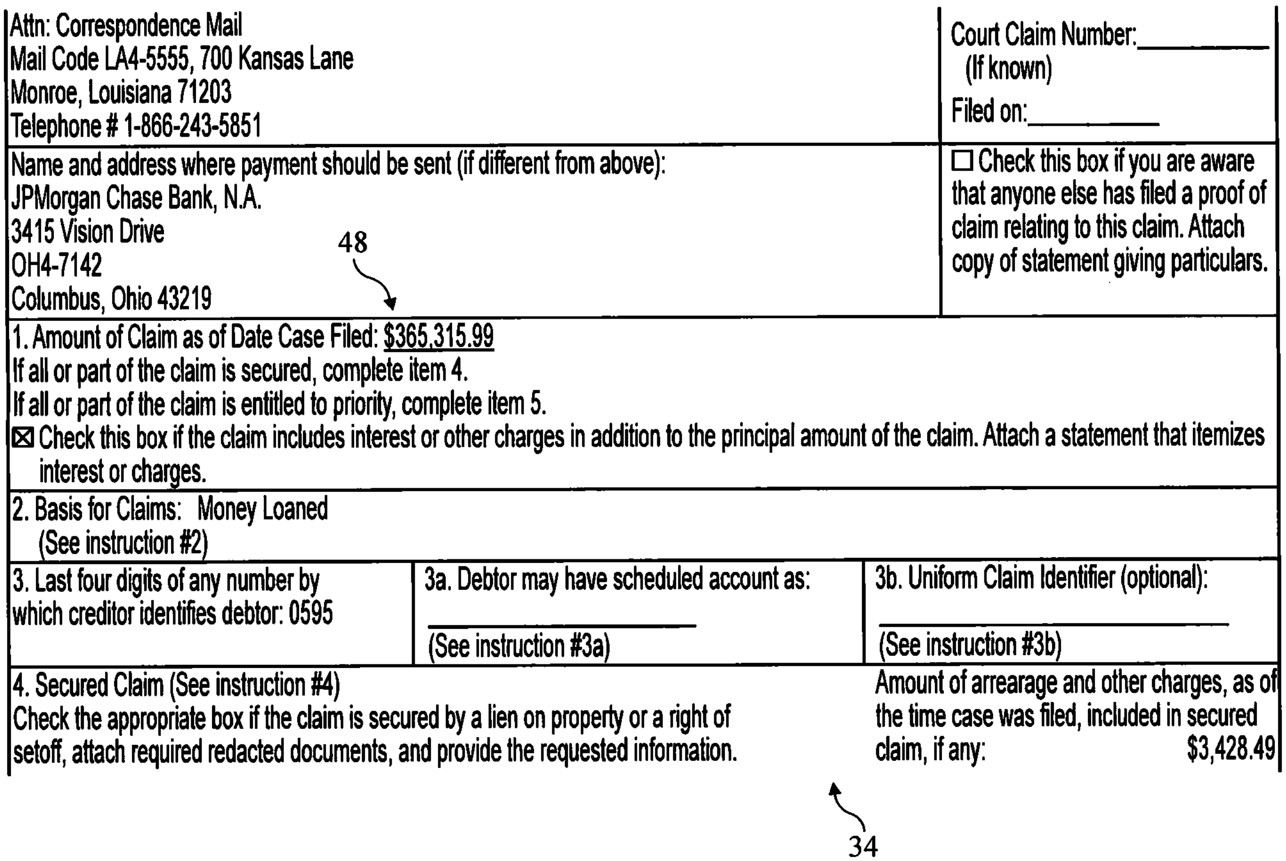

Attn: Correspondence Mail
Mail Code LA4-5555, 700 Kansas Lane
Monroe, Louisiana 71203
Telephone # 1-866-243-5851

Court Claim Number:________
(If known)
Filed on:________

Name and address where payment should be sent (if different from above):
JPMorgan Chase Bank, N.A.
3415 Vision Drive
OH4-7142
Columbus, Ohio 43219

☐ Check this box if you are aware that anyone else has filed a proof of claim relating to this claim. Attach copy of statement giving particulars.

48

1. Amount of Claim as of Date Case Filed: $365,315.99
If all or part of the claim is secured, complete item 4.
If all or part of the claim is entitled to priority, complete item 5.
☒ Check this box if the claim includes interest or other charges in addition to the principal amount of the claim. Attach a statement that itemizes interest or charges.

2. Basis for Claims: Money Loaned
(See instruction #2)

3. Last four digits of any number by which creditor identifies debtor: 0595

3a. Debtor may have scheduled account as:
________
(See instruction #3a)

3b. Uniform Claim Identifier (optional):
________
(See instruction #3b)

4. Secured Claim (See instruction #4)
Check the appropriate box if the claim is secured by a lien on property or a right of setoff, attach required redacted documents, and provide the requested information.

Amount of arrearage and other charges, as of the time case was filed, included in secured claim, if any: $3,428.49

34

FIG. 9B

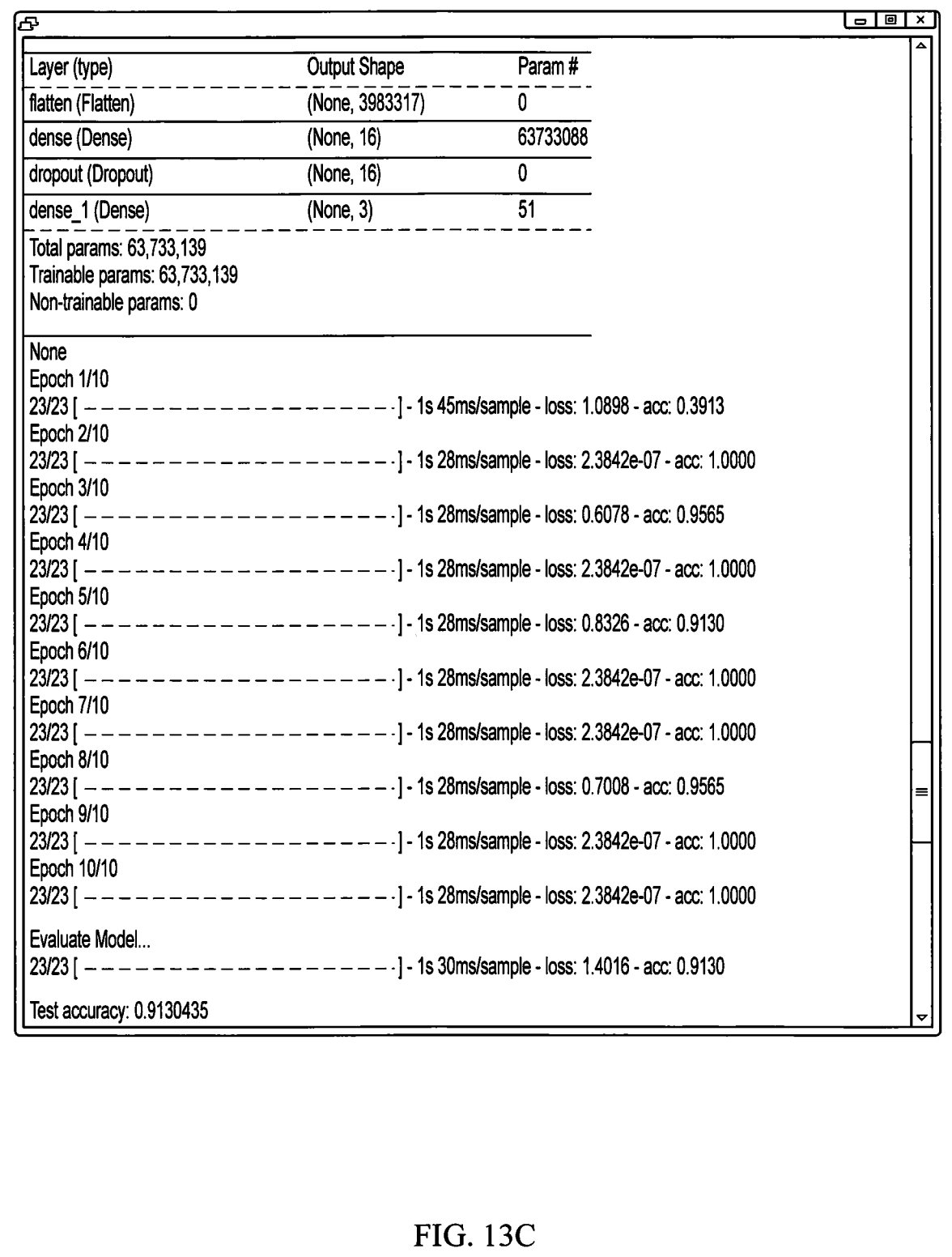

| Layer (type) | Output Shape | Param # |
| --- | --- | --- |
| flatten (Flatten) | (None, 3983317) | 0 |
| dense (Dense) | (None, 16) | 63733088 |
| dropout (Dropout) | (None, 16) | 0 |
| dense_1 (Dense) | (None, 3) | 51 |

```
Total params: 63,733,139
Trainable params: 63,733,139
Non-trainable params: 0

None
Epoch 1/10
23/23 [--------------------] - 1s 45ms/sample - loss: 1.0898 - acc: 0.3913
Epoch 2/10
23/23 [--------------------] - 1s 28ms/sample - loss: 2.3842e-07 - acc: 1.0000
Epoch 3/10
23/23 [--------------------] - 1s 28ms/sample - loss: 0.6078 - acc: 0.9565
Epoch 4/10
23/23 [--------------------] - 1s 28ms/sample - loss: 2.3842e-07 - acc: 1.0000
Epoch 5/10
23/23 [--------------------] - 1s 28ms/sample - loss: 0.8326 - acc: 0.9130
Epoch 6/10
23/23 [--------------------] - 1s 28ms/sample - loss: 2.3842e-07 - acc: 1.0000
Epoch 7/10
23/23 [--------------------] - 1s 28ms/sample - loss: 2.3842e-07 - acc: 1.0000
Epoch 8/10
23/23 [--------------------] - 1s 28ms/sample - loss: 0.7008 - acc: 0.9565
Epoch 9/10
23/23 [--------------------] - 1s 28ms/sample - loss: 2.3842e-07 - acc: 1.0000
Epoch 10/10
23/23 [--------------------] - 1s 28ms/sample - loss: 2.3842e-07 - acc: 1.0000

Evaluate Model...
23/23 [--------------------] - 1s 30ms/sample - loss: 1.4016 - acc: 0.9130

Test accuracy: 0.9130435
```

FIG. 13C

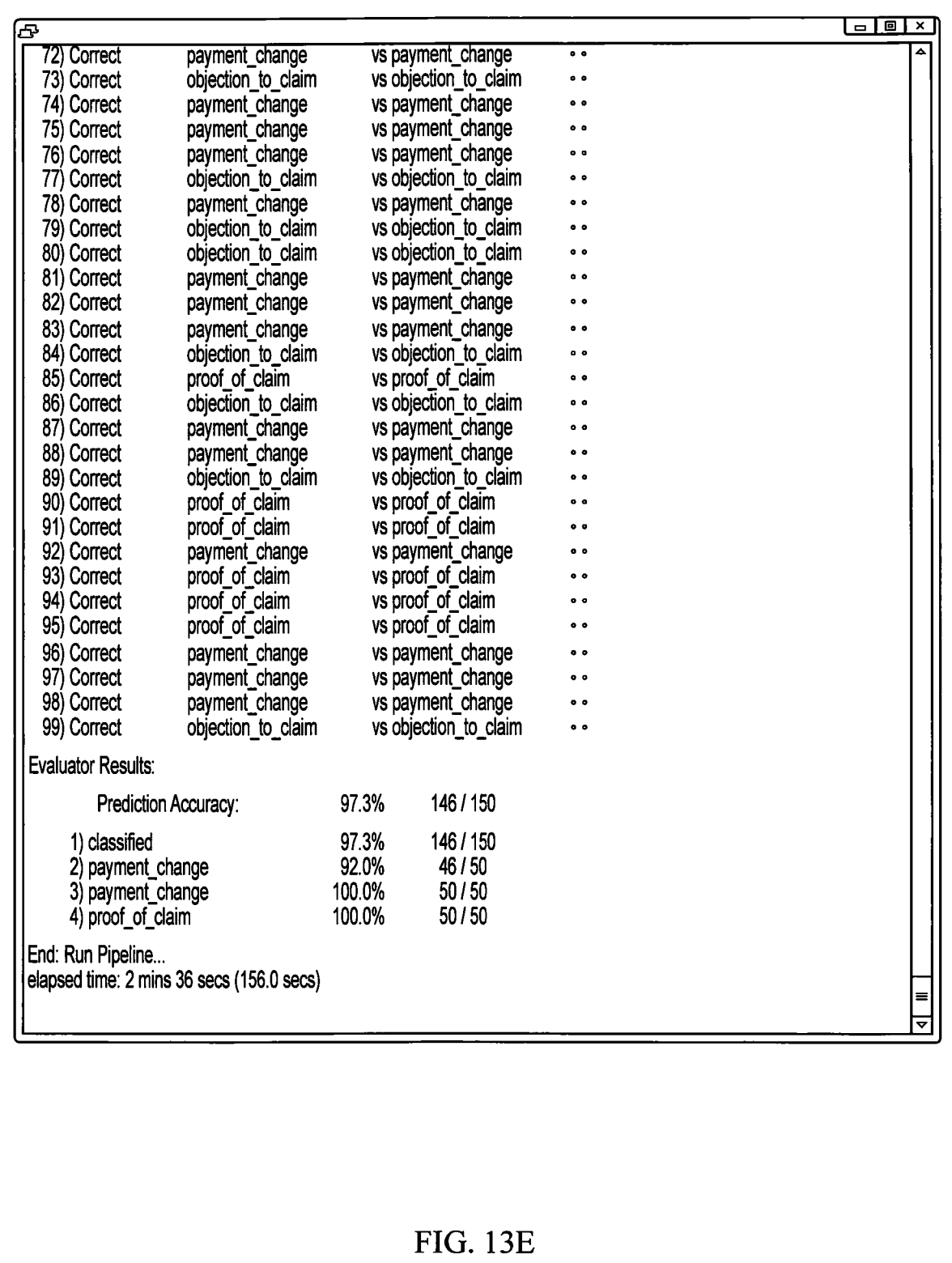

| | | | |
|---|---|---|---|
| 72) Correct | payment_change | vs payment_change | ◦ ◦ |
| 73) Correct | objection_to_claim | vs objection_to_claim | ◦ ◦ |
| 74) Correct | payment_change | vs payment_change | ◦ ◦ |
| 75) Correct | payment_change | vs payment_change | ◦ ◦ |
| 76) Correct | payment_change | vs payment_change | ◦ ◦ |
| 77) Correct | objection_to_claim | vs objection_to_claim | ◦ ◦ |
| 78) Correct | payment_change | vs payment_change | ◦ ◦ |
| 79) Correct | objection_to_claim | vs objection_to_claim | ◦ ◦ |
| 80) Correct | objection_to_claim | vs objection_to_claim | ◦ ◦ |
| 81) Correct | payment_change | vs payment_change | ◦ ◦ |
| 82) Correct | payment_change | vs payment_change | ◦ ◦ |
| 83) Correct | payment_change | vs payment_change | ◦ ◦ |
| 84) Correct | objection_to_claim | vs objection_to_claim | ◦ ◦ |
| 85) Correct | proof_of_claim | vs proof_of_claim | ◦ ◦ |
| 86) Correct | objection_to_claim | vs objection_to_claim | ◦ ◦ |
| 87) Correct | payment_change | vs payment_change | ◦ ◦ |
| 88) Correct | payment_change | vs payment_change | ◦ ◦ |
| 89) Correct | objection_to_claim | vs objection_to_claim | ◦ ◦ |
| 90) Correct | proof_of_claim | vs proof_of_claim | ◦ ◦ |
| 91) Correct | proof_of_claim | vs proof_of_claim | ◦ ◦ |
| 92) Correct | payment_change | vs payment_change | ◦ ◦ |
| 93) Correct | proof_of_claim | vs proof_of_claim | ◦ ◦ |
| 94) Correct | proof_of_claim | vs proof_of_claim | ◦ ◦ |
| 95) Correct | proof_of_claim | vs proof_of_claim | ◦ ◦ |
| 96) Correct | payment_change | vs payment_change | ◦ ◦ |
| 97) Correct | payment_change | vs payment_change | ◦ ◦ |
| 98) Correct | payment_change | vs payment_change | ◦ ◦ |
| 99) Correct | objection_to_claim | vs objection_to_claim | ◦ ◦ |

Evaluator Results:

| | | |
|---|---|---|
| Prediction Accuracy: | 97.3% | 146 / 150 |
| 1) classified | 97.3% | 146 / 150 |
| 2) payment_change | 92.0% | 46 / 50 |
| 3) payment_change | 100.0% | 50 / 50 |
| 4) proof_of_claim | 100.0% | 50 / 50 |

End: Run Pipeline...
elapsed time: 2 mins 36 secs (156.0 secs)

FIG. 13E

| Layer (type) | Output Shape | Param # |
|---|---|---|
| conv2d (Conv2D) | (None, 196, 796, 8) | 208 |
| max_pooling2d (Max_pooling2D) | (None, 98, 398, 8) | 0 |
| conv2d_1 (Conv2D) | (None, 94, 394, 16) | 3216 |
| max_pooling2d_1 (MaxPooling2 | (None, 47, 197, 16) | 0 |
| flatten (Flatten) | (None, 148144) | 0 |
| dense (Dense) | (None, 256) | 37925120 |
| dense_1 (Dense) | (None, 13) | 3341 |

Total params: 37,931,885
Trainable params: 37,931,885
Non-trainable params: 0

```
None
Compile Model...
Fit Model...
Epoch 1/20...
650-650 [ ------------------- ] - 4s 6ms/sample - loss: 1.7030 - acc: 0.6923
Epoch 2/20
650-650 [ ------------------- ] - 1s 2ms/sample - loss: 0.1145 - acc: 0.9769
Epoch 3/20
650-650 [ ------------------- ] - 1s 2ms/sample - loss: 0.0151 - acc: 0.9954
Epoch 4/20
650-650 [ ------------------- ] - 1s 2ms/sample - loss: 0019 - acc: 1.0000
Epoch 5/20
650-650 [ ------------------- ] - 1s 2ms/sample - loss: 5.4380e-04 - acc: 1.0000
Epoch 6/20
650-650 [ ------------------- ] - 1s 2ms/sample - loss: 3.1409e-04 - acc: 1.0000
Epoch 7/20
650-650 [ ------------------- ] - 1s 2ms/sample - loss: 2.2365e-04 - acc: 1.0000
Epoch 8/20
650-650 [ ------------------- ] - 1s 2ms/sample - loss: 1.7760e-04 - acc: 1.0000
Epoch 9/20
650-650 [ ------------------- ] - 1s 2ms/sample - loss: 1.4547e-04 - acc: 1.0000
```

FIG. 13F

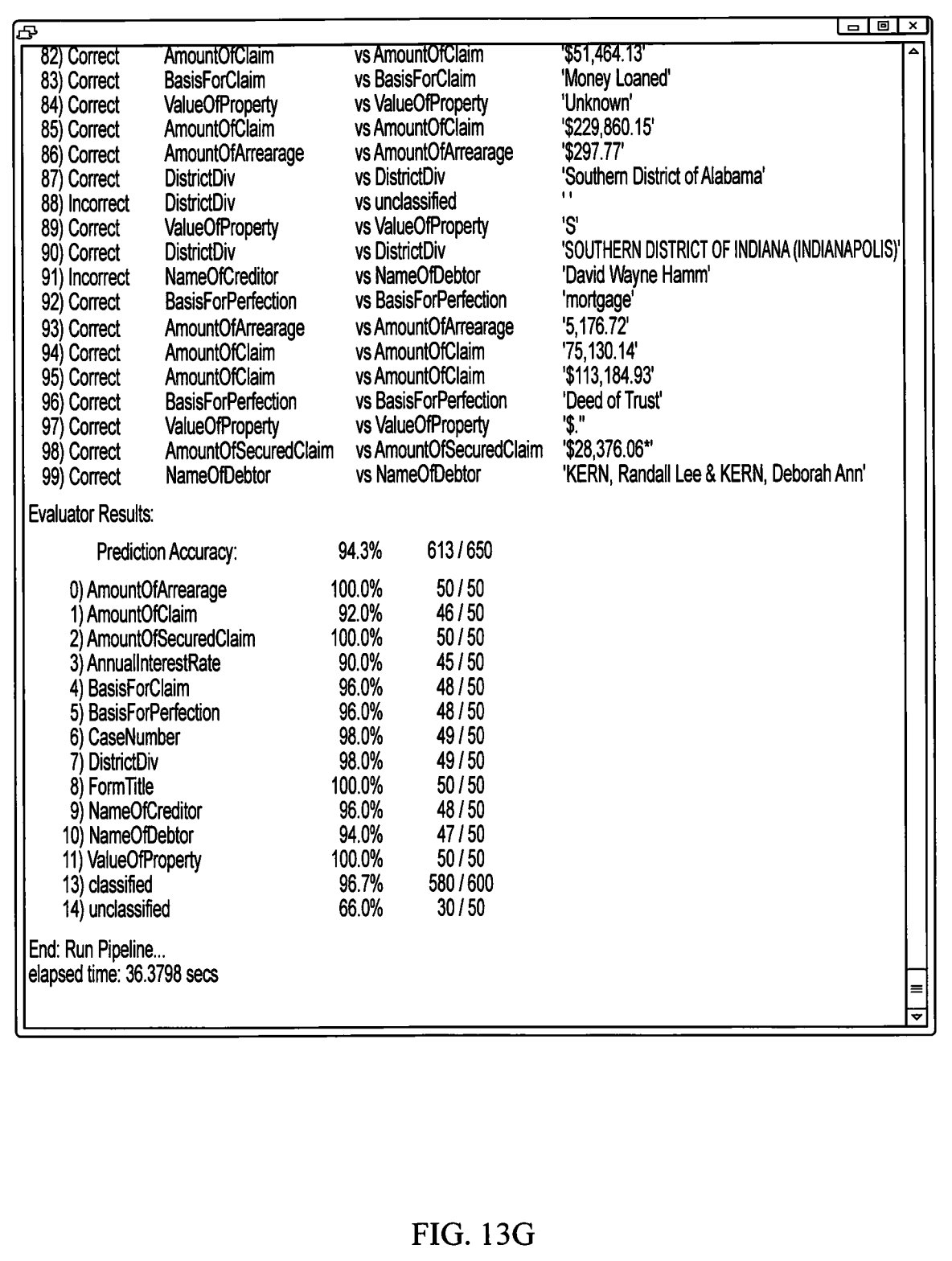

| | | | |
|---|---|---|---|
| 82) Correct | AmountOfClaim | vs AmountOfClaim | '$51,464.13' |
| 83) Correct | BasisForClaim | vs BasisForClaim | 'Money Loaned' |
| 84) Correct | ValueOfProperty | vs ValueOfProperty | 'Unknown' |
| 85) Correct | AmountOfClaim | vs AmountOfClaim | '$229,860.15' |
| 86) Correct | AmountOfArrearage | vs AmountOfArrearage | '$297.77' |
| 87) Correct | DistrictDiv | vs DistrictDiv | 'Southern District of Alabama' |
| 88) Incorrect | DistrictDiv | vs unclassified | ' ' |
| 89) Correct | ValueOfProperty | vs ValueOfProperty | 'S' |
| 90) Correct | DistrictDiv | vs DistrictDiv | 'SOUTHERN DISTRICT OF INDIANA (INDIANAPOLIS)' |
| 91) Incorrect | NameOfCreditor | vs NameOfDebtor | 'David Wayne Hamm' |
| 92) Correct | BasisForPerfection | vs BasisForPerfection | 'mortgage' |
| 93) Correct | AmountOfArrearage | vs AmountOfArrearage | '5,176.72' |
| 94) Correct | AmountOfClaim | vs AmountOfClaim | '75,130.14' |
| 95) Correct | AmountOfClaim | vs AmountOfClaim | '$113,184.93' |
| 96) Correct | BasisForPerfection | vs BasisForPerfection | 'Deed of Trust' |
| 97) Correct | ValueOfProperty | vs ValueOfProperty | '$." |
| 98) Correct | AmountOfSecuredClaim | vs AmountOfSecuredClaim | '$28,376.06*' |
| 99) Correct | NameOfDebtor | vs NameOfDebtor | 'KERN, Randall Lee & KERN, Deborah Ann' |

Evaluator Results:

| | | |
|---|---|---|
| Prediction Accuracy: | 94.3% | 613 / 650 |
| 0) AmountOfArrearage | 100.0% | 50 / 50 |
| 1) AmountOfClaim | 92.0% | 46 / 50 |
| 2) AmountOfSecuredClaim | 100.0% | 50 / 50 |
| 3) AnnualInterestRate | 90.0% | 45 / 50 |
| 4) BasisForClaim | 96.0% | 48 / 50 |
| 5) BasisForPerfection | 96.0% | 48 / 50 |
| 6) CaseNumber | 98.0% | 49 / 50 |
| 7) DistrictDiv | 98.0% | 49 / 50 |
| 8) FormTitle | 100.0% | 50 / 50 |
| 9) NameOfCreditor | 96.0% | 48 / 50 |
| 10) NameOfDebtor | 94.0% | 47 / 50 |
| 11) ValueOfProperty | 100.0% | 50 / 50 |
| 13) classified | 96.7% | 580 / 600 |
| 14) unclassified | 66.0% | 30 / 50 |

End: Run Pipeline...
elapsed time: 36.3798 secs

FIG. 13G

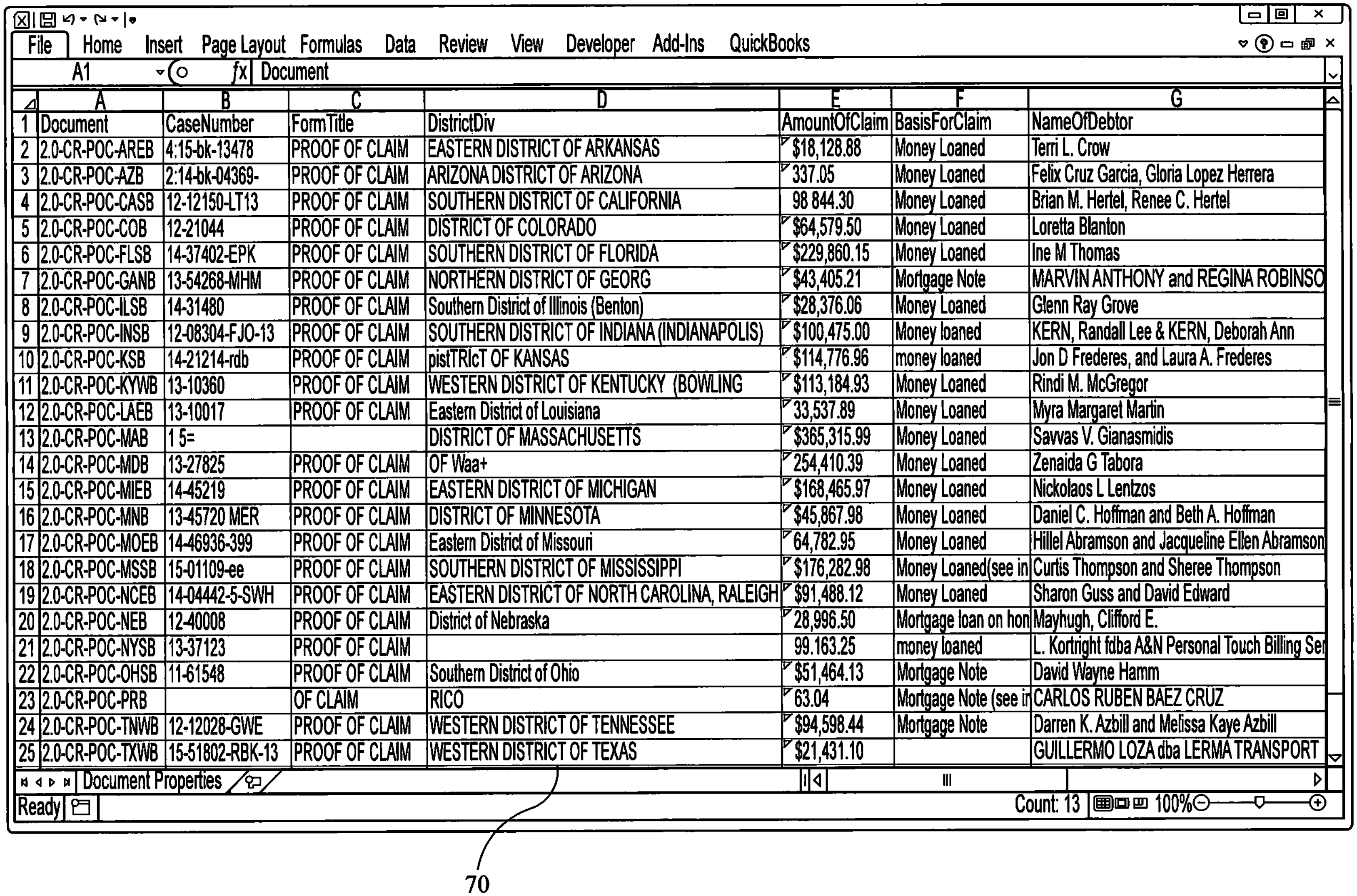

| | A | B | C | D | E | F | G |
|---|---|---|---|---|---|---|---|
| 1 | Document | CaseNumber | FormTitle | DistrictDiv | AmountOfClaim | BasisForClaim | NameOfDebtor |
| 2 | 2.0-CR-POC-AREB | 4:15-bk-13478 | PROOF OF CLAIM | EASTERN DISTRICT OF ARKANSAS | $18,128.88 | Money Loaned | Terri L. Crow |
| 3 | 2.0-CR-POC-AZB | 2:14-bk-04369- | PROOF OF CLAIM | ARIZONA DISTRICT OF ARIZONA | 337.05 | Money Loaned | Felix Cruz Garcia, Gloria Lopez Herrera |
| 4 | 2.0-CR-POC-CASB | 12-12150-LT13 | PROOF OF CLAIM | SOUTHERN DISTRICT OF CALIFORNIA | 98 844.30 | Money Loaned | Brian M. Hertel, Renee C. Hertel |
| 5 | 2.0-CR-POC-COB | 12-21044 | PROOF OF CLAIM | DISTRICT OF COLORADO | $64,579.50 | Money Loaned | Loretta Blanton |
| 6 | 2.0-CR-POC-FLSB | 14-37402-EPK | PROOF OF CLAIM | SOUTHERN DISTRICT OF FLORIDA | $229,860.15 | Money Loaned | Ine M Thomas |
| 7 | 2.0-CR-POC-GANB | 13-54268-MHM | PROOF OF CLAIM | NORTHERN DISTRICT OF GEORG | $43,405.21 | Mortgage Note | MARVIN ANTHONY and REGINA ROBINSO |
| 8 | 2.0-CR-POC-ILSB | 14-31480 | PROOF OF CLAIM | Southern District of Illinois (Benton) | $28,376.06 | Money Loaned | Glenn Ray Grove |
| 9 | 2.0-CR-POC-INSB | 12-08304-FJO-13 | PROOF OF CLAIM | SOUTHERN DISTRICT OF INDIANA (INDIANAPOLIS) | $100,475.00 | Money loaned | KERN, Randall Lee & KERN, Deborah Ann |
| 10 | 2.0-CR-POC-KSB | 14-21214-rdb | PROOF OF CLAIM | pistTRIcT OF KANSAS | $114,776.96 | money loaned | Jon D Frederes, and Laura A. Frederes |
| 11 | 2.0-CR-POC-KYWB | 13-10360 | PROOF OF CLAIM | WESTERN DISTRICT OF KENTUCKY (BOWLING | $113,184.93 | Money Loaned | Rindi M. McGregor |
| 12 | 2.0-CR-POC-LAEB | 13-10017 | PROOF OF CLAIM | Eastern District of Louisiana | 33,537.89 | Money Loaned | Myra Margaret Martin |
| 13 | 2.0-CR-POC-MAB | 1 5= | | DISTRICT OF MASSACHUSETTS | $365,315.99 | Money Loaned | Savvas V. Gianasmidis |
| 14 | 2.0-CR-POC-MDB | 13-27825 | PROOF OF CLAIM | OF Waa+ | 254,410.39 | Money Loaned | Zenaida G Tabora |
| 15 | 2.0-CR-POC-MIEB | 14-45219 | PROOF OF CLAIM | EASTERN DISTRICT OF MICHIGAN | $168,465.97 | Money Loaned | Nickolaos L Lentzos |
| 16 | 2.0-CR-POC-MNB | 13-45720 MER | PROOF OF CLAIM | DISTRICT OF MINNESOTA | $45,867.98 | Money Loaned | Daniel C. Hoffman and Beth A. Hoffman |
| 17 | 2.0-CR-POC-MOEB | 14-46936-399 | PROOF OF CLAIM | Eastern District of Missouri | 64,782.95 | Money Loaned | Hillel Abramson and Jacqueline Ellen Abramson |
| 18 | 2.0-CR-POC-MSSB | 15-01109-ee | PROOF OF CLAIM | SOUTHERN DISTRICT OF MISSISSIPPI | $176,282.98 | Money Loaned(see in | Curtis Thompson and Sheree Thompson |
| 19 | 2.0-CR-POC-NCEB | 14-04442-5-SWH | PROOF OF CLAIM | EASTERN DISTRICT OF NORTH CAROLINA, RALEIGH | $91,488.12 | Money Loaned | Sharon Guss and David Edward |
| 20 | 2.0-CR-POC-NEB | 12-40008 | PROOF OF CLAIM | District of Nebraska | 28,996.50 | Mortgage loan on hon | Mayhugh, Clifford E. |
| 21 | 2.0-CR-POC-NYSB | 13-37123 | PROOF OF CLAIM | | 99.163.25 | money loaned | L. Kortright fdba A&N Personal Touch Billing Se |
| 22 | 2.0-CR-POC-OHSB | 11-61548 | PROOF OF CLAIM | Southern District of Ohio | $51,464.13 | Mortgage Note | David Wayne Hamm |
| 23 | 2.0-CR-POC-PRB | | OF CLAIM | RICO | 63.04 | Mortgage Note (see in | CARLOS RUBEN BAEZ CRUZ |
| 24 | 2.0-CR-POC-TNWB | 12-12028-GWE | PROOF OF CLAIM | WESTERN DISTRICT OF TENNESSEE | $94,598.44 | Mortgage Note | Darren K. Azbill and Melissa Kaye Azbill |
| 25 | 2.0-CR-POC-TXWB | 15-51802-RBK-13 | PROOF OF CLAIM | WESTERN DISTRICT OF TEXAS | $21,431.10 | | GUILLERMO LOZA dba LERMA TRANSPORT |

70

FIG. 14A

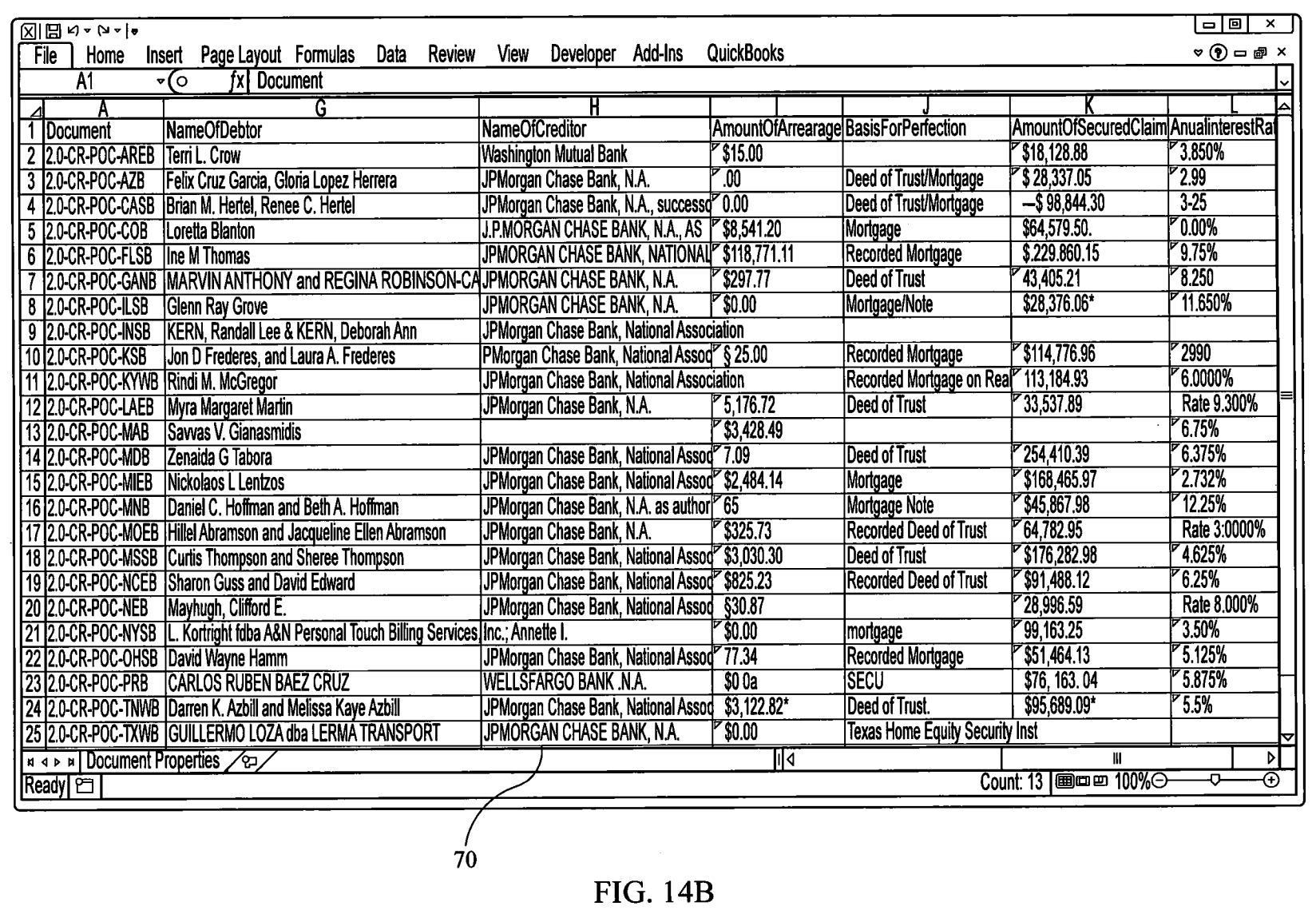

File Home Insert Page Layout Formulas Data Review View Developer Add-Ins QuickBooks A1 fx Document

| | A | G | H | I | J | K | L |
|---|---|---|---|---|---|---|---|
| 1 | Document | NameOfDebtor | NameOfCreditor | AmountOfArrearage | BasisForPerfection | AmountOfSecuredClaim | AnualinterestRa |
| 2 | 2.0-CR-POC-AREB | Terri L. Crow | Washington Mutual Bank | $15.00 | | $18,128.88 | 3.850% |
| 3 | 2.0-CR-POC-AZB | Felix Cruz Garcia, Gloria Lopez Herrera | JPMorgan Chase Bank, N.A. | .00 | Deed of Trust/Mortgage | $ 28,337.05 | 2.99 |
| 4 | 2.0-CR-POC-CASB | Brian M. Hertel, Renee C. Hertel | JPMorgan Chase Bank, N.A., successo | 0.00 | Deed of Trust/Mortgage | –$ 98,844.30 | 3-25 |
| 5 | 2.0-CR-POC-COB | Loretta Blanton | J.P.MORGAN CHASE BANK, N.A., AS | $8,541.20 | Mortgage | $64,579.50. | 0.00% |
| 6 | 2.0-CR-POC-FLSB | Ine M Thomas | JPMORGAN CHASE BANK, NATIONAL | $118,771.11 | Recorded Mortgage | $.229.860.15 | 9.75% |
| 7 | 2.0-CR-POC-GANB | MARVIN ANTHONY and REGINA ROBINSON-CA | JPMORGAN CHASE BANK, N.A. | $297.77 | Deed of Trust | 43,405.21 | 8.250 |
| 8 | 2.0-CR-POC-ILSB | Glenn Ray Grove | JPMORGAN CHASE BANK, N.A. | $0.00 | Mortgage/Note | $28,376.06* | 11.650% |
| 9 | 2.0-CR-POC-INSB | KERN, Randall Lee & KERN, Deborah Ann | JPMorgan Chase Bank, National Association | | | | |
| 10 | 2.0-CR-POC-KSB | Jon D Frederes, and Laura A. Frederes | PMorgan Chase Bank, National Assoc | § 25.00 | Recorded Mortgage | $114,776.96 | 2990 |
| 11 | 2.0-CR-POC-KYWB | Rindi M. McGregor | JPMorgan Chase Bank, National Association | | Recorded Mortgage on Rea | 113,184.93 | 6.0000% |
| 12 | 2.0-CR-POC-LAEB | Myra Margaret Martin | JPMorgan Chase Bank, N.A. | 5,176.72 | Deed of Trust | 33,537.89 | Rate 9.300% |
| 13 | 2.0-CR-POC-MAB | Savvas V. Gianasmidis | | $3,428.49 | | | 6.75% |
| 14 | 2.0-CR-POC-MDB | Zenaida G Tabora | JPMorgan Chase Bank, National Assoc | 7.09 | Deed of Trust | 254,410.39 | 6.375% |
| 15 | 2.0-CR-POC-MIEB | Nickolaos L Lentzos | JPMorgan Chase Bank, National Assoc | $2,484.14 | Mortgage | $168,465.97 | 2.732% |
| 16 | 2.0-CR-POC-MNB | Daniel C. Hoffman and Beth A. Hoffman | JPMorgan Chase Bank, N.A. as author | 65 | Mortgage Note | $45,867.98 | 12.25% |
| 17 | 2.0-CR-POC-MOEB | Hillel Abramson and Jacqueline Ellen Abramson | JPMorgan Chase Bank, N.A. | $325.73 | Recorded Deed of Trust | 64,782.95 | Rate 3:0000% |
| 18 | 2.0-CR-POC-MSSB | Curtis Thompson and Sheree Thompson | JPMorgan Chase Bank, National Assoc | $3,030.30 | Deed of Trust | $176,282.98 | 4.625% |
| 19 | 2.0-CR-POC-NCEB | Sharon Guss and David Edward | JPMorgan Chase Bank, National Assoc | $825.23 | Recorded Deed of Trust | $91,488.12 | 6.25% |
| 20 | 2.0-CR-POC-NEB | Mayhugh, Clifford E. | JPMorgan Chase Bank, National Assoc | $30.87 | | 28,996.59 | Rate 8.000% |
| 21 | 2.0-CR-POC-NYSB | L. Kortright fdba A&N Personal Touch Billing Services, | Inc.; Annette I. | $0.00 | mortgage | 99,163.25 | 3.50% |
| 22 | 2.0-CR-POC-OHSB | David Wayne Hamm | JPMorgan Chase Bank, National Assoc | 77.34 | Recorded Mortgage | $51,464.13 | 5.125% |
| 23 | 2.0-CR-POC-PRB | CARLOS RUBEN BAEZ CRUZ | WELLSFARGO BANK .N.A. | $0 0a | SECU | $76, 163. 04 | 5.875% |
| 24 | 2.0-CR-POC-TNWB | Darren K. Azbill and Melissa Kaye Azbill | JPMorgan Chase Bank, National Assoc | $3,122.82* | Deed of Trust. | $95,689.09* | 5.5% |
| 25 | 2.0-CR-POC-TXWB | GUILLERMO LOZA dba LERMA TRANSPORT | JPMORGAN CHASE BANK, N.A. | $0.00 | Texas Home Equity Security Inst | | |

Document Properties

Ready Count: 13 100%

70

FIG. 14B

SYSTEMS AND METHODS FOR ENABLING RELEVANT DATA TO BE EXTRACTED FROM A PLURALITY OF DOCUMENTS

PRIORITY

This patent application claims priority to U.S. Provisional Patent Application No. 63/093,425, filed Oct. 19, 2020, entitled "Systems and Methods for Training an Extraction Algorithm and/or Extracting Relevant Data from a Plurality of Documents," the entirety of which is incorporated herein by reference and relied upon.

BACKGROUND

Technical Field

This disclosure generally relates to a system and method for enabling target data to be extracted from a plurality of documents. More specifically, the present disclosure relates to a system and method which utilize information from documents in a legacy database to train an extraction algorithm to extract target data from documents in a current database.

Background Information

Many business enterprises hold a wealth of old data within legacy databases. In some cases, however, this data can have little value beyond preserving old records, particularly when the technology for maintaining a legacy database becomes obsolete.

SUMMARY

The present disclosure provides systems and methods that can utilize old data from a legacy database to train an extraction algorithm which can then extract target data from additional documents in newer databases. The systems and methods discussed herein therefore allow old data in legacy databases to provide value beyond record preservation, while also improving processing speeds and reducing the memory space needed to extract target data from a large number of documents.

In accordance with a first aspect of the present disclosure, a system for enabling target data to be extracted from documents includes a database and a controller. The database includes a plurality of documents containing target data. The controller includes a processor and a memory, the processor programmed to execute instructions stored on the memory to cause the controller to: (i) for each of multiple of the documents, create a region tensor based on extracted text including the target data; (ii) for each of the multiple of the documents, create a label tensor based on an area including the target data; (iii) using the region tensors and the label tensors, train an extraction algorithm to extract the target data from additional documents.

In accordance with a second aspect of the present disclosure, which can be combined with the first aspect, a system for enabling target data to be extracted from documents includes a database and a controller. The database includes a plurality of documents containing target data. The controller includes a processor and a memory, the processor programmed to execute instructions stored on the memory to cause the controller to: (i) for each of multiple of the documents, extract target text including the target data; (ii) for each of the multiple of the documents, identify a fixed region surrounding the target text; (iii) for each of the multiple of the documents, create a region tensor based on the fixed region; and (iv) using the region tensors, train an extraction algorithm to extract the target data from additional documents.

In accordance with a third aspect of the present disclosure, which can be combined with any one or more of the previous aspects, a system for enabling target data to be extracted from documents includes a database and a controller. The database includes a plurality of documents containing target data. The controller includes a processor and a memory, the processor programmed to execute instructions stored on the memory to cause the controller to: (i) for each of multiple of the documents, assign a label to an area including the target data; (ii) for each of the multiple of the documents, convert the area to coordinate data; (iii) for each of the multiple of the documents, create a label tensor using the coordinate data; and (iv) using the label tensors, train an extraction algorithm to extract the target data from additional documents.

In accordance with a fourth aspect of the present disclosure, which can be combined with any one or more of the previous aspects, a system for enabling target data to be extracted from documents includes a database and a controller. The database includes a plurality of documents containing target data. The controller includes a processor and a memory, the processor programmed to execute instructions stored on the memory to cause the controller to: (i) extract text within each of multiple of the documents, (ii) for each of the multiple of the documents, create a key-value map including at least one category and at least one corresponding target data value for the category, and (iii) using information from the key-value map, train an extraction algorithm to extract the target data from additional documents.

In accordance with a fifth aspect of the present disclosure, which can be combined with any one or more of the previous aspects, the controller is further programmed to create at least one of a label tensor or a region tensor using the information from the key-value map, and to use at least one of the label tensor or the region tensor to train the extraction algorithm to extract the target data from the additional documents.

In accordance with a sixth aspect of the present disclosure, which can be combined with any one or more of the previous aspects, a system for enabling target data to be extracted from documents can include a controller programmed to use any of the extraction algorithms discussed herein to extract the target data from the additional documents.

In accordance with a seventh aspect of the present disclosure, which can be combined with any one or more of the previous aspects, a method for enabling target data to be extracted from documents includes (i) accessing a database including a plurality of documents including target data, (ii) for each of multiple of the documents, creating a region tensor based on extracted text including the target data, (iii) for each of the multiple of the documents, creating a label tensor based on an area including the target data, and (iv) using the region tensor and the label tensor, training an extraction algorithm to extract the target data from additional documents.

In accordance with an eighth aspect of the present disclosure, which can be combined with any one or more of the previous aspects, a method for enabling target data to be extracted from documents includes (i) accessing a database including a plurality of documents including target data, (ii)

for each of multiple of the documents, extracting target text including the target data, (iii) for each of the multiple of the documents, identifying a fixed region surrounding the target text, (iv) for each of multiple of the documents, creating a region tensor based on the fixed region, and (v) using the region tensors, train an extraction algorithm to extract the target data from additional documents.

In accordance with a ninth aspect of the present disclosure, which can be combined with any one or more of the previous aspects, a method for enabling target data to be extracted from documents includes (i) accessing a database including a plurality of documents including target data, (ii) for each of multiple of the documents, assigning a label to an area including the target data, (iii) for each of the multiple of the documents, converting the area to coordinate data; (iv) for each of the multiple of the documents, creating a label tensor using the coordinate data, and (v) using the label tensors, training an extraction algorithm to extract the target data from additional documents.

In accordance with a tenth aspect of the present disclosure, which can be combined with any one or more of the previous aspects, a method for enabling target data to be extracted from documents includes (i) accessing a database including a plurality of documents including target data, (ii) extracting text within each of multiple of the documents, (iii) for each of the multiple of the documents, creating a key-value map including at least one category and at least one corresponding target data value for the category, and (iv) using information from the key-value map, training an extraction algorithm to extract the target data from additional documents.

In accordance with an eleventh aspect of the present disclosure, which can be combined with any one or more of the previous aspects, the method includes creating at least one of a label tensor or a region tensor using the information from the key-value map, and using at least one of the label tensor or the region tensor to train the extraction algorithm to extract the target data from additional documents.

In accordance with a twelfth aspect of the present disclosure, which can be combined with any one or more of the previous aspects, a method for enabling target data to be extracted from documents includes extracting target data from additional documents using any of the extraction algorithms discussed herein.

In accordance with a thirteenth aspect of the present disclosure, which can be combined with any one or more of the previous aspects, the method includes enabling extraction of the target data from additional documents using the extraction algorithm.

In accordance with a fourteenth aspect of the present disclosure, which can be combined with any one or more of the previous aspects, a memory stores instructions configured to cause a processor to perform the methods discussed herein.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure:

FIGS. 9A to 9F illustrate an example embodiment of a tensor adjustment which can be performed during the method of FIG. 3;

FIGS. 13A to 13G illustrate an example embodiment of algorithm training which can be performed during the method of FIG. 3;

FIGS. 14A and 14B illustrate an example embodiment of database creation which can be performed during the method of FIG. 3;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
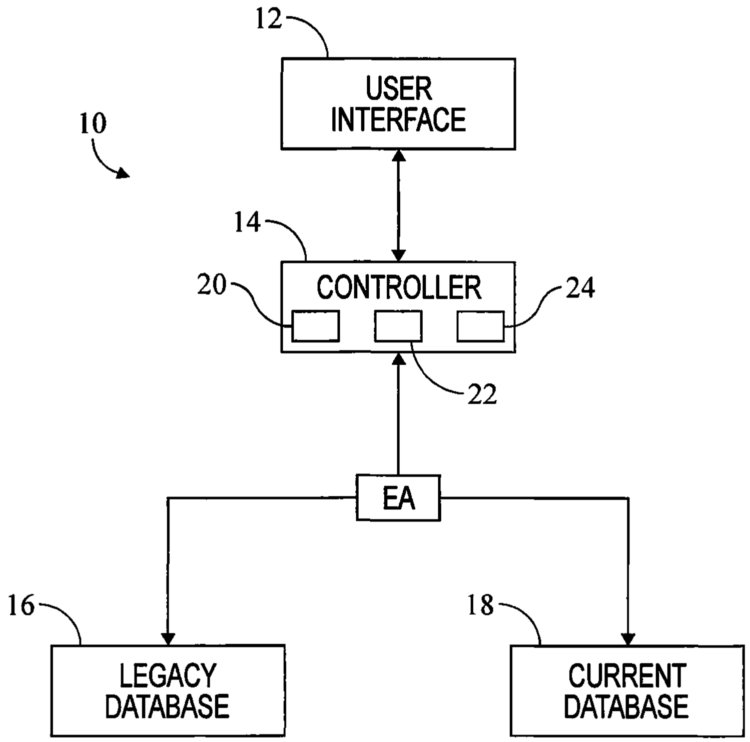
FIG. 1 illustrates an example embodiment of a system for enabling target data to be extracted from a plurality of documents in accordance with the present disclosure.

FIG. 1 illustrates an example embodiment of a system 10 for enabling target data to be extracted from a plurality of documents 30. In the illustrated embodiment, the system 10 includes at least one user interface 12, a controller 14, and a legacy database 16. The system 10 can further include a current database 18. In use, the controller 14 is configured to develop an extraction algorithm EA using data from documents 30 stored in the legacy database 16. The system 10 can then apply the extraction algorithm EA to extract target data 32 from a large number of additional documents 30 in the legacy database and/or additional documents 30 in the current database 18. More specifically, the EA algorithm is able to locate, extract and classify target data 32 in the additional documents 30. The methods of training the extraction algorithm EA and/or extracting the target data 32 are explained in more detail below.

Figure 2A:
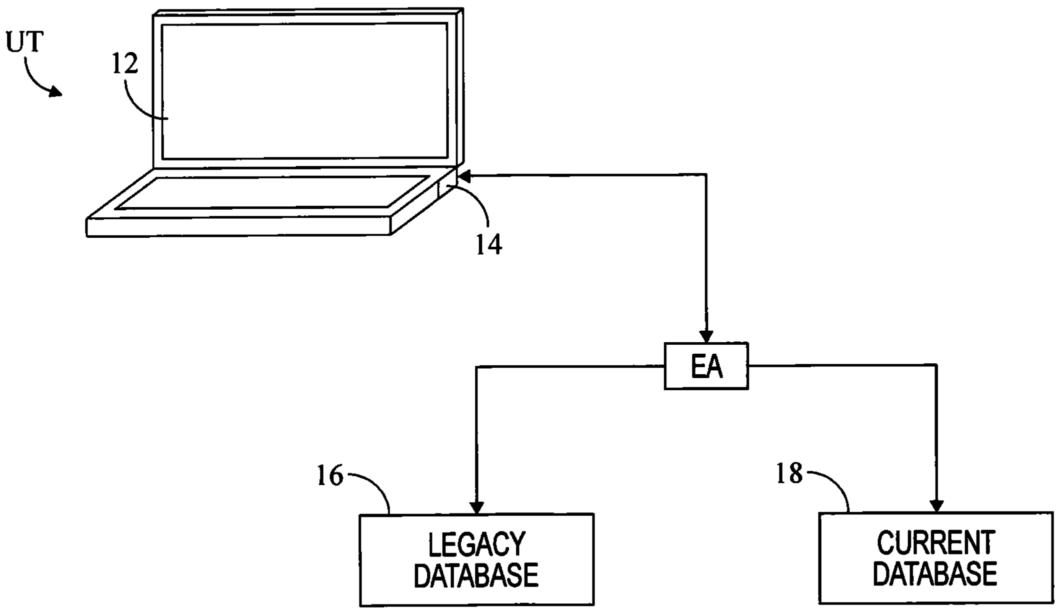
FIG. 2A illustrates an example embodiment of the system of FIG. 1.
Figure 2B:
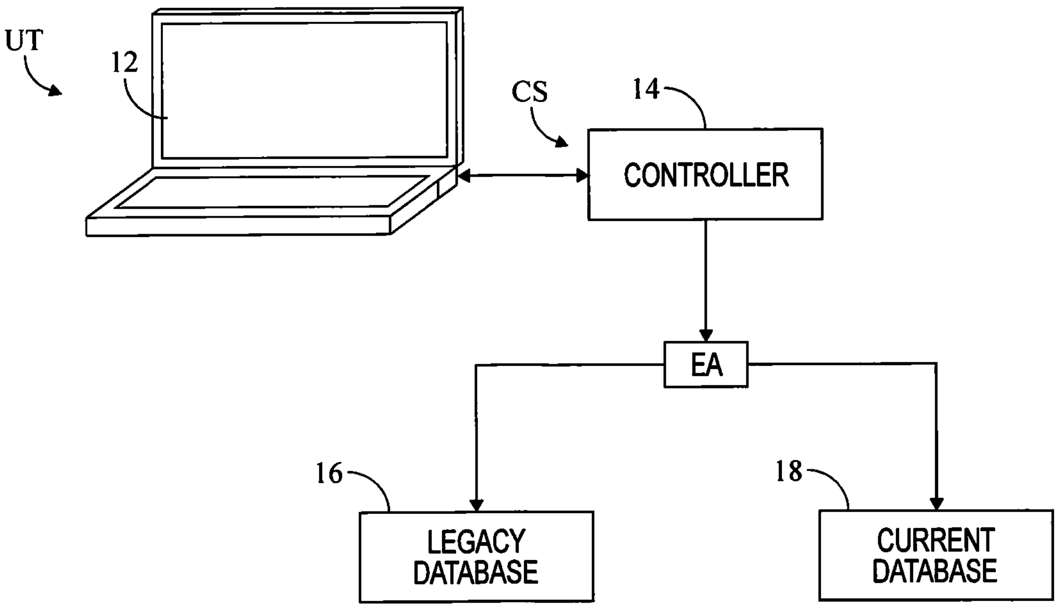
FIG. 2B illustrates another example embodiment of the system of FIG. 1.

The user interface 12 and the controller 14 can be part of the same user terminal UT or can be separate elements placed in communication with each other. In FIG. 2A, the same user terminal UT includes the user interface 12 and the controller 14, and the user terminal UT communicates with the legacy database 16 and/or the current database 18. In FIG. 2B, the user terminal UT includes the user interface 12, and a central server CS includes the controller 14, with the central server CS communicating with the legacy database 16 and/or the current database 18. The user terminal UT can be, for example, a cellular phone, a tablet, a personal computer, or another electronic device. The user terminal UT can include a processor and a memory, which can function as the controller 14 (e.g., FIG. 2A) or be placed in communication with the controller 14 (e.g., FIG. 2B).

The user interface 12 can be utilized to train the extraction algorithm EA and/or view the extracted target data 32 in accordance with the methods discussed herein. The user interface 12 can include a display screen and an input device such as a touch screen or button pad. During training, a user can provide feedback to the system 10 via the user interface 12 so as to improve the accuracy of the system 10 in extracting target data 32 from a plurality of documents 30. During or after extraction of the target data 32, a user can utilize the user interface 12 to view the extracted target data 32 in a simple configuration which reduces load times, processing power, and memory space in comparison to other methods.

The controller 14 can include a processor 20 and a memory 22. The processor 20 is configured to execute instructions programmed into and/or stored by the memory 22. The instructions can include programming instructions which cause the processor 20 to perform the steps of the methods 100, 200 discussed below. The memory 22 can include, for example, a non-transitory computer-readable storage medium. The controller 14 can further include a data transmission device 24 which enables communication between the user interface 12, the legacy database 16 and/or the current database 18, for example, via a wired or wireless network.

The legacy database 16 can include any database including a plurality of documents 30. In an embodiment, the legacy database 16 can include a database including documents 30 and/or other information that a business enterprise accesses or utilizes in the regular course of business. The documents 30 can include public or private information. In an embodiment, the legacy database 16 can include a plurality of documents 30 along with target data 32 of past importance which has already been extracted from those documents 30. The information of past importance can include, for example, a name, date, address, number, financial amount and/or other data that has previously been extracted from each document 30. In an embodiment, using this previously extracted target data 32, the system 10 discussed herein can train the extraction algorithm EA to access the same types of target data 32 from the current database 18 in accordance with the methods discussed below.

The current database 18 can also include any database including a plurality of documents 30. In an embodiment, the current database 18 can include a database including documents 30 and/or other information that a business enterprise utilizes in the regular course of business. The documents 30 can include public or private information. In an embodiment, the current database 18 includes a plurality of documents 30 which have target data 32 of future importance that has yet to be extracted from those documents 30. The information of future importance can include, for example, a name, date, address, number, financial amount and/or other data that has yet to be extracted from each document 30. In an embodiment, the current database 18 can be an online public database which is accessed by the business enterprise to extract the target data 32 from the plurality of documents 30 as they are created and/or archived.

In an embodiment, the legacy database 16 can include, for example, one or more old technology (e.g., old computer systems, old software-based applications, etc.) which differs from a newer technology used by the current database 18. That is, the legacy database 16 can include a system running on outdated software or hardware which is different from the software or hardware used to manage the current database 18. Thus, the legacy database 16 can include first software and/or first hardware which is an older or different version than second software and/or second hardware used by the current database 18. In an embodiment, the legacy database 16 stores information and/or data created prior to the creation and/or implementation of the current database 18. An example advantage of the presently disclosed system 10 is the ability to use documents 30 from an outdated legacy database 16 to extract important target data 32 from a newer current database 18.

Figure 3:
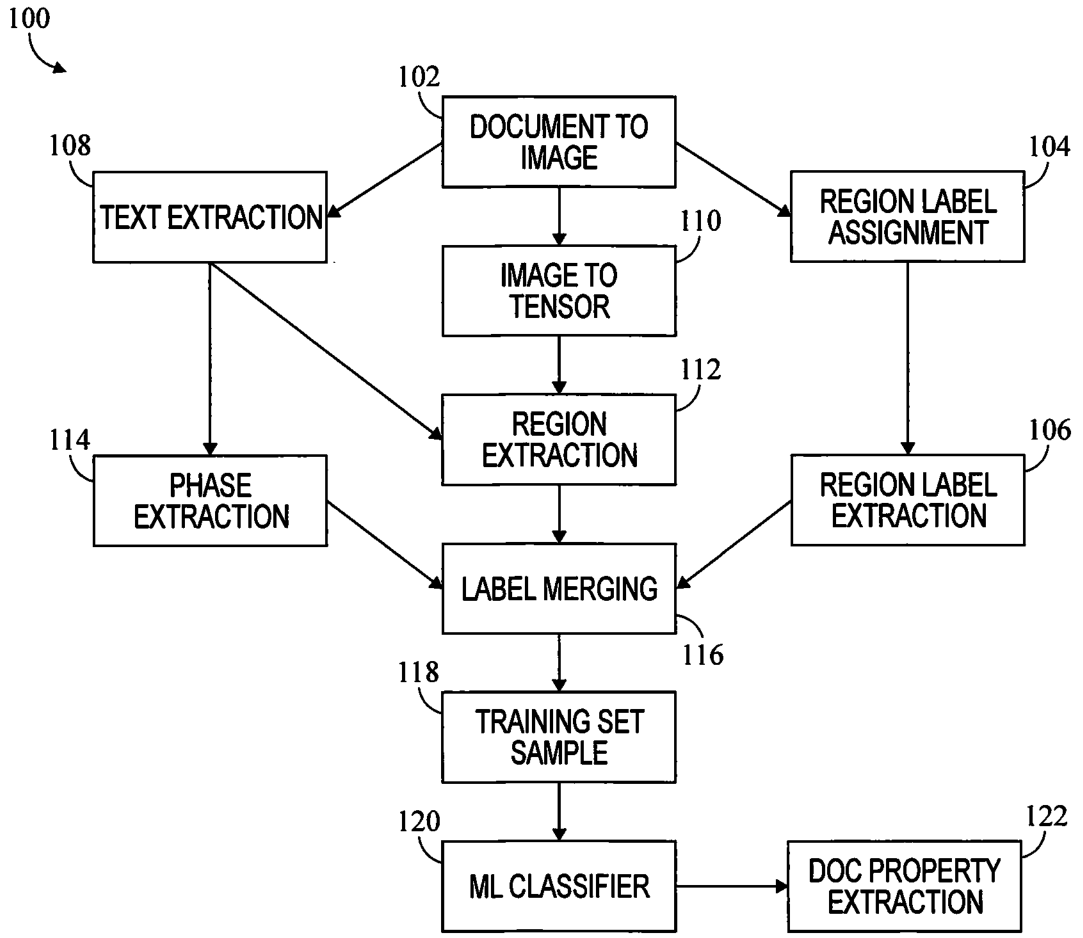
FIG. 3 illustrates an example embodiment of a method for enabling target data to be extracted from a plurality of documents in accordance with the present disclosure.

FIG. 3 illustrates an example embodiment of a method 100 for enabling target data to be extracted from a plurality of documents. The steps of method 100 can be stored as instructions on the memory 22 and can be executed by the processor 20. It should be understood that some of the steps described herein can be reordered or omitted without departing from the spirit or scope of method 100.

Method 100 begins with access to a database, for example, the legacy database 16 of system 10. The legacy database 16 includes a plurality of documents 30, with each of those documents 30 including target data 32. The target data can be previously extracted or can be unknown at the beginning of method 100. The target data 32 can include, for example, a name, date, address, number, financial amount and/or other data listed in a document. Thus, in an embodiment, the legacy database 16 can include target data 32 such as names, dates, addresses, numbers, financial amounts and/or other data that have already been extracted from the documents 30 stored therein. For example, the legacy database 16 can include a listing of the target data 32 (e.g., names, dates, amounts, addresses, etc.) and an indication of or link to the corresponding document 30 from which this information was extracted.

In the illustrated embodiment, the plurality of documents 30 in the database are in an initial format, e.g., a portable document format (PDF). PDF is a commonly-used format for storing documents 30 using minimal memory. In another embodiment, the document 30 can include an HTML document. Although the present disclosure generally refers to PDF documents 30, those of ordinary skill in the art will recognize from this disclosure that there are other formats besides PDF that can benefit from the presently disclosed systems and methods.

Figure 4:
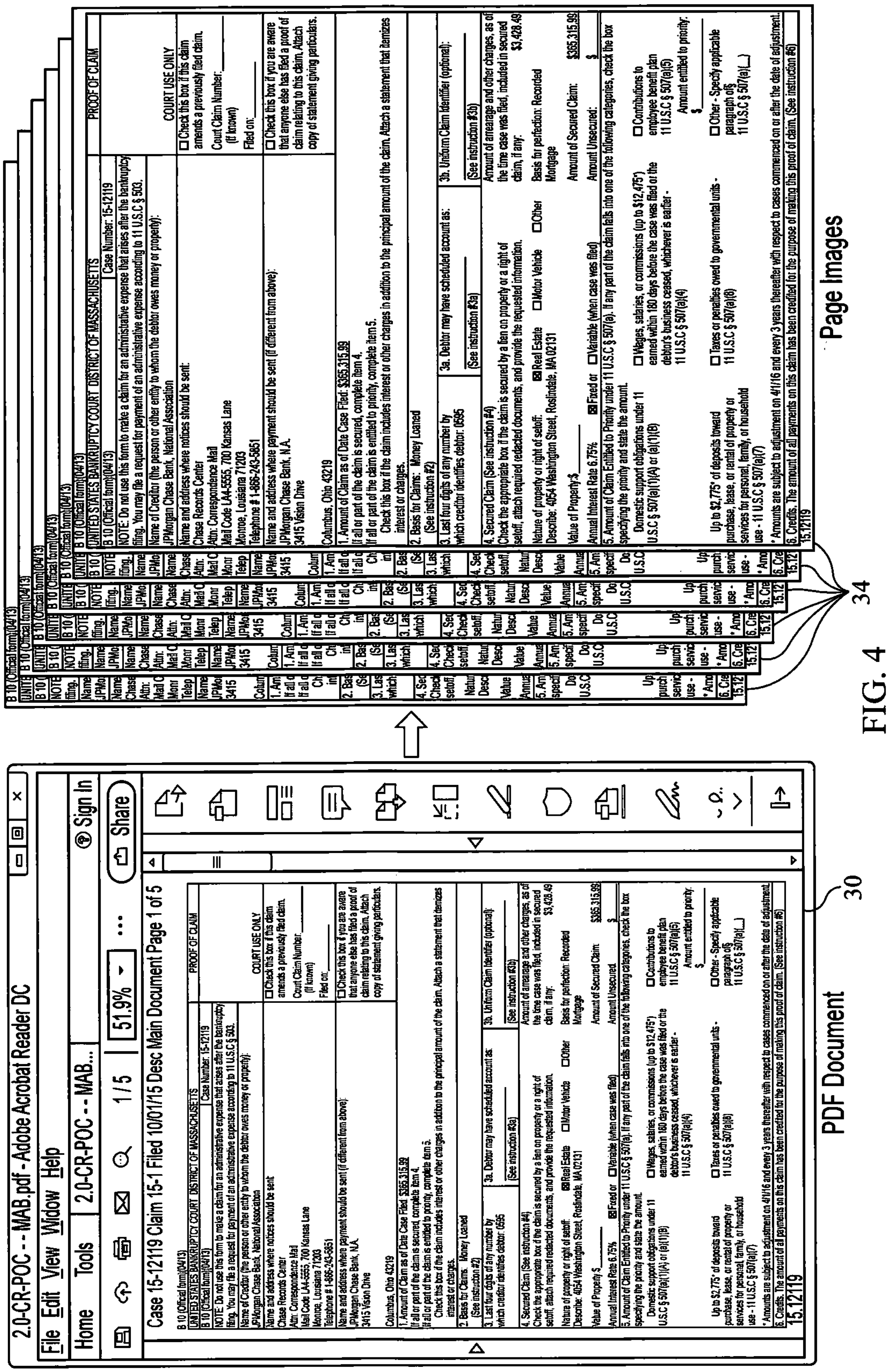
FIG. 4 illustrates an example embodiment of a document conversion which can be performed during the method of FIG. 3.

At step 102, the initial format (e.g., PDF) is converted into one or more image 34. The document 30 in the initial format can be converted to a single image 34 or to multiple images 34. In the image format, the information shown in the image 34 may not be readable by a computer. In an embodiment, a separate image 34 can be created for each page of a document 30. FIG. 4 illustrates an example embodiment of a multi-page PDF document 30 being converted into a plurality of page images 34.

Figure 5A:
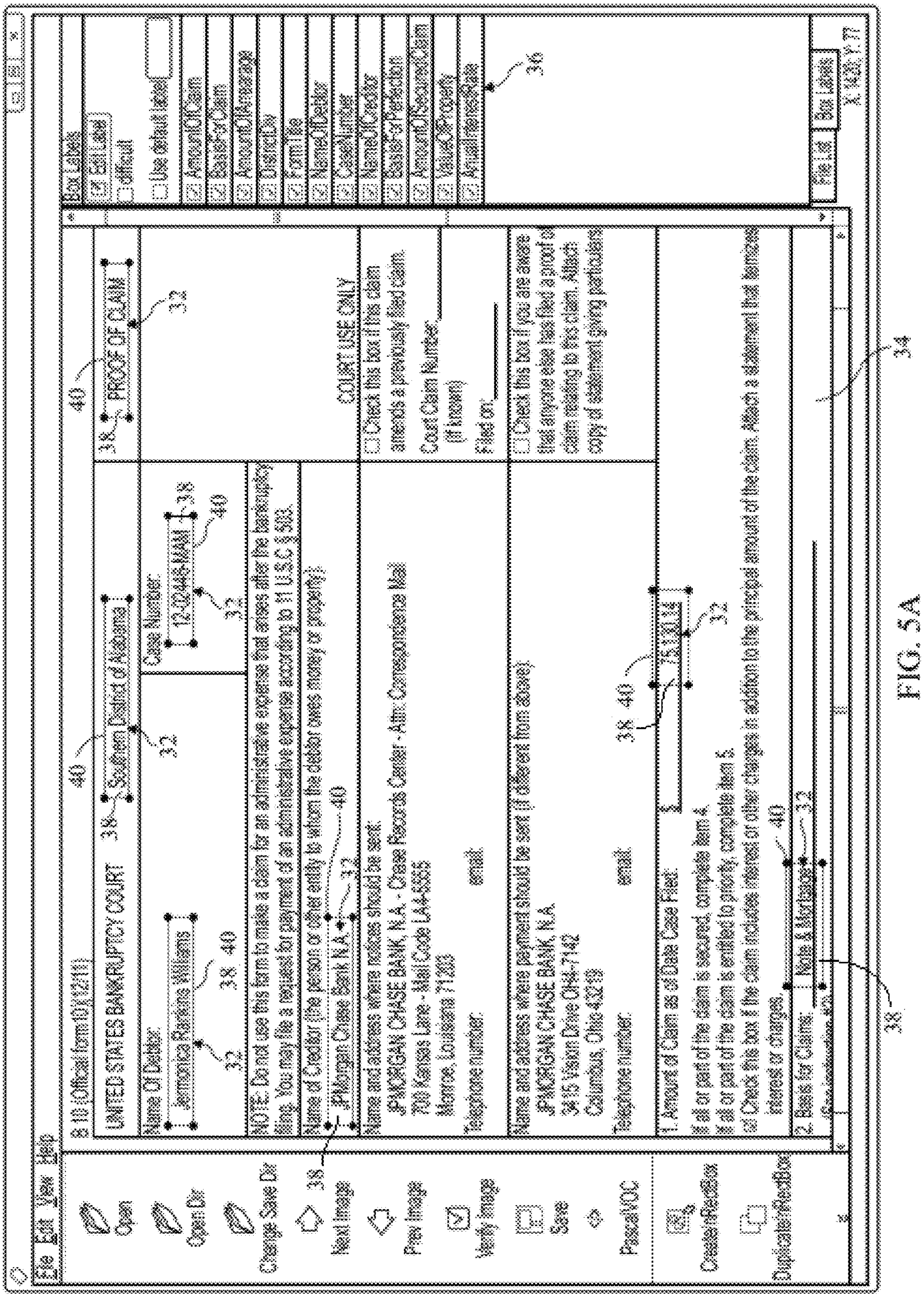
FIGS. 5A to 5C illustrate an example embodiment of a regional label assignment which can be performed during the method of FIG. 3.
Figure 5B:
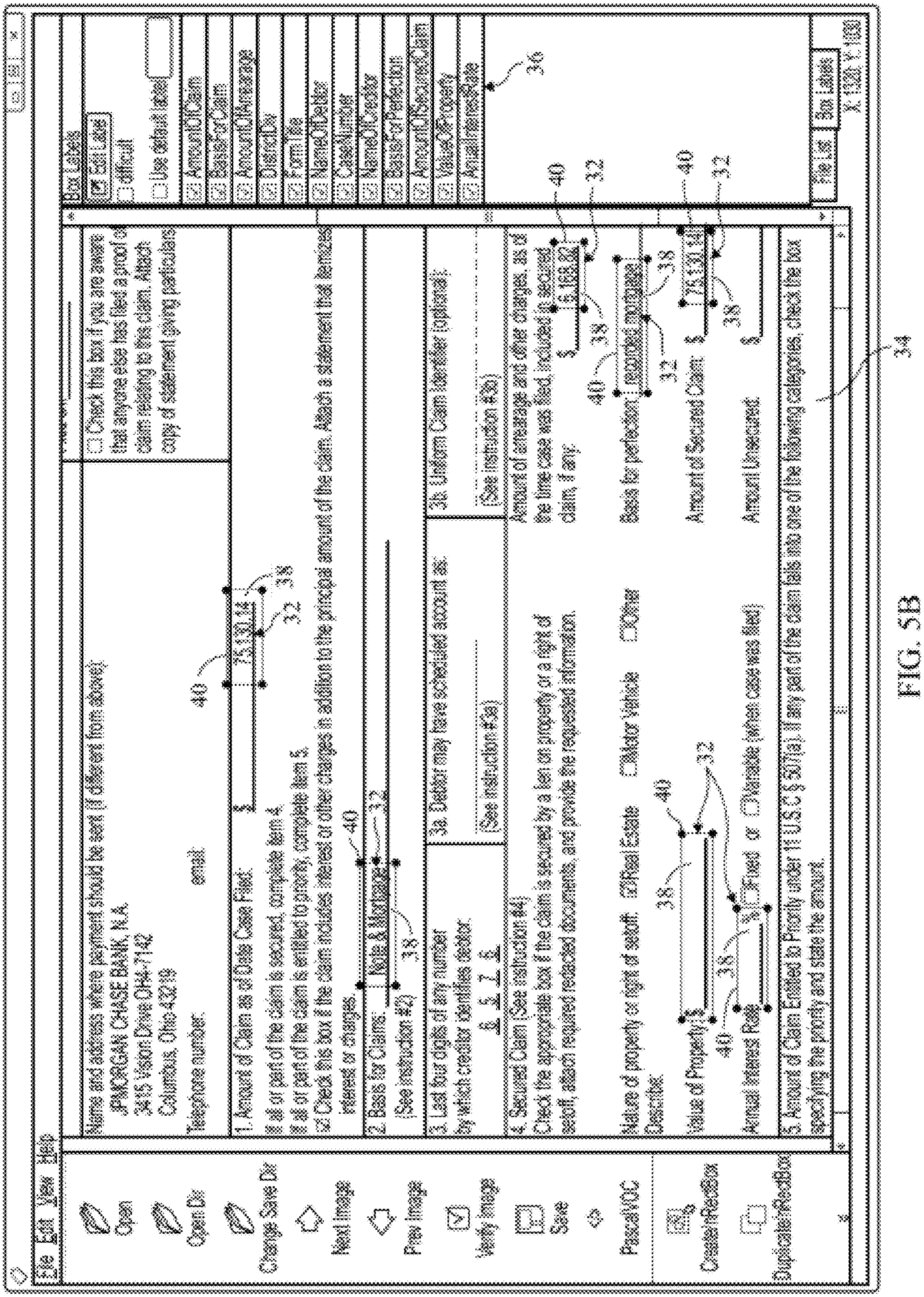
Figure 5C:
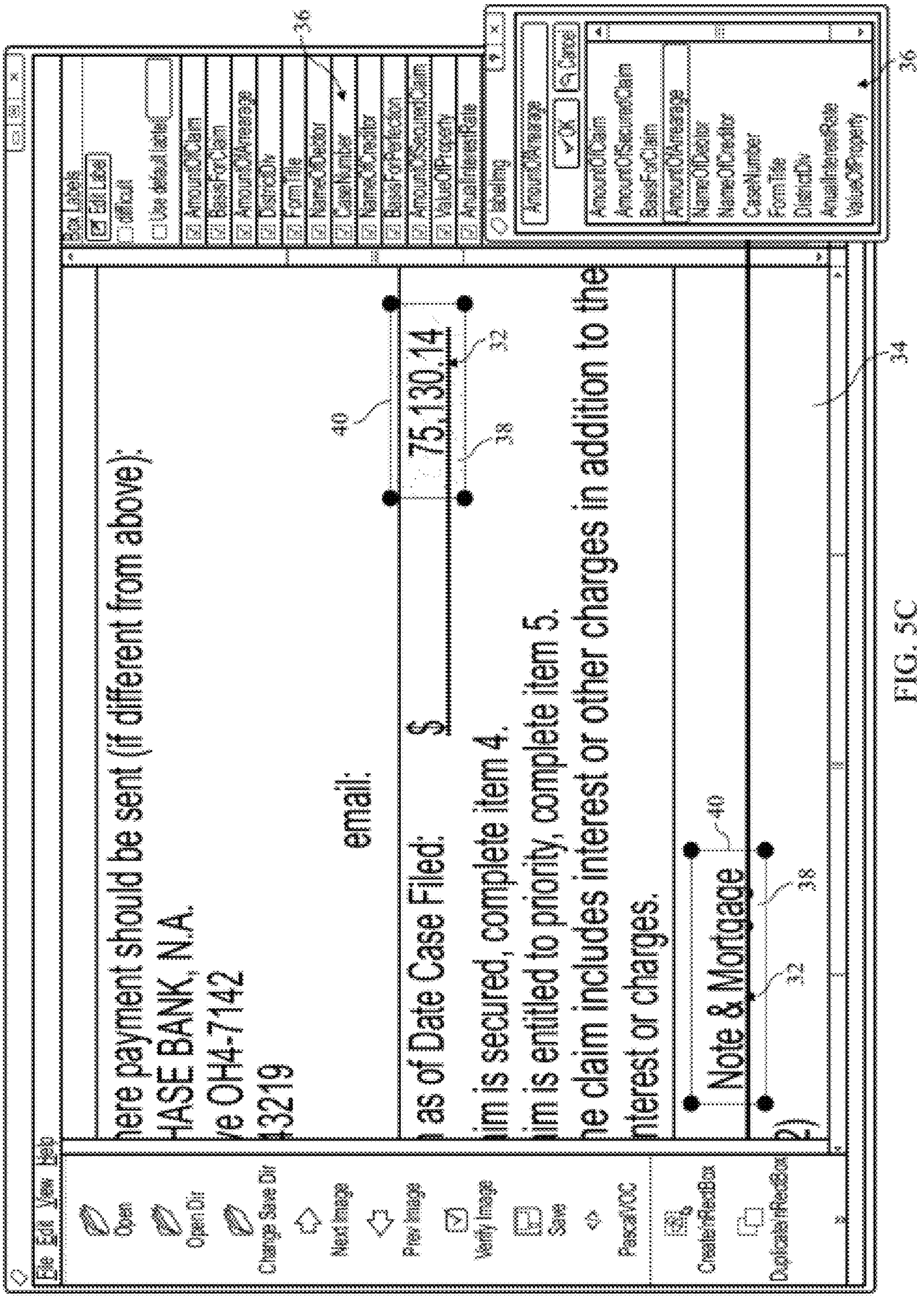

At step 104, a regional label assignment is performed on the image(s) 32 created during step 102. Here, for each document 30, one or more label 36 is assigned to an area 38 including target data 32. The labels 36 can be assigned, for example, by highlighting target data 32 located within the image 34 and linking the target data 32 to a corresponding label 36. More specifically, a box 40 can be created around the target data 32 and a label 36 can be associated with that box 40. Thus, in an embodiment, the area 38 can correspond a box 40. The assignment can be performed manually by a user using the user interface 12. The assignment can also be performed automatically by the controller 14, particularly if the controller 14 already knows the location and/or type of the target data 32 due to previous extraction and/or storage in a legacy database 16. In an embodiment, the box 40 can be created using a graphical tool. FIGS. 5A to 5C illustrate an example embodiment in which labels 36 are assigned by forming a box 40 which corresponds to an area 38 around target data 32.

In an embodiment, for example when using a legacy database 16 wherein the target data 32 has already been extracted from the documents 30, the controller 14 is configured to automatically locate and/or assign the labels 36 based on the previously extracted target data 32. For example, in FIG. 5C, the financial amount of $75,130.14 can be information that has previously been located and/or extracted from this document 30. Knowing that this information has previously been extracted as target data 32, the controller 14 is configured to look for "75,130.14" and assign a label 36 thereto. A category corresponding to the label 36 can be previously known for previously extracted target data 32, such that the controller 14 is configured to assign the correct label 36 to the image 34. Alternatively, the controller 14 is configured to locate the target data 32 and/or create the area 38/box 40 based on previously extracted information, and a user can manually assign the label 36 using the user interface 12.

Figure 6A:
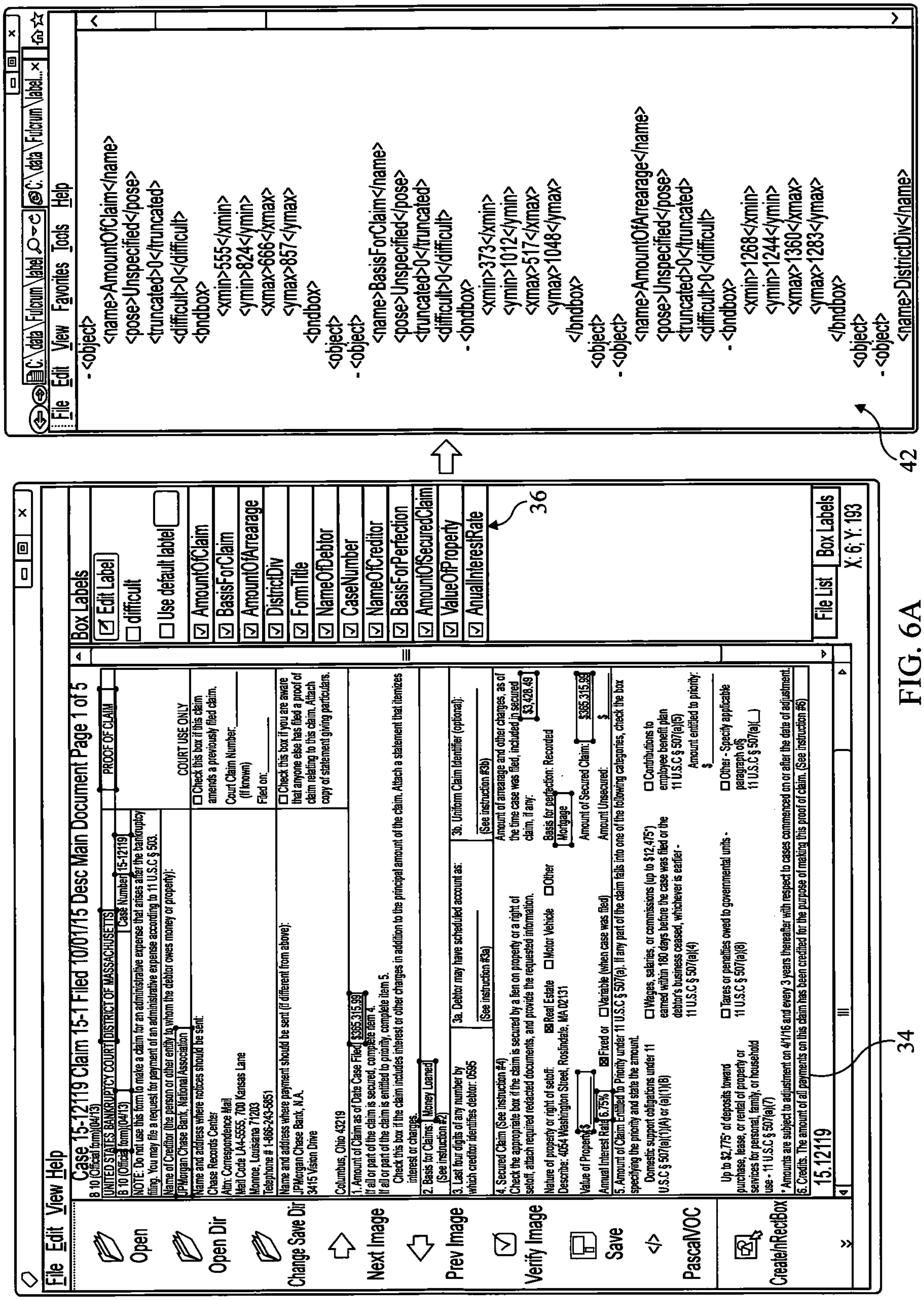
FIGS. 6A and 6B illustrate an example embodiment of a regional label extraction which can be performed during the method of FIG. 3.
Figure 6B:
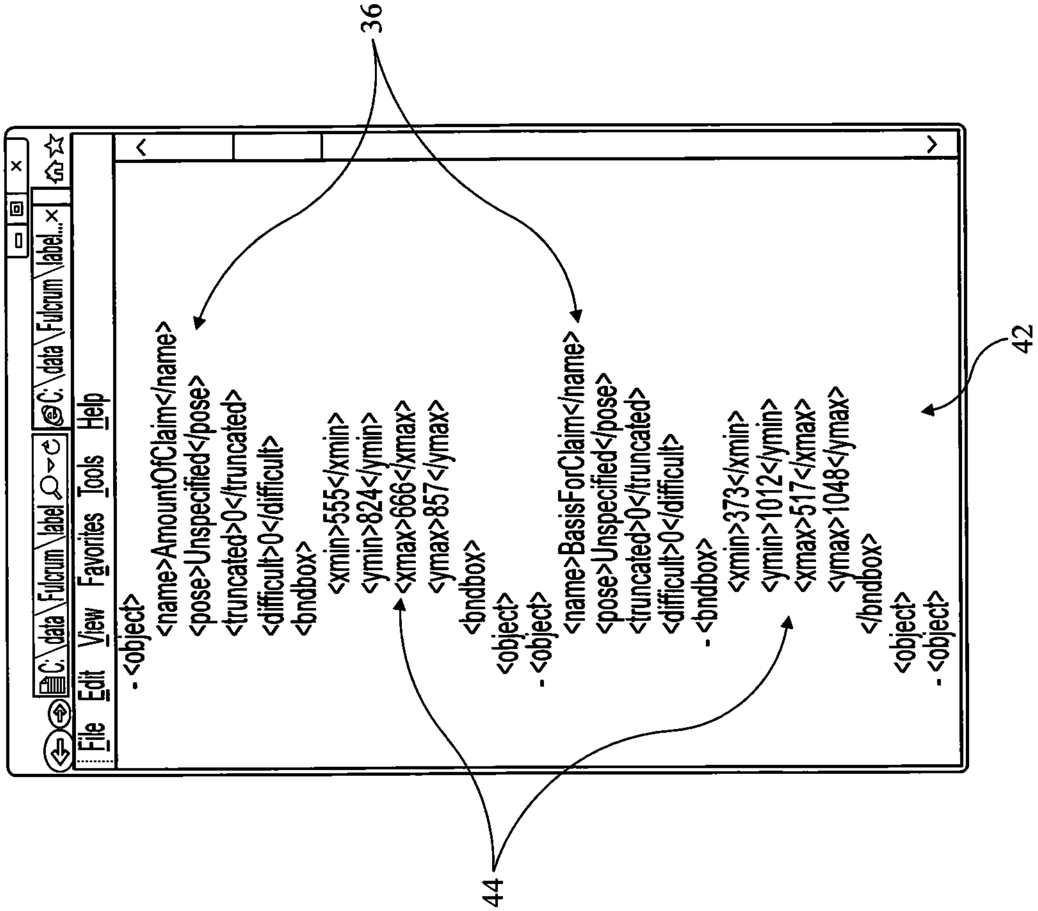

At step 106, a regional label extraction is performed based on the labels 36 assigned during step 104. Here, the controller 14 determines label coordinate data 42 for the highlighted area 38 from step 104. As illustrated by FIGS. 6A and 6B, the regional label extraction can include the creation of boundary conditions 44 for each highlighted area 38 from step 104, which can then be associated with the previously assigned label 36. The label coordinate data 42 can include the boundary conditions 44 or data created from the boundary conditions. The label coordinate data 42 can include one or more X and Y coordinates. For example, in FIGS. 6A and 6B, each label 36 (e.g., "AmountOfClaim," "BasisForClaim," "AmountOfArrearage," etc.) is given an Xmin value, a Ymin value, an Xmax value, and a Ymax value. This coordinate data 42 can mark the boundaries of the area 38 of each box 40 created within the respective image 34 at step 104, such that the numerical values represent x and y locations of areas 38 within the image 34.

Figure 7A:
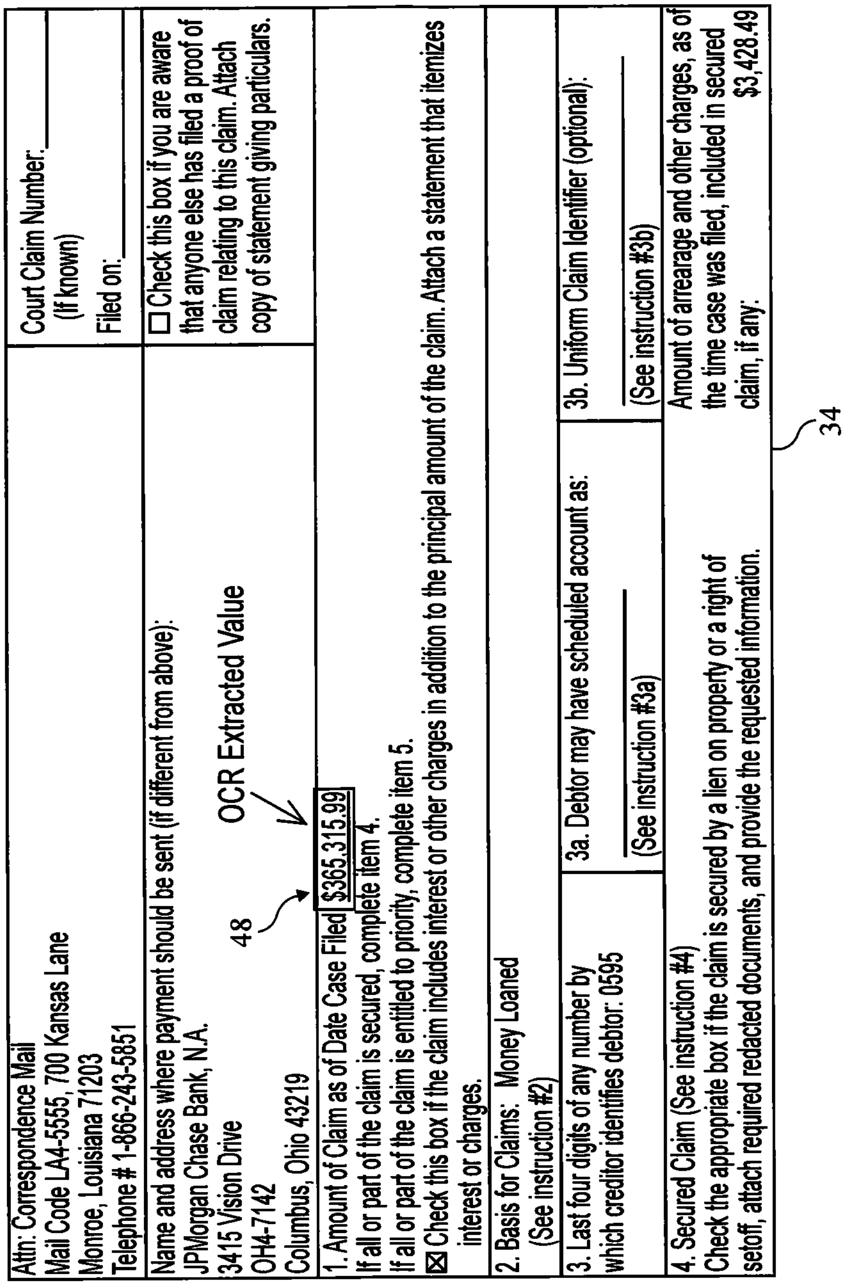
FIGS. 7A and 7B illustrate an example embodiment of a text extraction which can be performed during the method of FIG. 3.
Figure 7B:
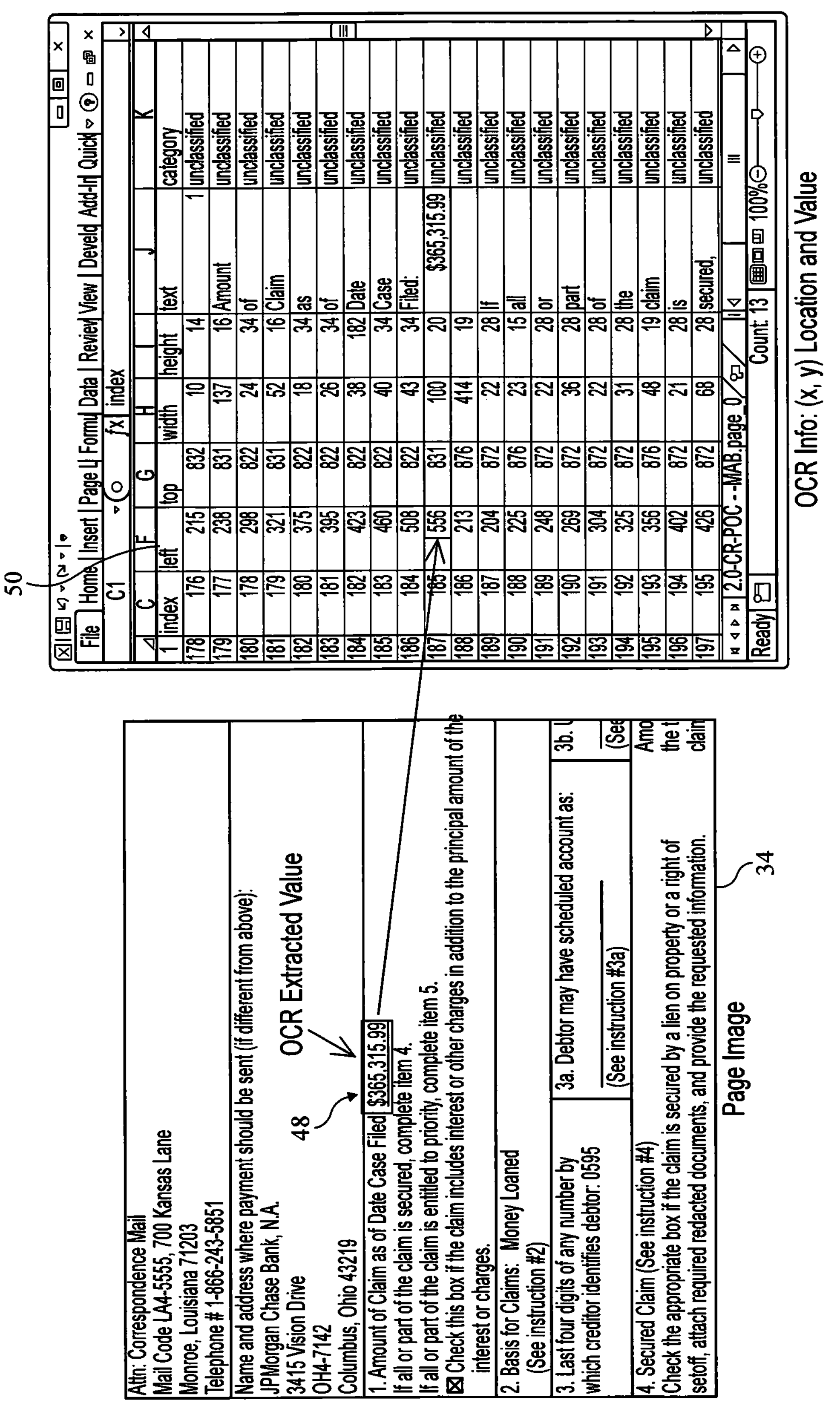

At step 108, a text extraction is performed on the images 34, for example, using an optical character recognition (OCR) or other text extraction method. The text extraction can be performed on the images 34 without the labels 36 applied thereto at steps 104 or 106. As illustrated by FIGS. 7A and 7B, a database 50 can then be created which lists each piece of extracted text 48 (e.g., shown in the "text column" in FIG. 7B) and the X and Y location of that text in the image (e.g., the "left," "top," "width" and "height" columns in FIG. 7B). The database 50 can include, for example, a document created in a spreadsheet format.

Figure 8:
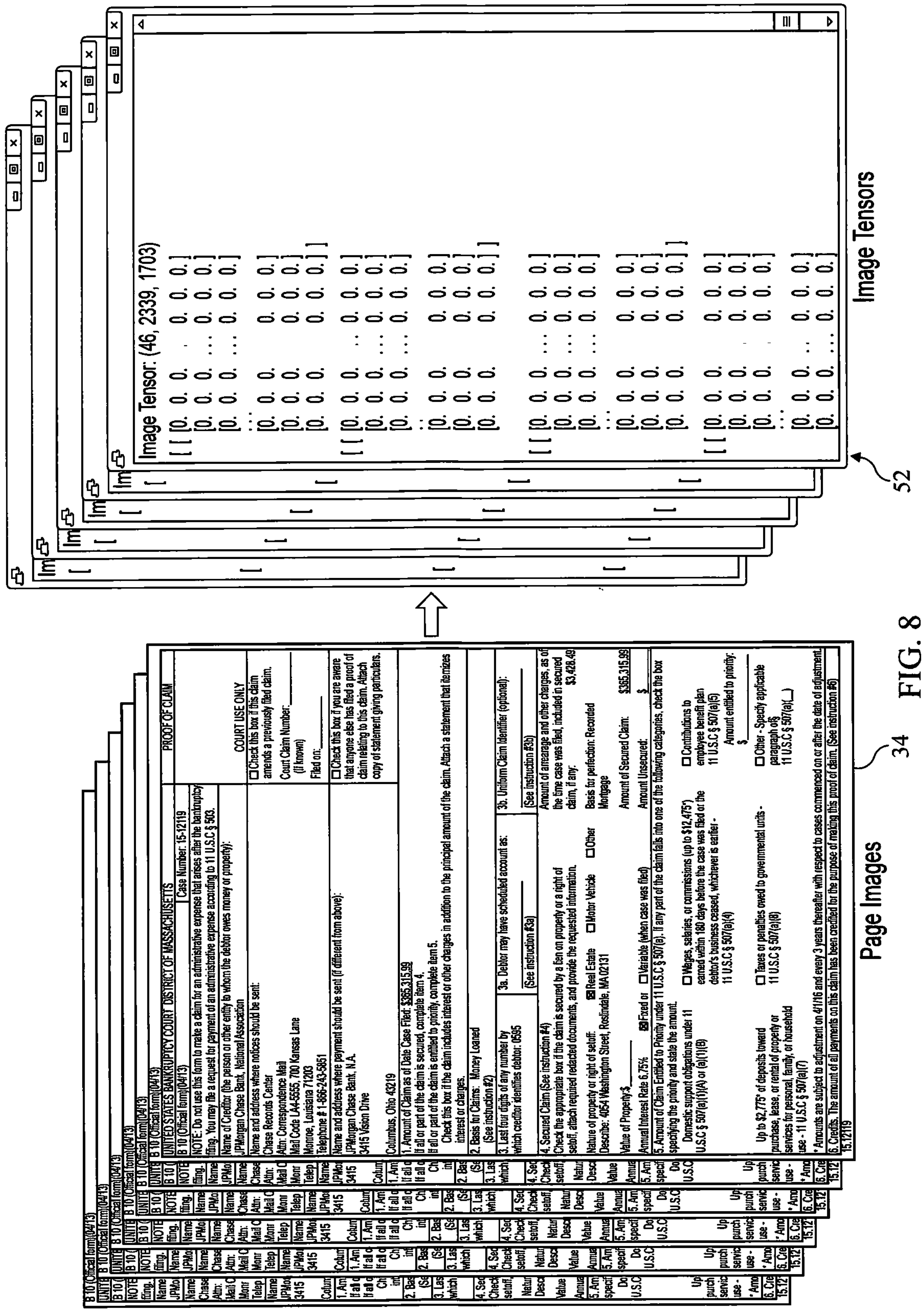
FIG. 8 illustrates an example embodiment of creation of a region tensor which can be performed during the method of FIG. 3.

At step 110, region tensors 52 are created using the images 34 created from the initial documents 30. The region tensors 52 can be created using the images 34 without the labels 36 applied thereto at steps 104 or 106 and/or without the text extraction performed at step 108. As illustrated by FIG. 8, the region tensors 52 can include one or more data matrix that describes a relationship of one or more object in the image 34.

Figure 9C:
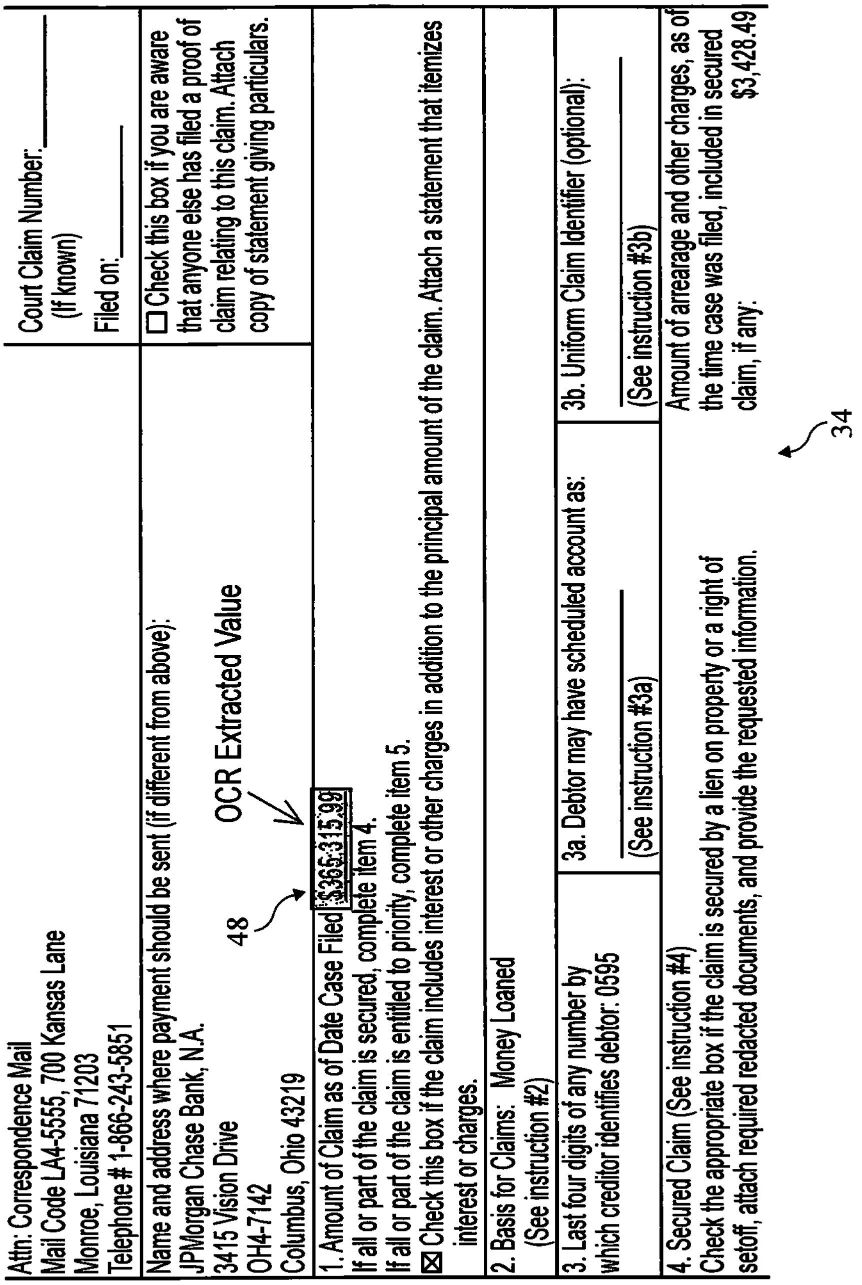
Figure 9D:
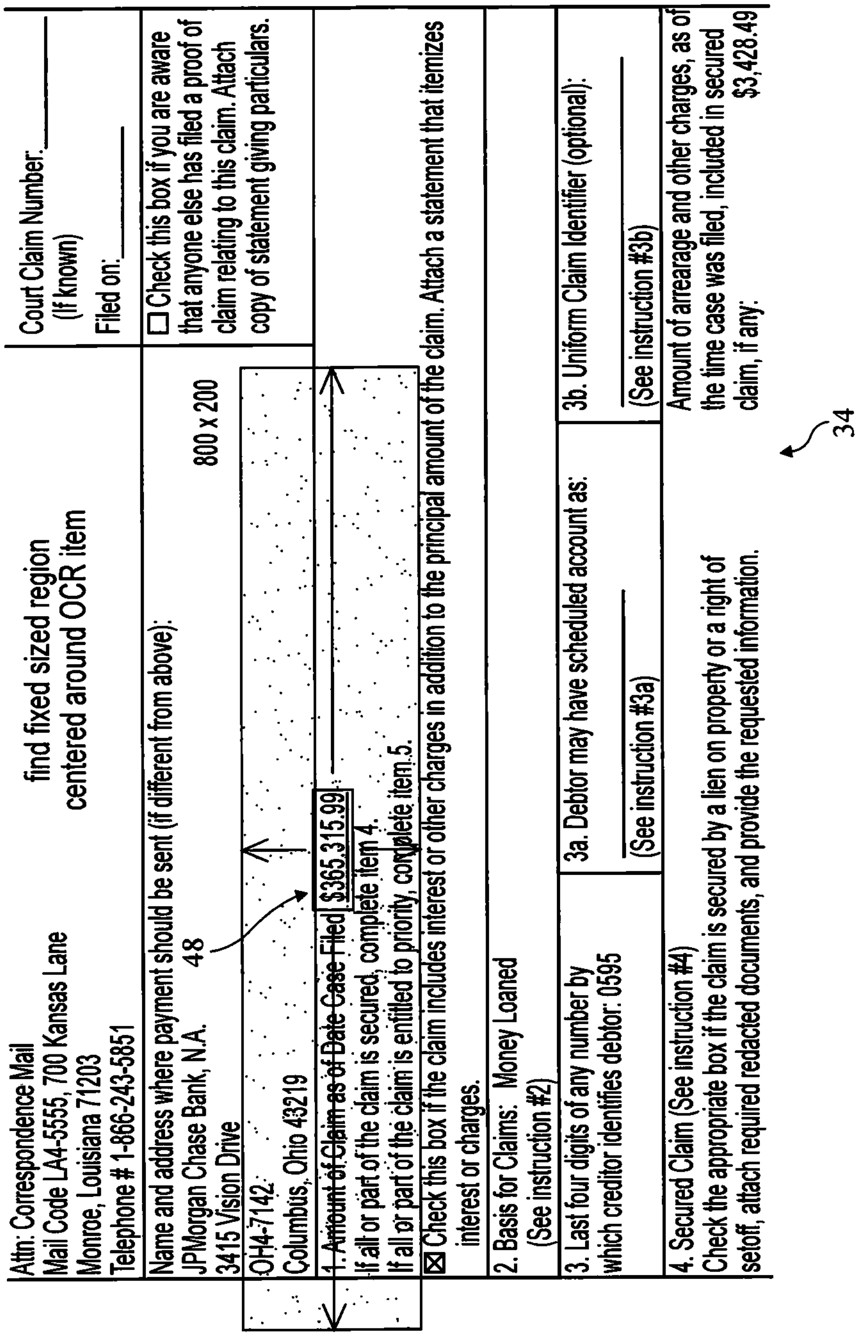
Figure 9E:
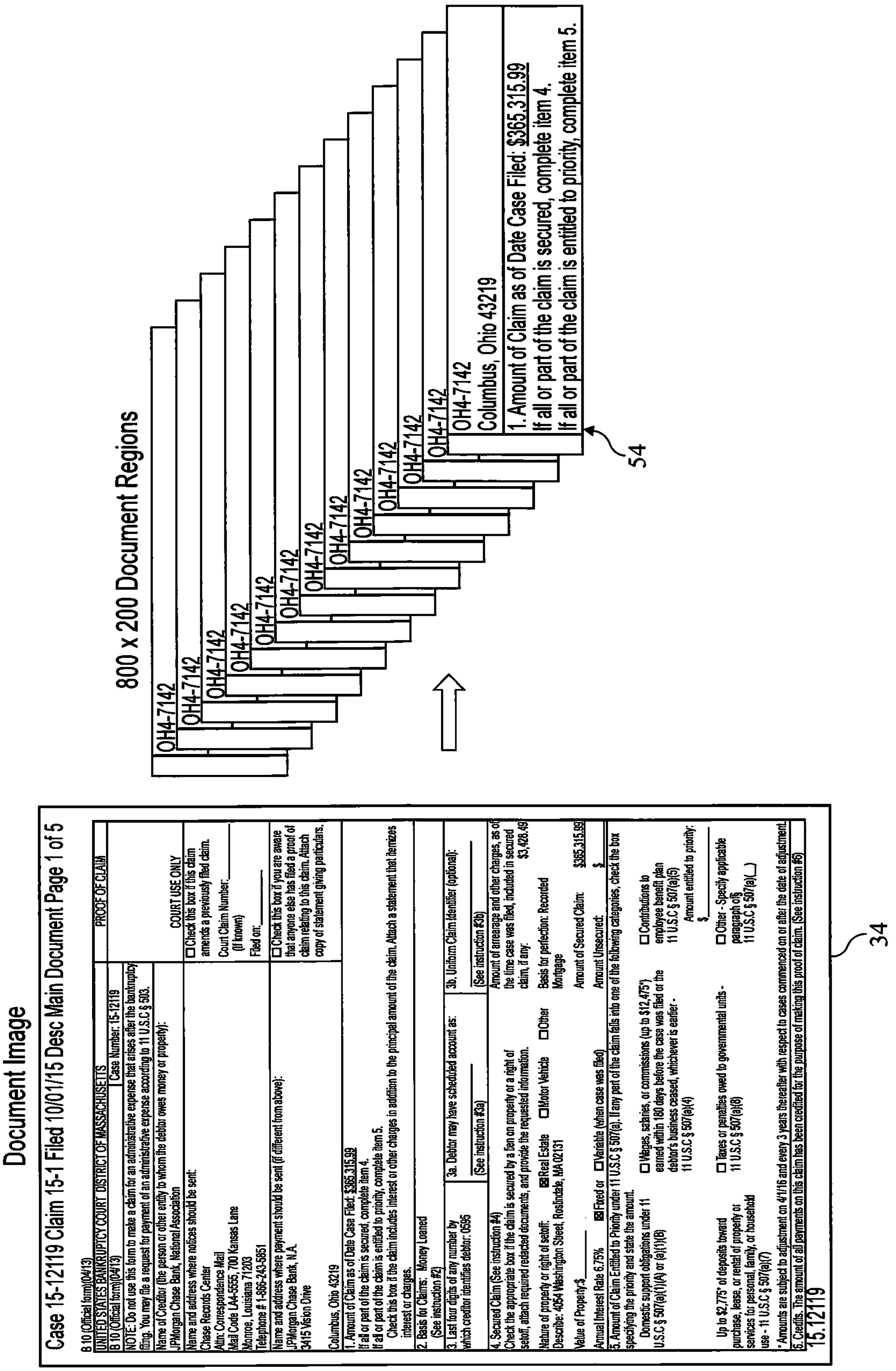
Figure 9F:
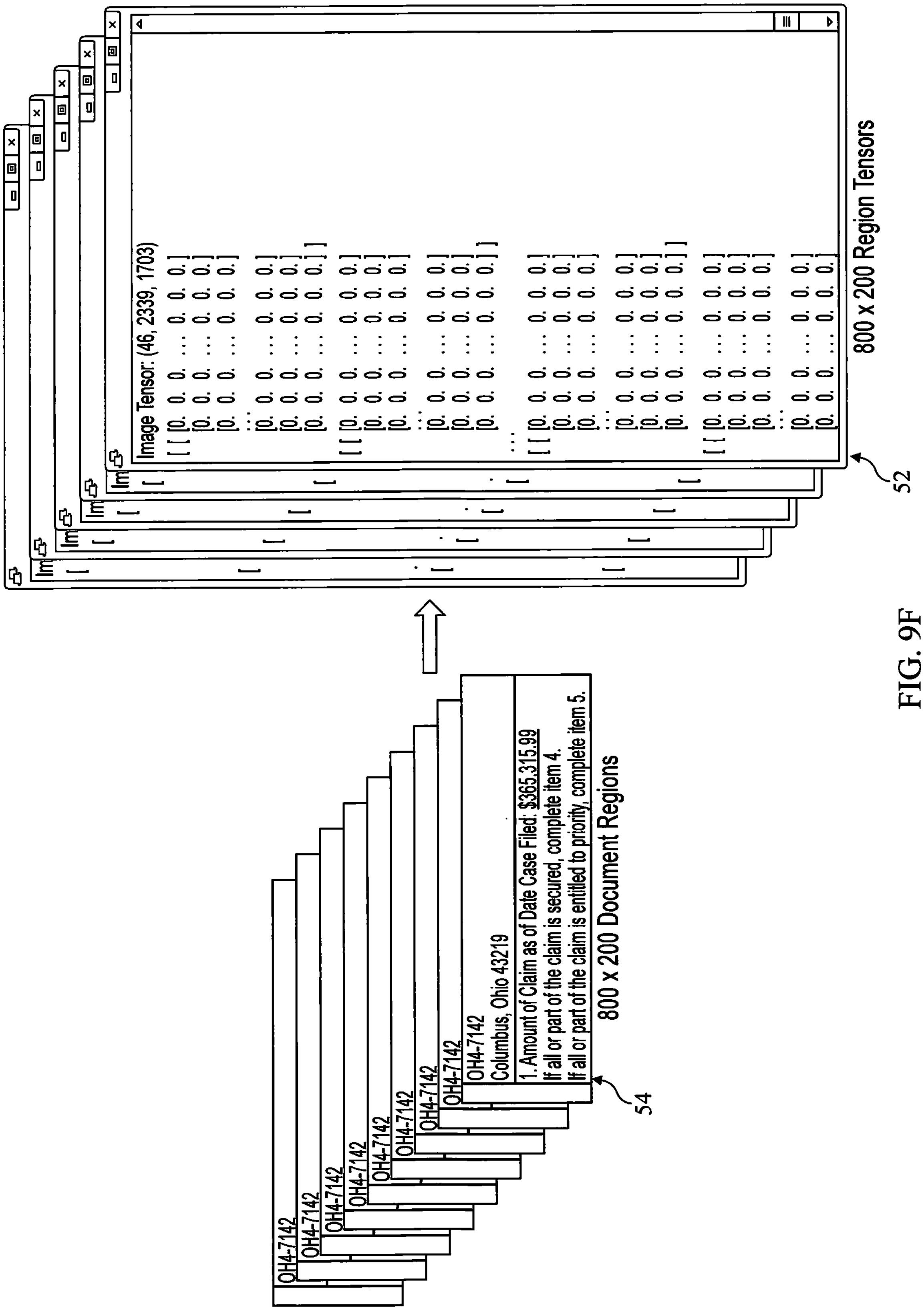

At step 112, the text extraction performed at step 108 is used to adjust the region tensors 52 created at step 110. As illustrated by FIGS. 9A to 9F, this can be performed, for example, by locating the text 48 extracted from the image at step 108, and by creating a fixed region 54 centered around that text 48. In FIG. 9C, the system 10 has focused on financial amount text (here, the financial amount of "$365, 315.99"). In FIG. 9D, a fixed region 54 (e.g., an 800×200 fixed region) is formed around the text 48. The boundaries of the fixed region 54 can be saved as text coordinate data. As illustrated by FIGS. 9E and 9F, the region tensors 52 created at step 110 can then be adjusted based on the size of the fixed region 54. Specifically, the region tensors 52 created at step 110 can then be updated and/or adjusted based on the text coordinate data. The region tensors 52 can then be stored for later use as feature vectors for training the extraction algorithm EA using various machine learning techniques.

Figure 10A:
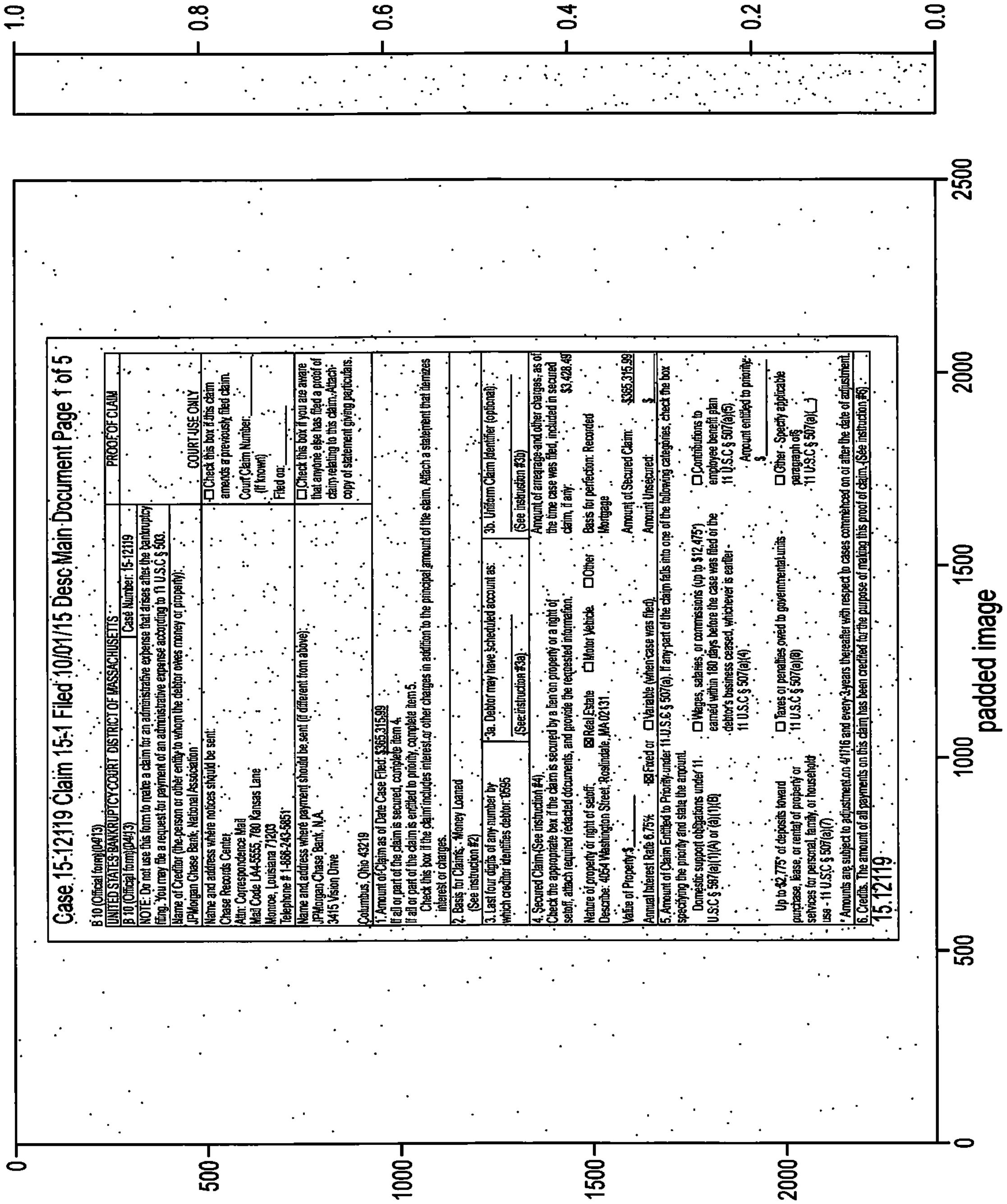
FIGS. 10A to 10C illustrate an example embodiment of text recognition phase extraction which can be performed during the method of FIG. 3.
Figure 10B:
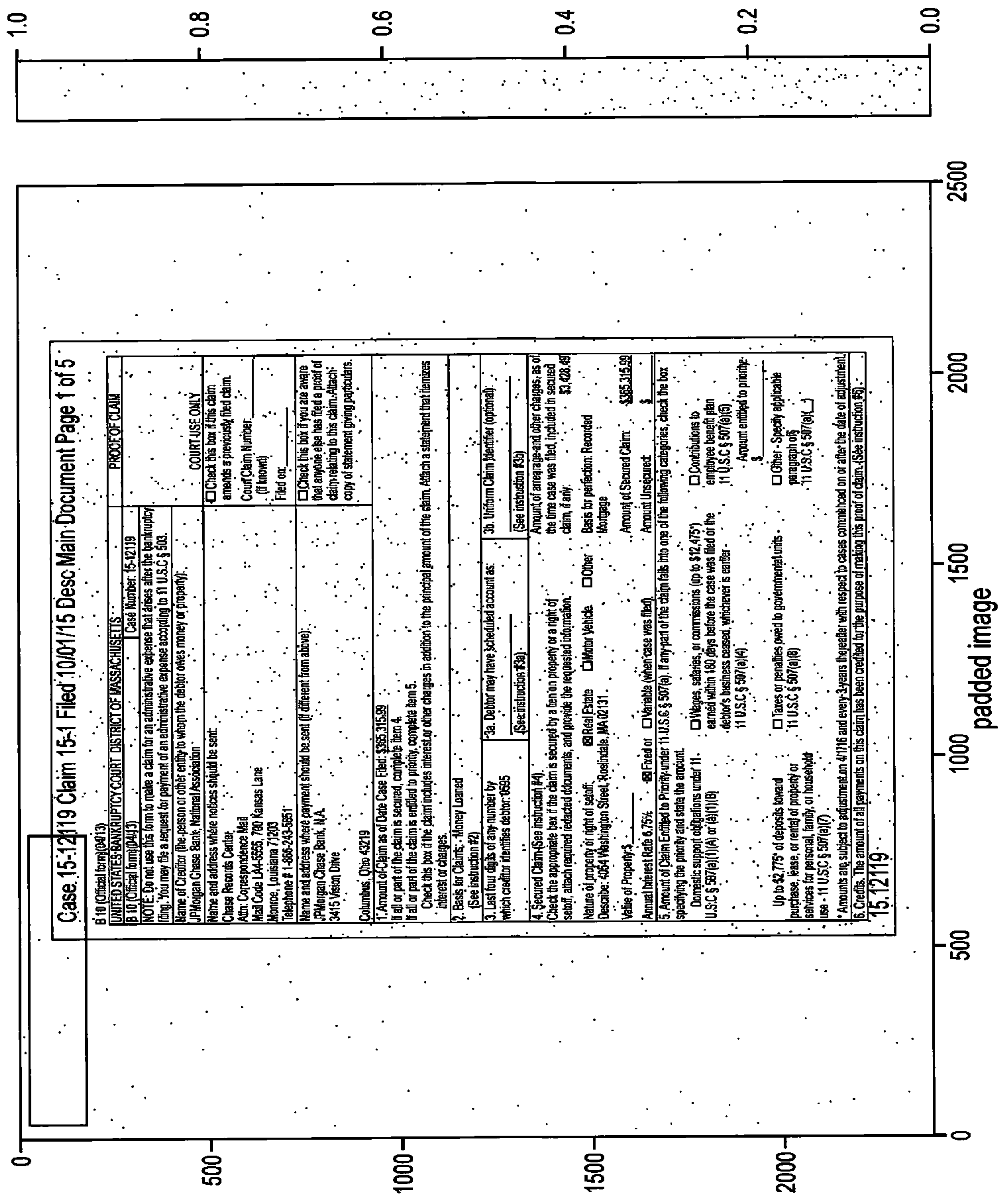
Figure 10C:
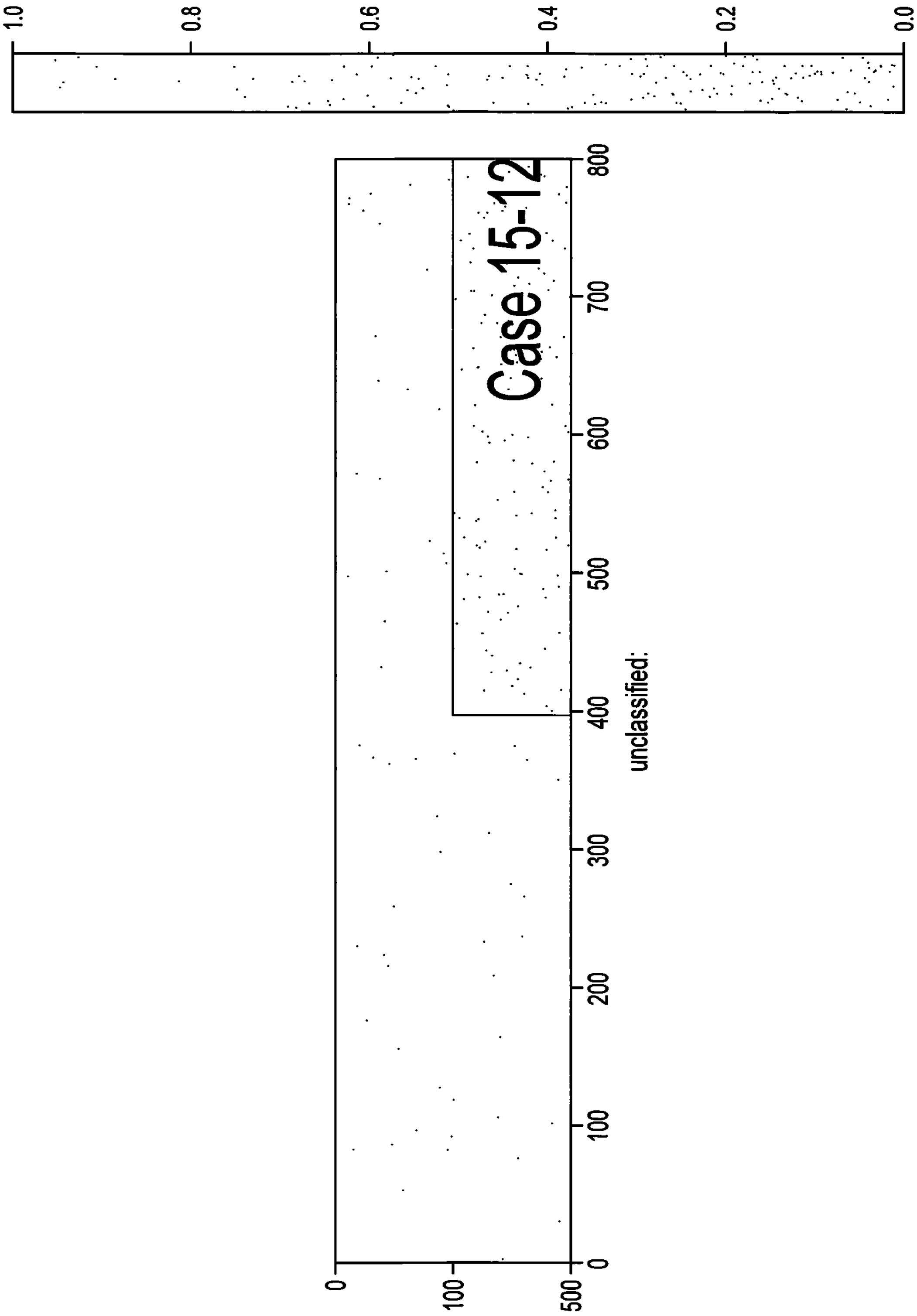

At step 114, a text recognition (e.g., OCR) phase extraction is performed. The text recognition phase extraction can be performed in any suitable manner as understood in the art (e.g., using a padded image). FIGS. 10A to 10C illustrate an example embodiment of text recognition phase extraction which can be performed at step 114. The text recognition phase extraction can be performed using the text coordinate data from step 112.

Figure 11A:
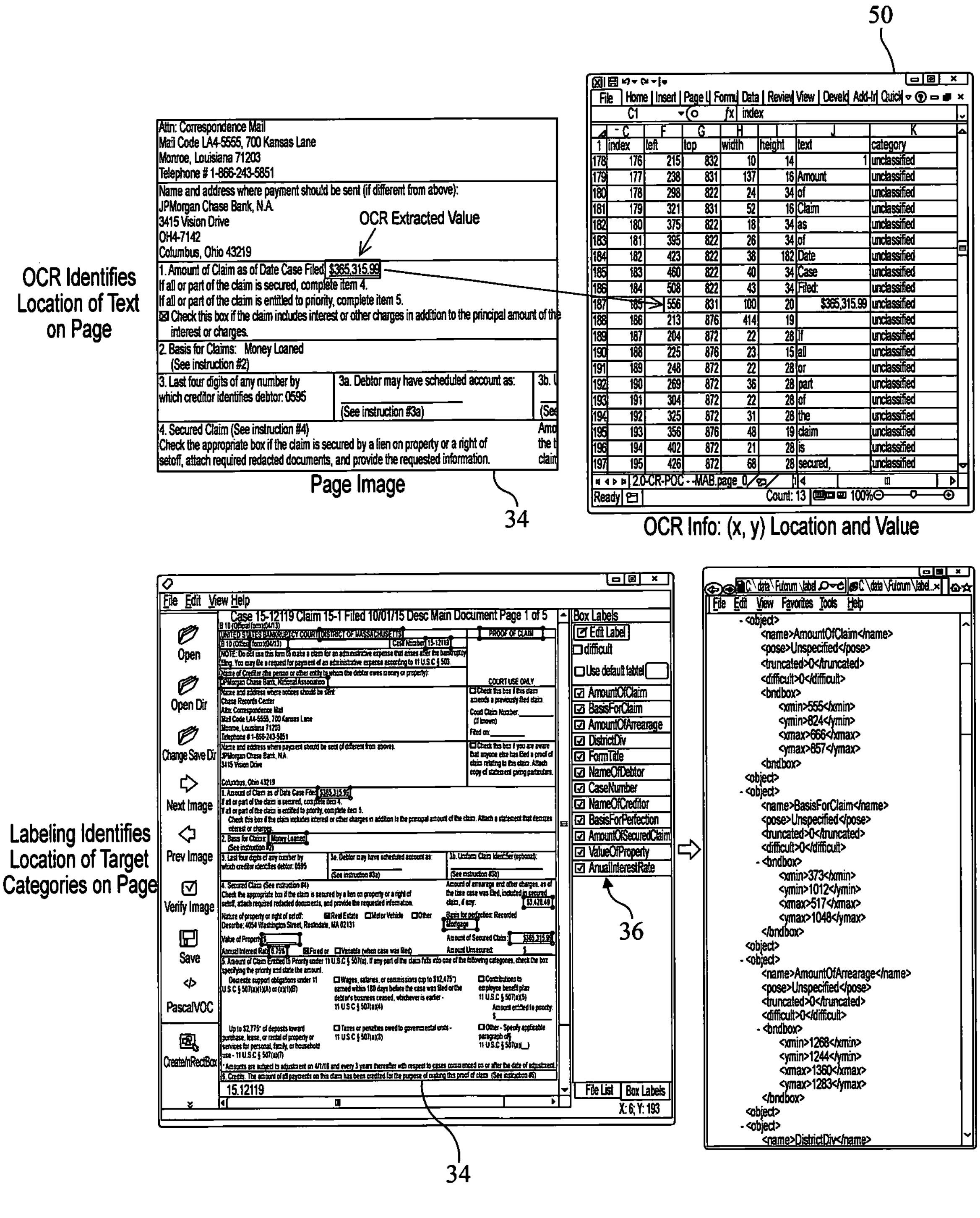
FIGS. 11A to 11G illustrate an example embodiment of creation of a label tensor which can be performed during the method of FIG. 3.
Figure 11B:
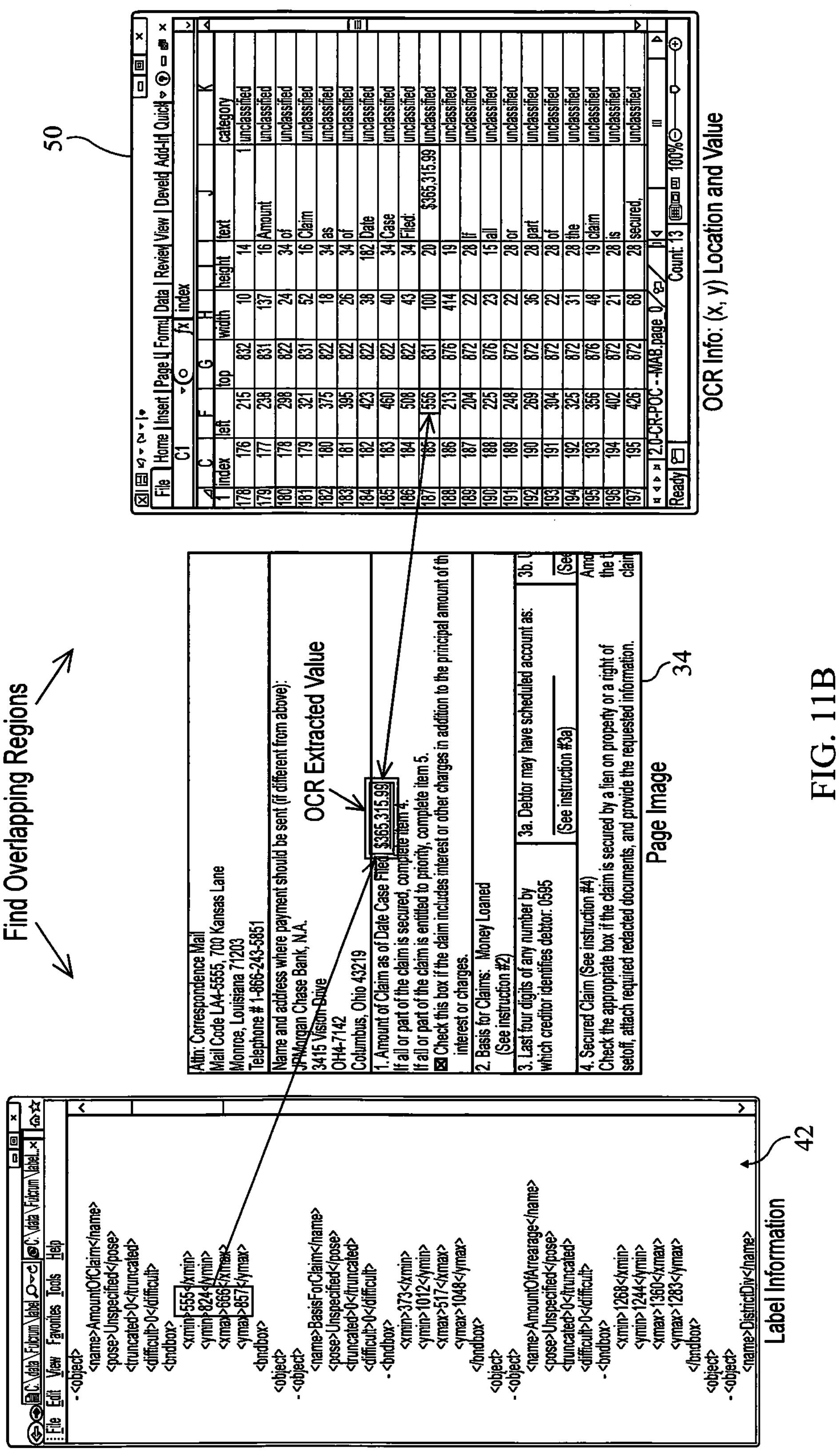
Figure 11C:
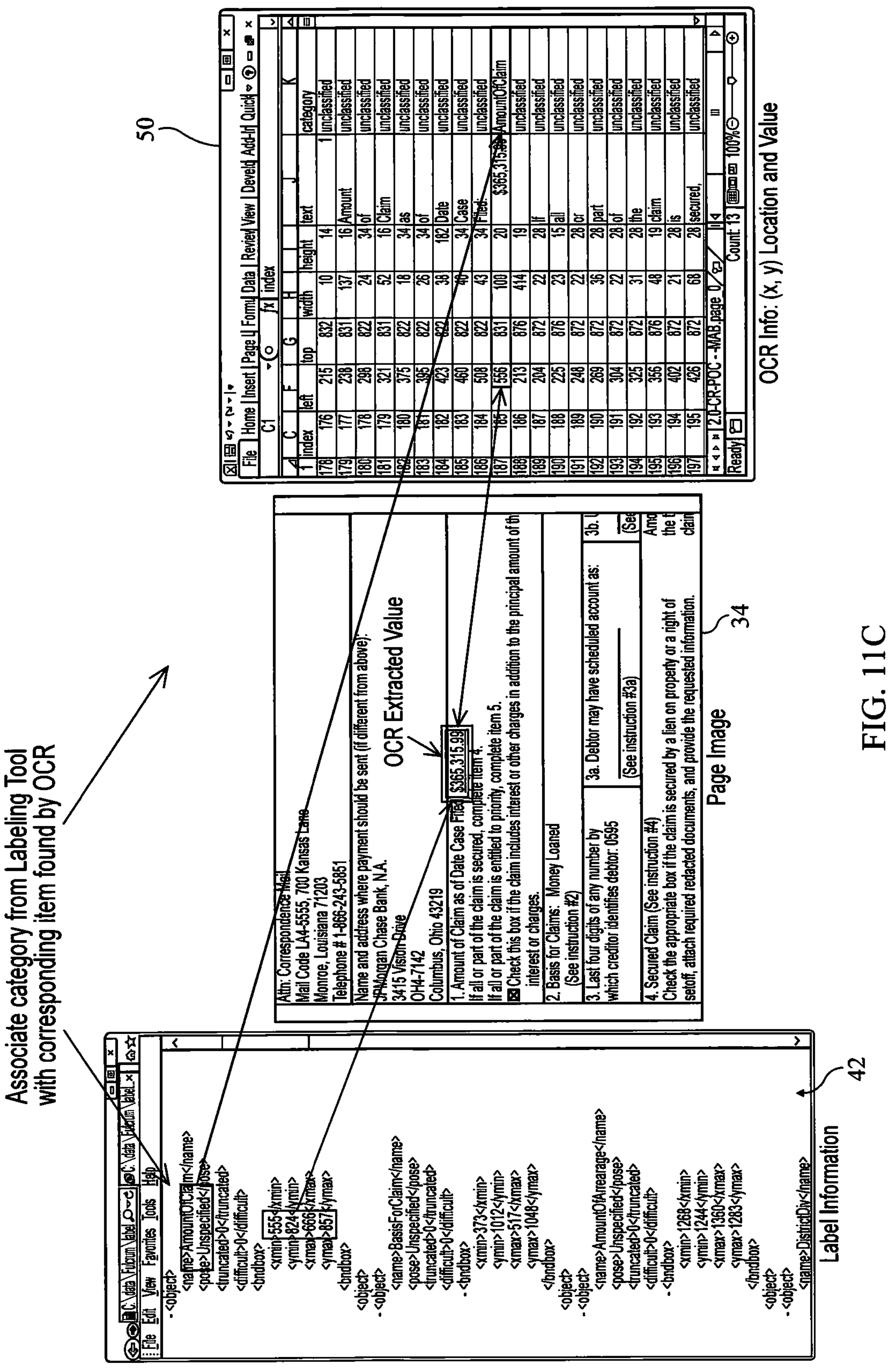
Figure 11D:
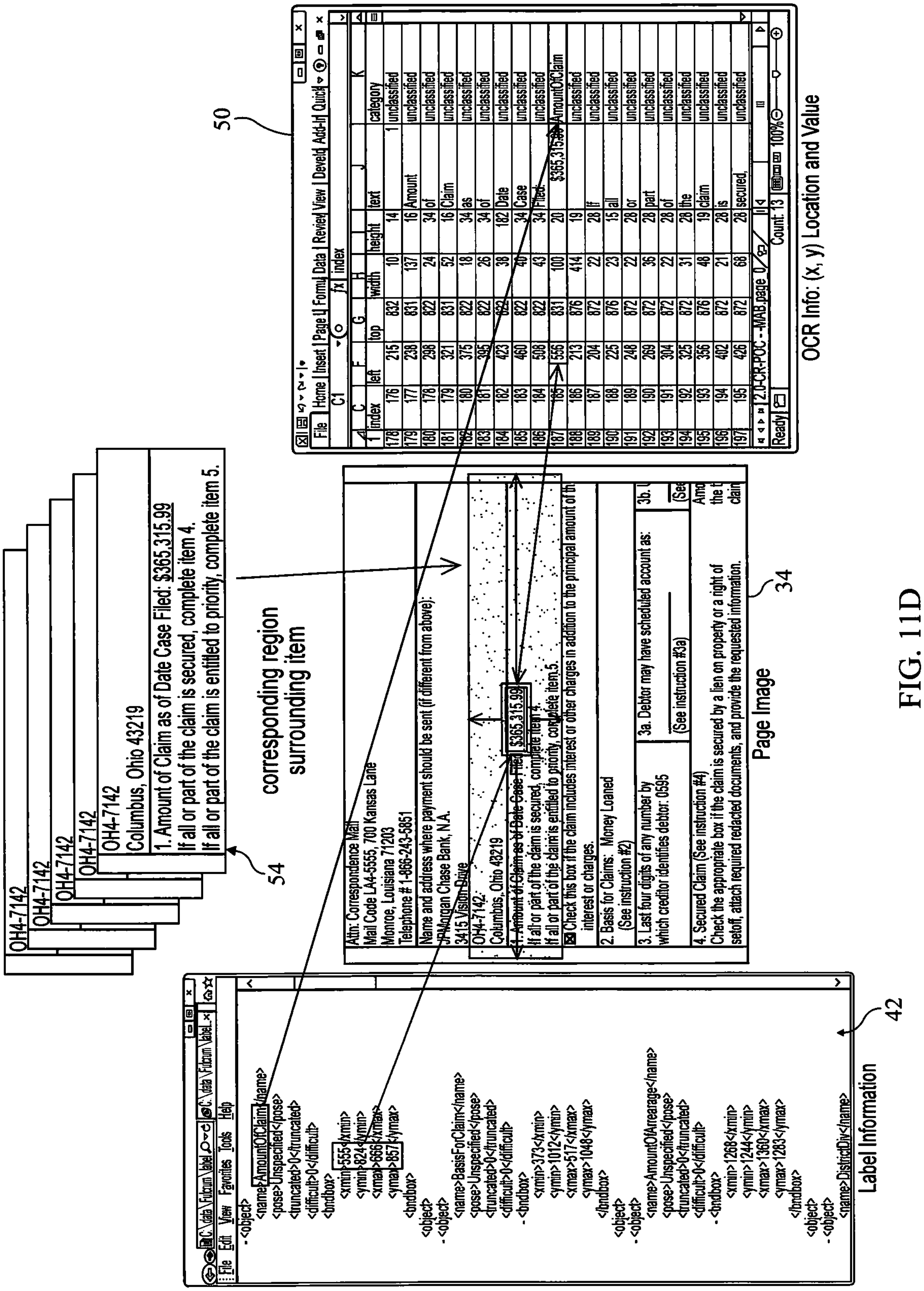
Figure 11E:
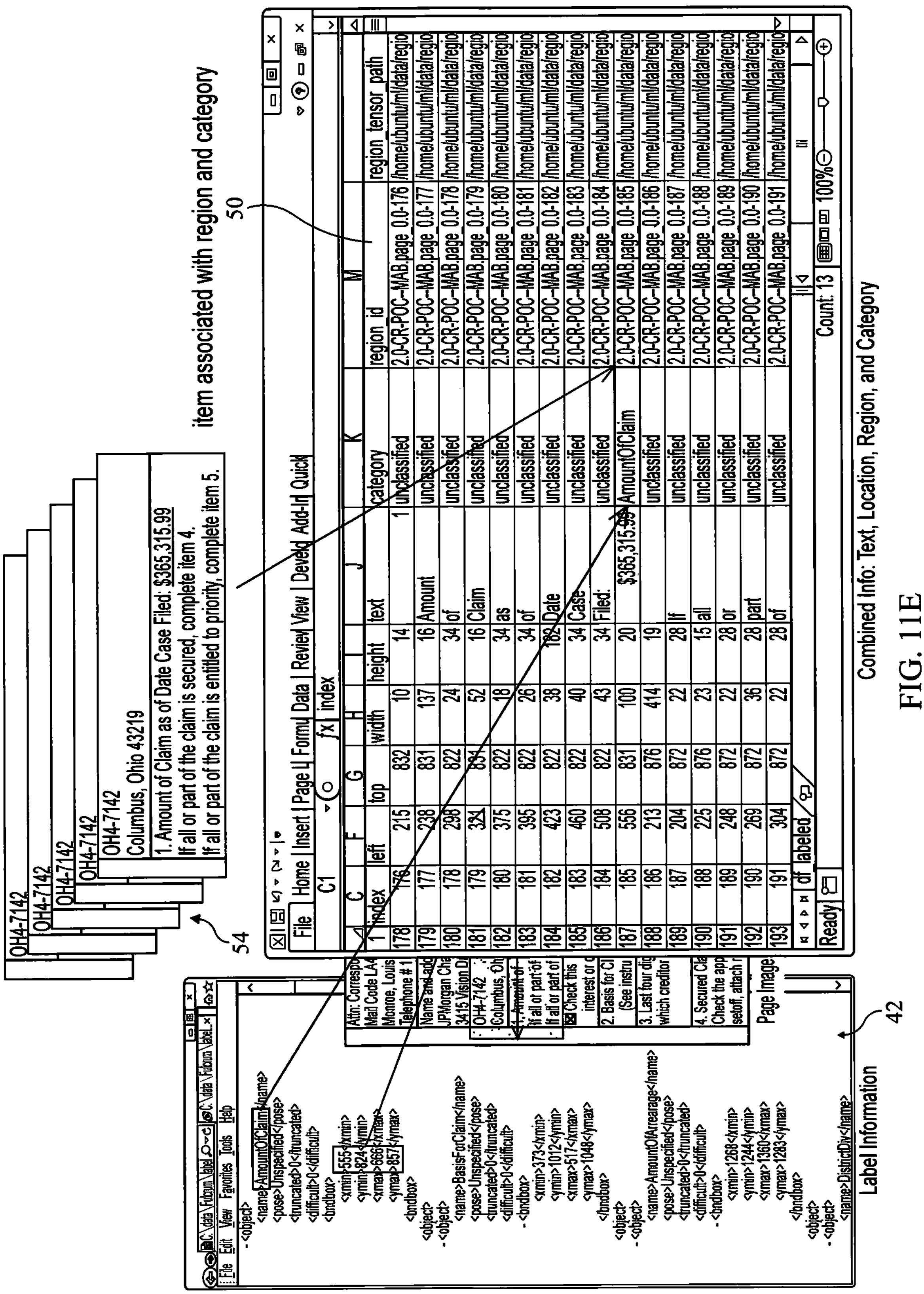
Figure 11F:
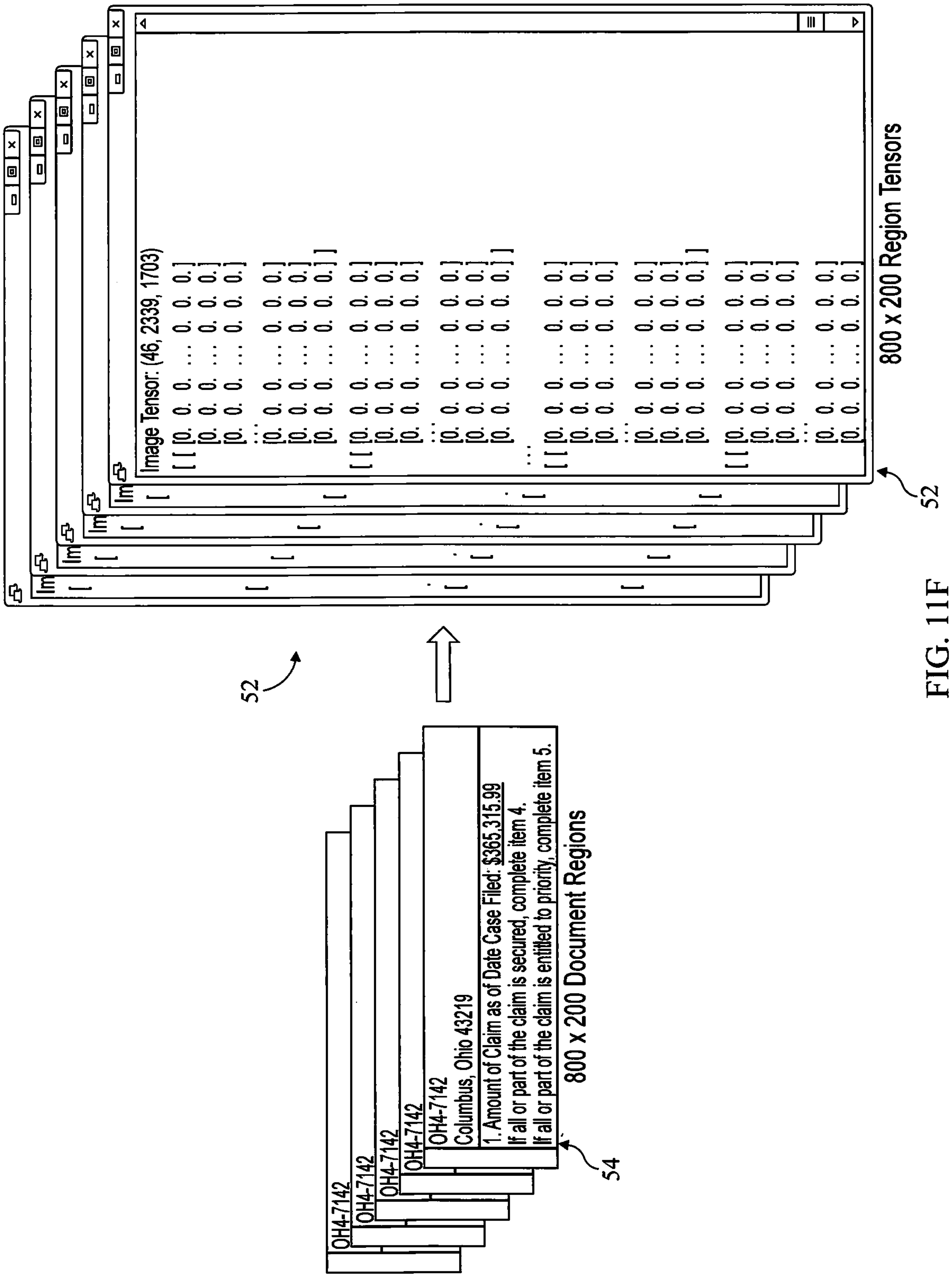
Figure 11G:
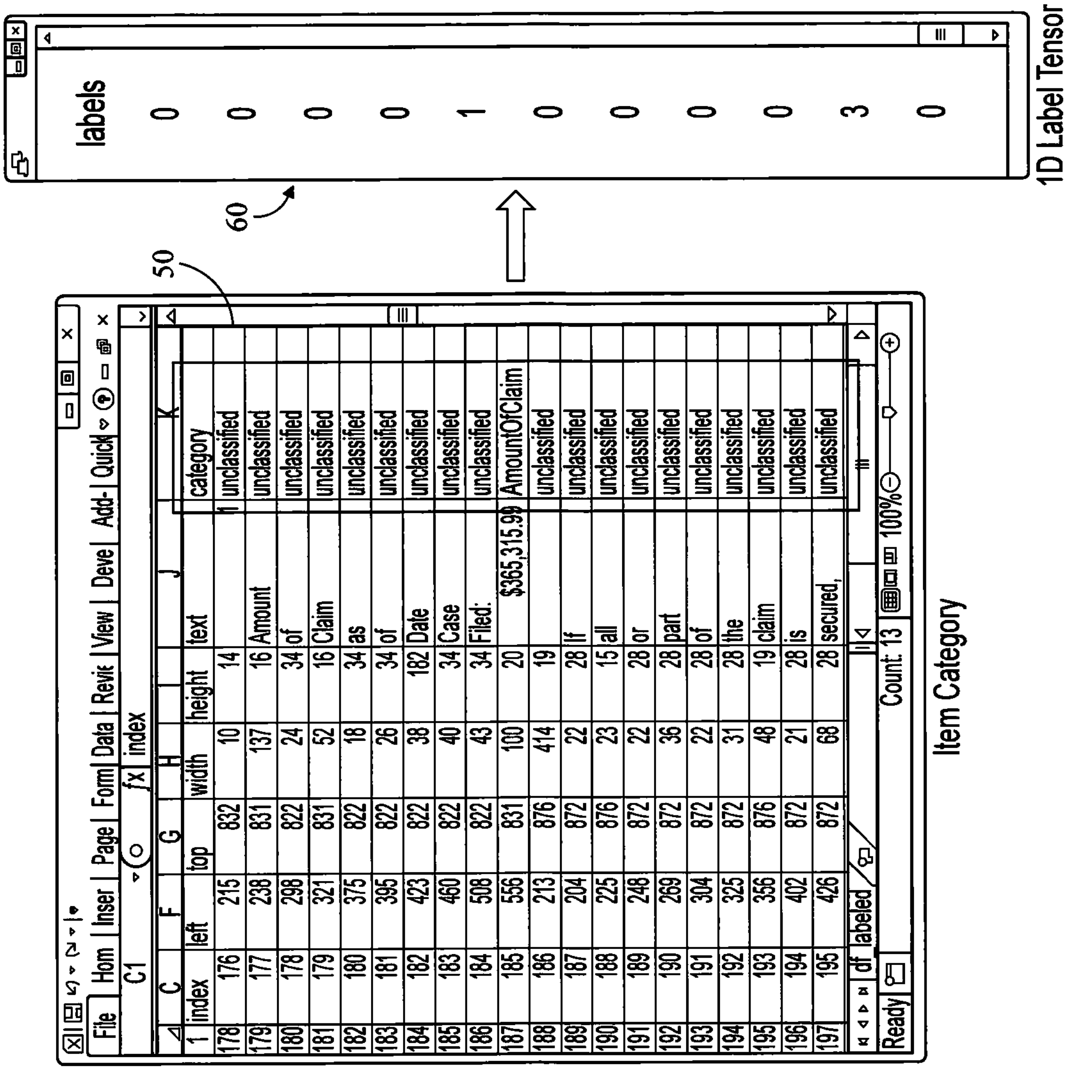

At step 116, the results of steps 106, 112 and/or 114 are merged to create label tensors 60. As illustrated by FIG. 11A, the text and/or phase extraction performed at steps 108 and/or 114 has enabled identification of text coordinate data (i.e., the location) of important text on a page, while the labeling performed at step 106 has identified label coordinate data (i.e., the location) of one or more target category (e.g., label 36) on the page. As illustrated by FIG. 11B, the controller 14 then uses this coordinate data to identify the overlapping regions which have been identified by X and Y coordinates. That is, each of the text coordinate data and the label coordinate data have been assigned X and Y coordinates which designate fixed areas within the image 34, and the system 10 is configured to determine overlapping regions of common coordinates. As illustrated by FIG. 11C, each target category (e.g. label 36) can then be associated with the corresponding extracted text 48. In an embodiment, the controller 14 is configured to then list the label 36 and corresponding extracted text 48 in the same database as shown. Here, the controller 14 has added the label 36 to the document 50 previously created for the extracted text 48. As illustrated by FIGS. 11D and 11E, the corresponding region 54 created at step 112 can then be associated with the label 36. In an embodiment, the corresponding region 54 can be listed in the same database 50 as the label 36 and corresponding extracted text 48 as shown. As illustrated by FIGS. 11F and 11G, the system 10 has stored the region tensors 52 created at step 112 (FIG. 11F), and is configured to further create label tensors 60 based on the combined information from step 116 (FIG. 11G). In FIG. 11G, the label tensor 60 is a one-dimensional data matrix showing where text in the image has been assigned a specific label 36 (here, e.g., the number "1" corresponding to the "AmountofClaim" document entry).

Figure 12A:
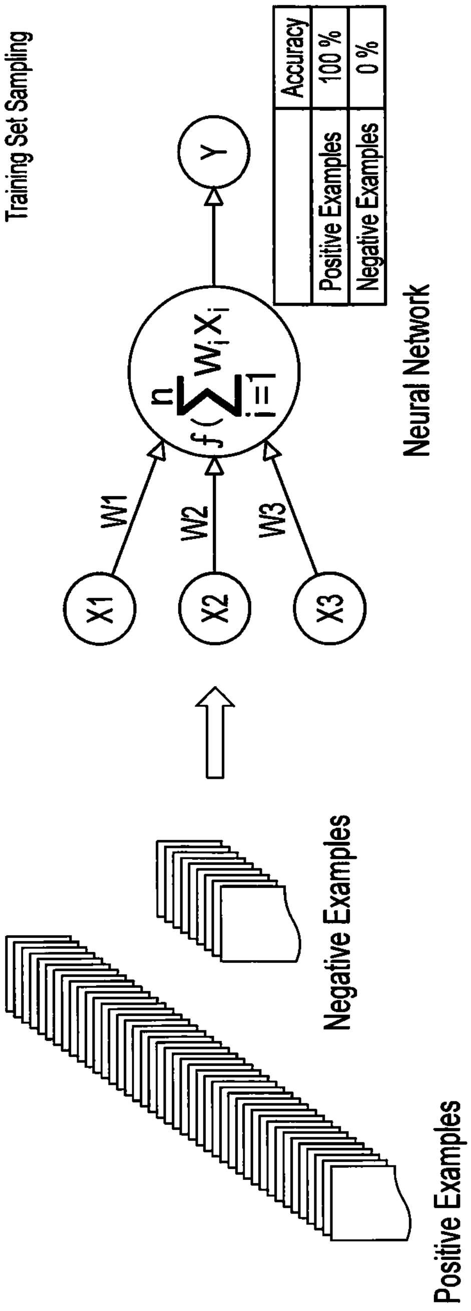
FIGS. 12A and 12B illustrate an example embodiment of algorithm training preparation which can be performed during the method of FIG. 3.
Figure 12B:
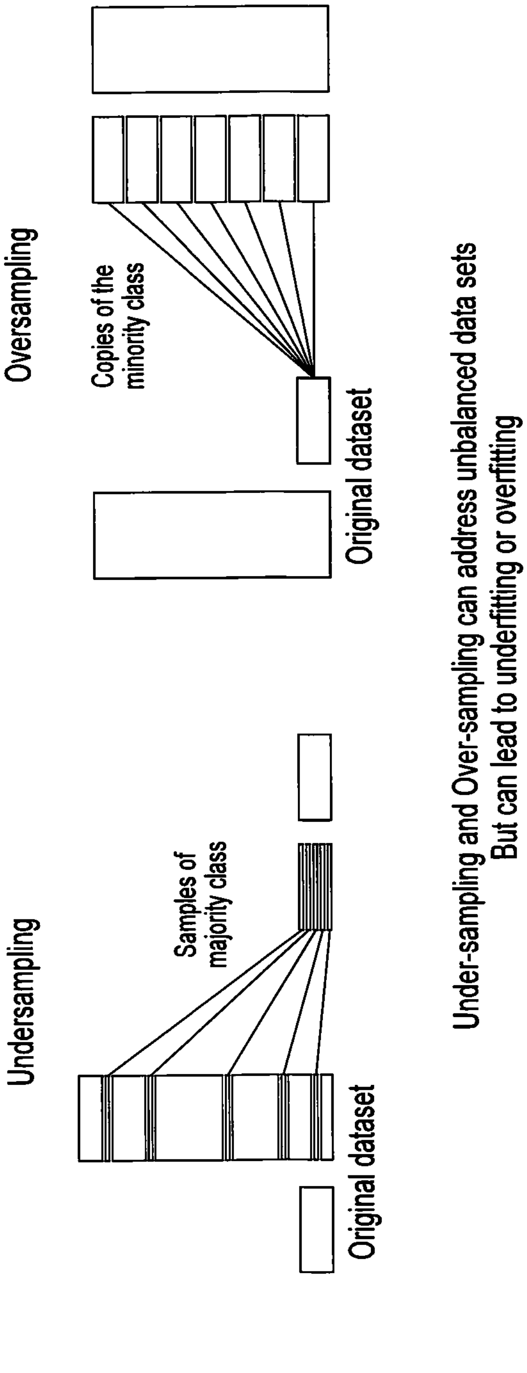

At step 118, the system 10 prepares the region tensors 52 and label tensors 60 to be used to train the algorithm EA. More specifically, the system 10 prepares the region tensors 52 and label tensors 60 to be used as inputs to train the algorithm EA. Here, each pair of tensors 52, 60 for a document 30 (e.g., a region tensor 52 and a corresponding label tensor 60) can be considered a dataset (e.g., an "example" or "dataset" in FIGS. 12A and 12B, respectively). The controller 14 is configured to divide the datasets from a plurality of documents 30 into training sets and test sets. For example, 60-90% of the datasets can be moved into a training set category which is used to train the extraction algorithm EA, while the remaining 10-40% of the datasets can be moved into a test set category which is used to test the trained extraction algorithm EA to ensure that the training was successful.

At step 120, the controller 14 trains the algorithm EA using the training set including separate datasets each including a region tensor 52 and a corresponding label tensor 60. The controller 14 is configured to train the extraction algorithm EA, for example, using machine learning techniques such as neural network training The neural network being trained can be, for example, a convolutional neural network.

Figure 13A:
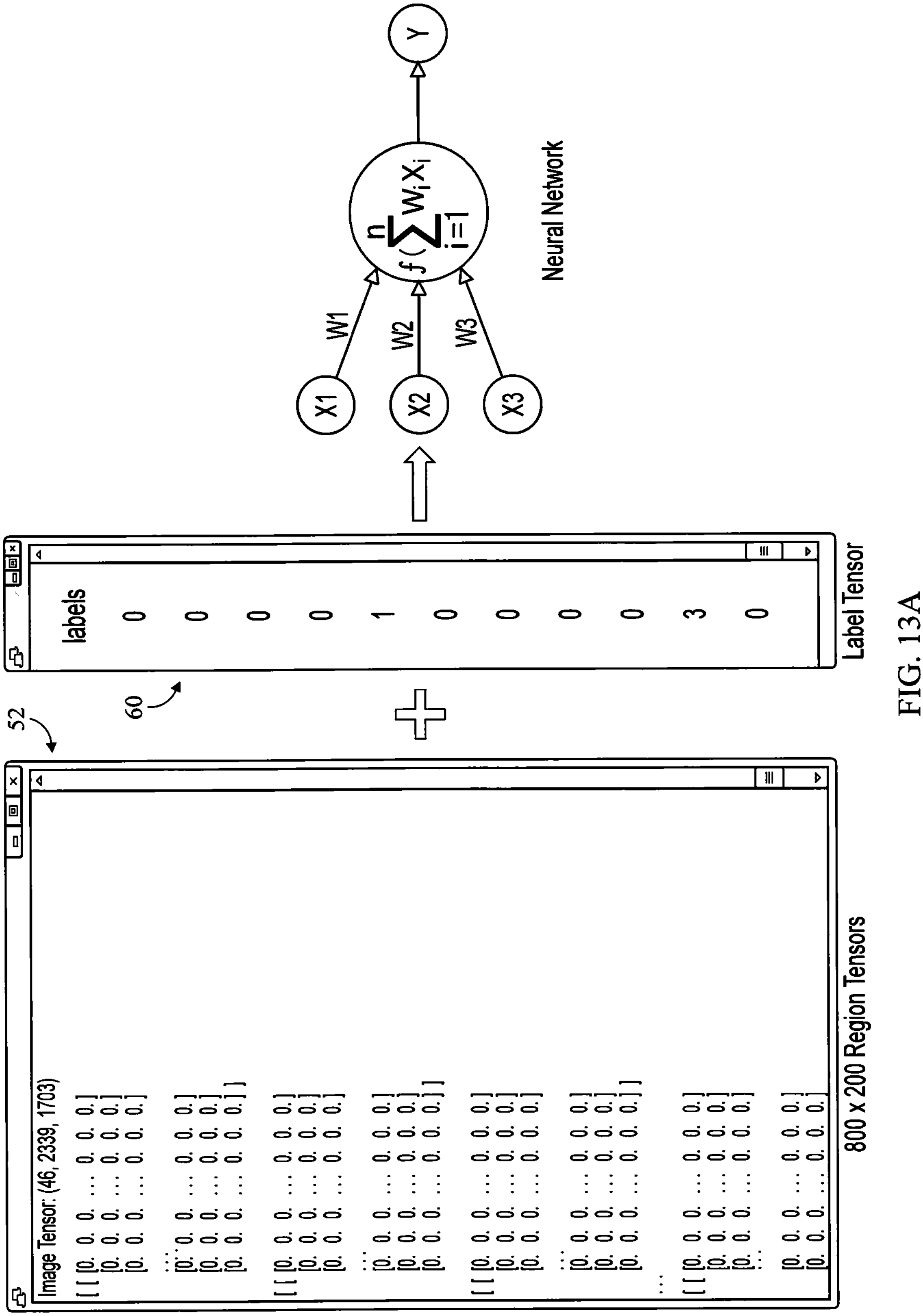
Figure 13B:
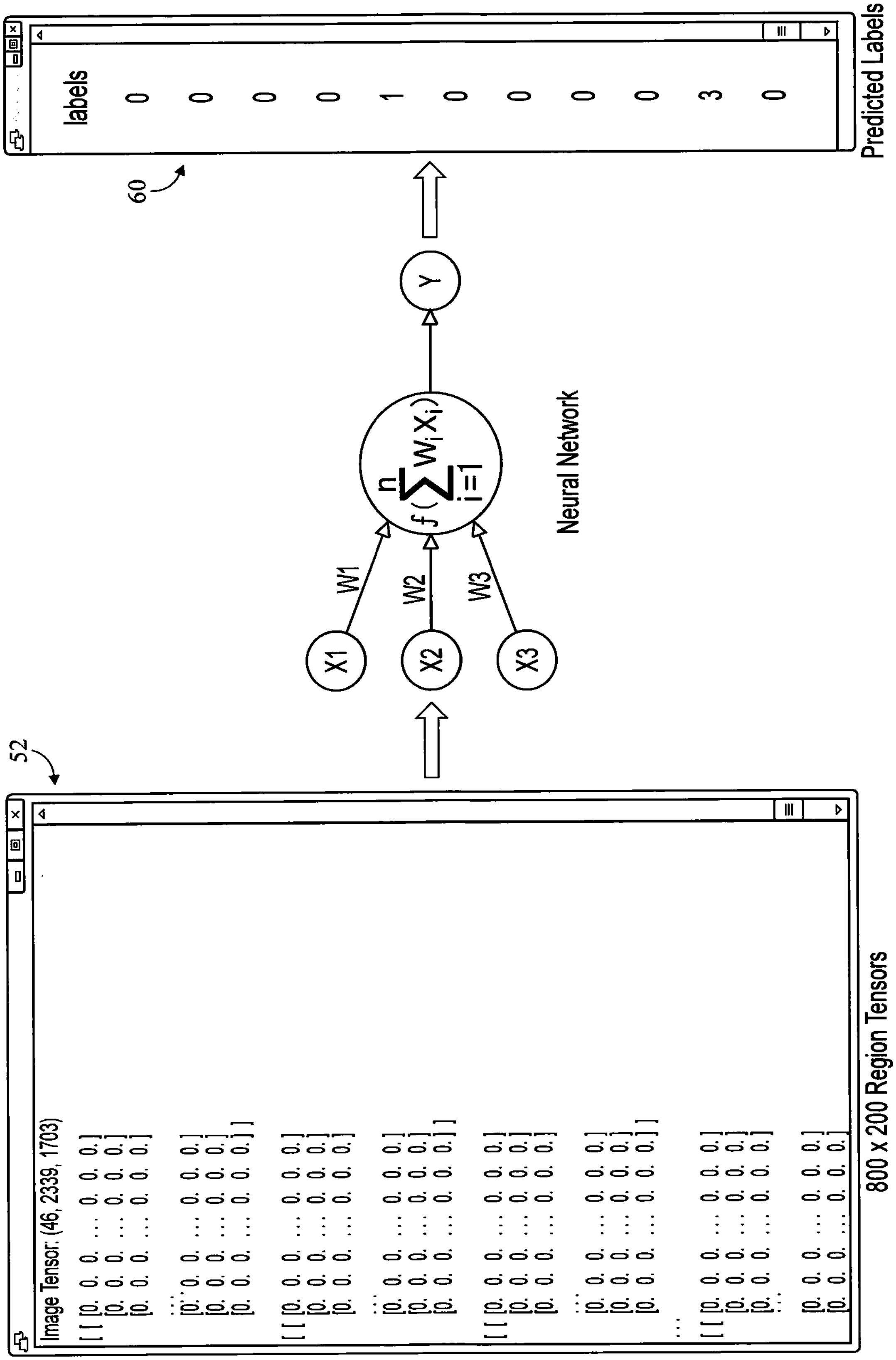
Figure 13D:
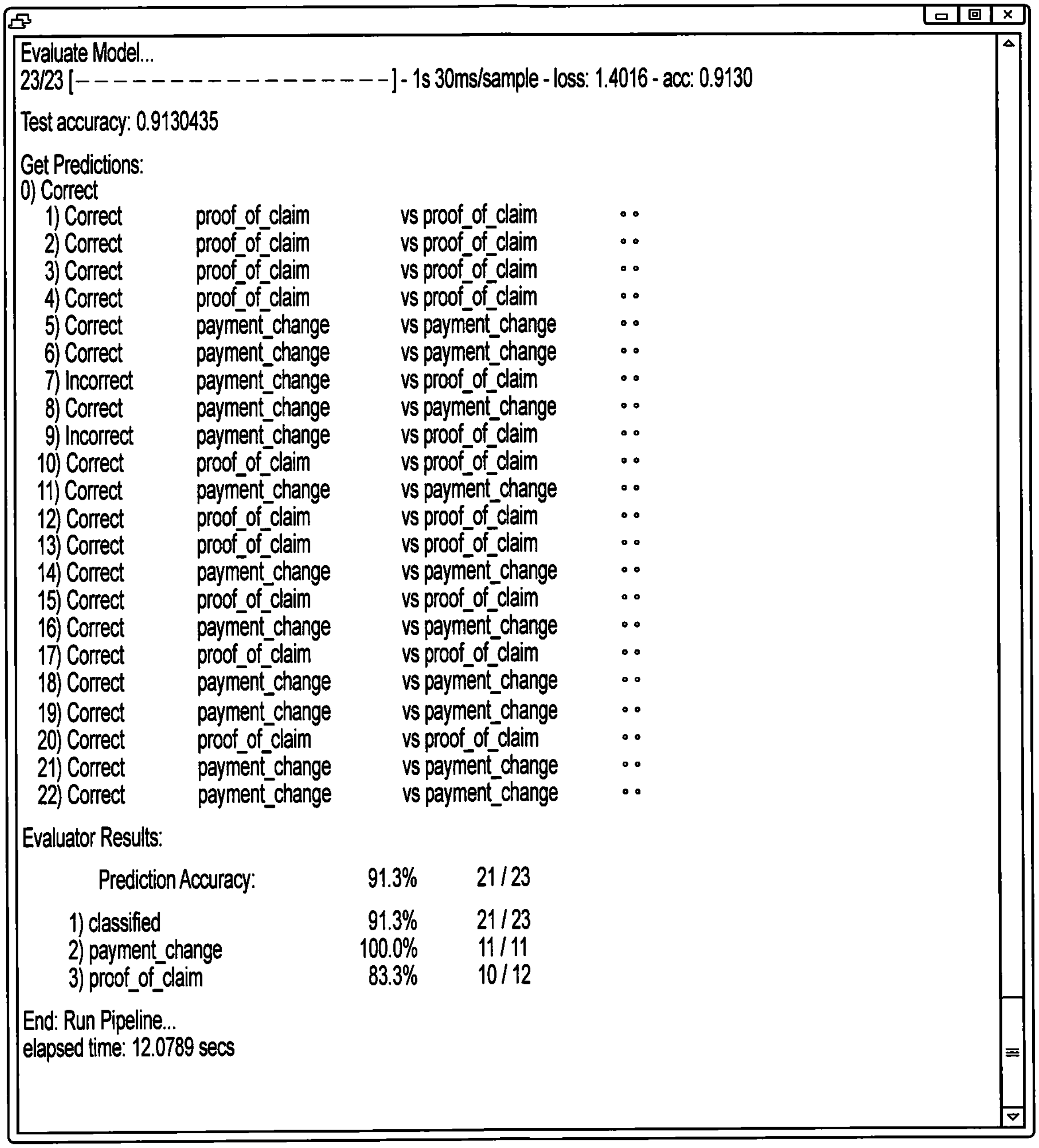

As illustrated by FIG. 13A, the region tensors 52 and the label tensors 60 can be used as inputs to train the extraction algorithm EA (e.g., to train the neural network). As illustrated in FIG. 13B, the algorithm EA is trained to, in the future, use an inputted region tensor 52 to then output a label tensor 60. FIGS. 13C to 13G illustrate an example embodiment of such training. Once the extraction algorithm EA has been trained, the controller 14 is configured to test the extraction algorithm EA using the test set from step 118, for example, by inputting the region tensors 52 from the test set as inputs into the trained extraction algorithm EA and then determining whether the trained extraction algorithm EA outputs the correct corresponding label tensors 60.

In an embodiment, the extraction algorithm EA can be trained as a K-nearest neighbors (KNN) algorithm. A KNN algorithm is an algorithm that stores existing cases and classifies new cases based on a similarity measure (e.g., distance). A KNN algorithm is a supervised machine learning technique which can be used with the data created using the method 100 because KNN algorithms are useful when data points are separated into several classes to predict classification of a new sample point. With a KNN algorithm, the prediction can be based on the K-nearest (often Euclidean distance) neighbors based on weighted averages/votes.

At step 122, the extraction algorithm EA can then be applied to additional documents 30, for example, from the current database 18. The additional documents 30 can also be from the legacy database 16. The controller 14 is configured to place the target data 32 extracted from the additional documents 30 into a single database, for example, the database 70 shown in FIGS. 14A and 14B. As illustrated, the database 70 can include a document such as a spreadsheet summarizing the target data 32. Here, due to use of the extraction algorithm EA, the system 10 is configured to find target data 32 within a document 30 and label that data in a way that can be quickly and easily viewed by a user using the user interface 12. In various embodiments, the extraction algorithm EA can be trained to classify documents 30, to classify entities and extract values, and/or to generate a spreadsheet containing the extracted values and categories.

Figure 15:
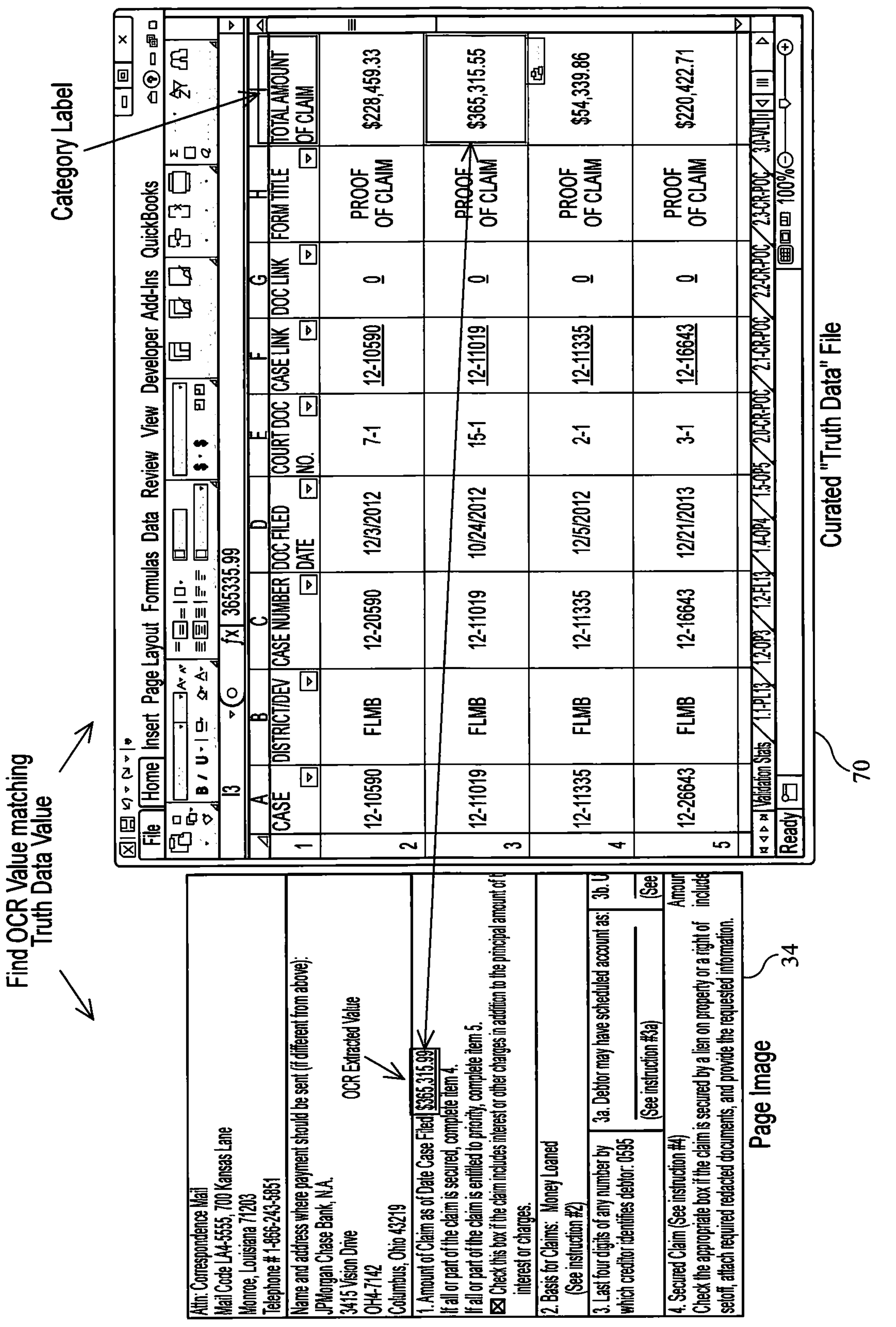
FIG. 15 illustrates another example embodiment of database creation which can be performed during the method of FIG. 3.

As illustrated in FIG. 15, in creating a database 70, the extraction algorithm EA can use the category label 36 as a column heading. The extraction algorithm EA can then fill in the extracted data 32 (e.g., the financial amount) in FIG. 15.

Figure 16:
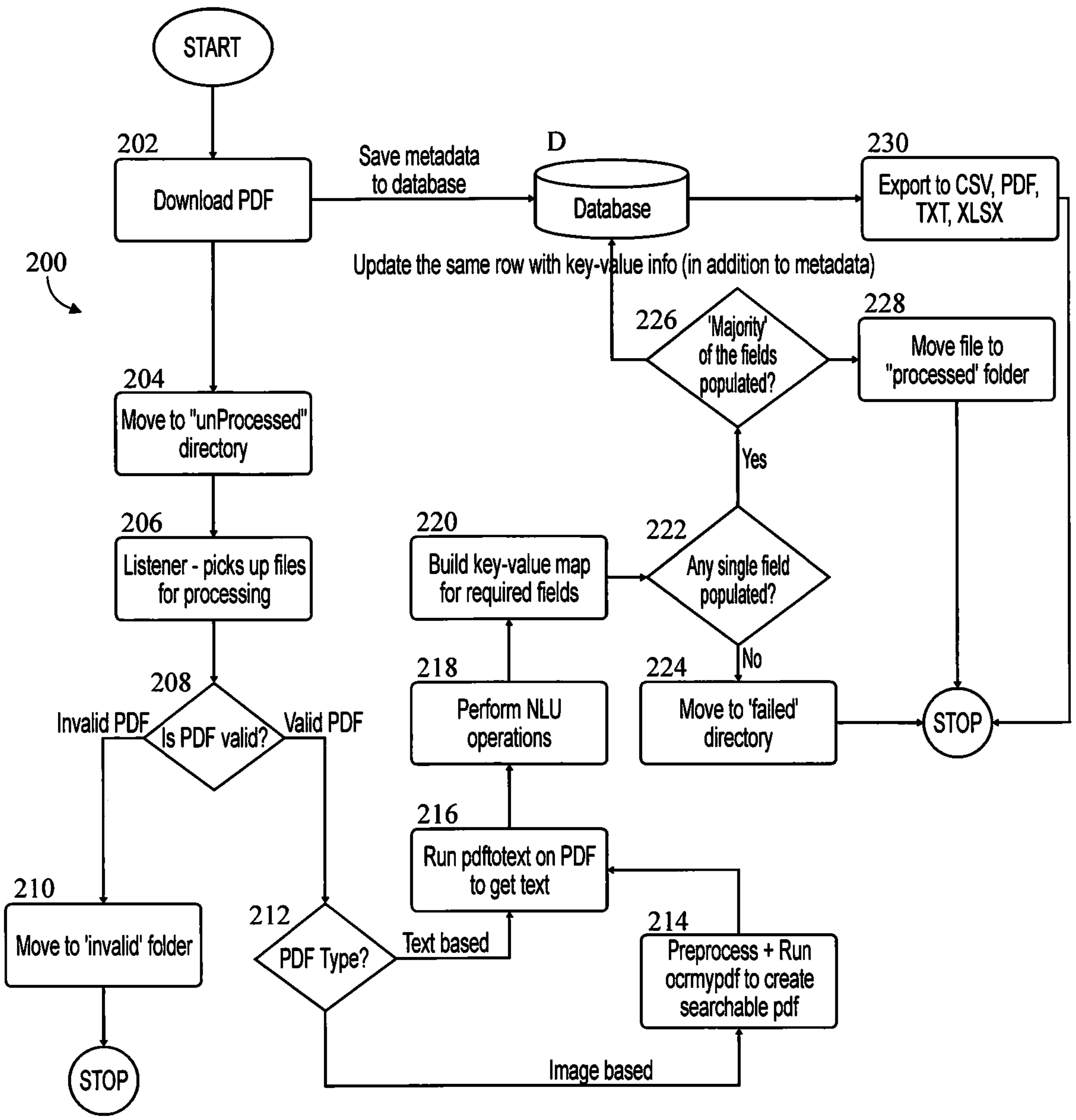
FIG. 16 illustrates another an example embodiment of a method for enabling target data to be extracted from a plurality of documents in accordance with the present disclosure.

FIG. 16 illustrates an alternative example embodiment of a method 200 for enabling target data to be extracted from a plurality of documents. More specifically, the method 200 can be used for building datasets to train the extraction algorithm EA. The steps of method 200 can be stored as instructions on the memory 22 and can be executed by the processor 20. It should be understood that some of the steps described herein can be reordered or omitted without departing from the spirit or scope of method 200. One or more of the steps of method 200 can further be combined with one or more of the steps of method 100.

Like with method 100, method 200 begins with access to a database, for example, the legacy database 16 of system 10. Again, the legacy database 16 includes a plurality of documents 30, with each of those documents including target data 32. The target data 32 can be previously extracted or can be unknown at the beginning of method 200. The target data 32 can include, for example, a name, date, address, number, financial amount and/or other data listed in a document. Thus, in an embodiment, the legacy database 16 can include target data 32 such as names, dates, addresses, numbers, financial amounts and/or other data that have already been extracted from the documents stored therein. For example, the legacy database 16 can include a listing of the target data 32 (e.g., names, dates, amounts, addresses, etc.) and an indication of or link to the corresponding document 30 from which this information was extracted.

In the illustrated embodiment, the plurality of documents 30 in the database are in an initial format, e.g., a portable document format (PDF). Those of ordinary skill in the art will recognize from this disclosure, however, that there are other formats besides PDF that can benefit from the presently disclosed systems and methods. In another embodiment, the document 30 can include an HTML document.

At step 202, the documents 30 are downloaded, and the metadata associated therewith is saved to a database D, which can be a temporary database including a memory. The documents 30 can be downloaded, for example, from the legacy database 16. If the documents 30 are not in the correct format (e.g., PDF), they can also be converted to that format.

At step 204, the documents 30 are placed into an "unprocessed" directory to show that they have not yet been processed in accordance with method 200. In an embodiment, only "processed" documents 30 from method 200 will eventually be used to create a dataset to train the extraction algorithm EA.

At step 206, the controller 14 is configured to begin to process each of the documents 30.

At step 208, controller 14 determines whether each document 30 is valid or invalid based on the determination made at step 106. A document 30 can be invalid, for example, if the system 10 determines that the document 30 is not capable of being processed in accordance with method 200. If invalid, the document 30 is moved to an "invalid" folder at step 210.

If the document 30 is valid and thus capable of being processed in accordance with method 200, then the type of the document 30 is determined at step 212. In the illustrated embodiment, the document 30 is a PDF, and the type of the document 30 can be, for example, a text-based PDF (e.g., machine readable) or an image-based PDF.

Figure 17:
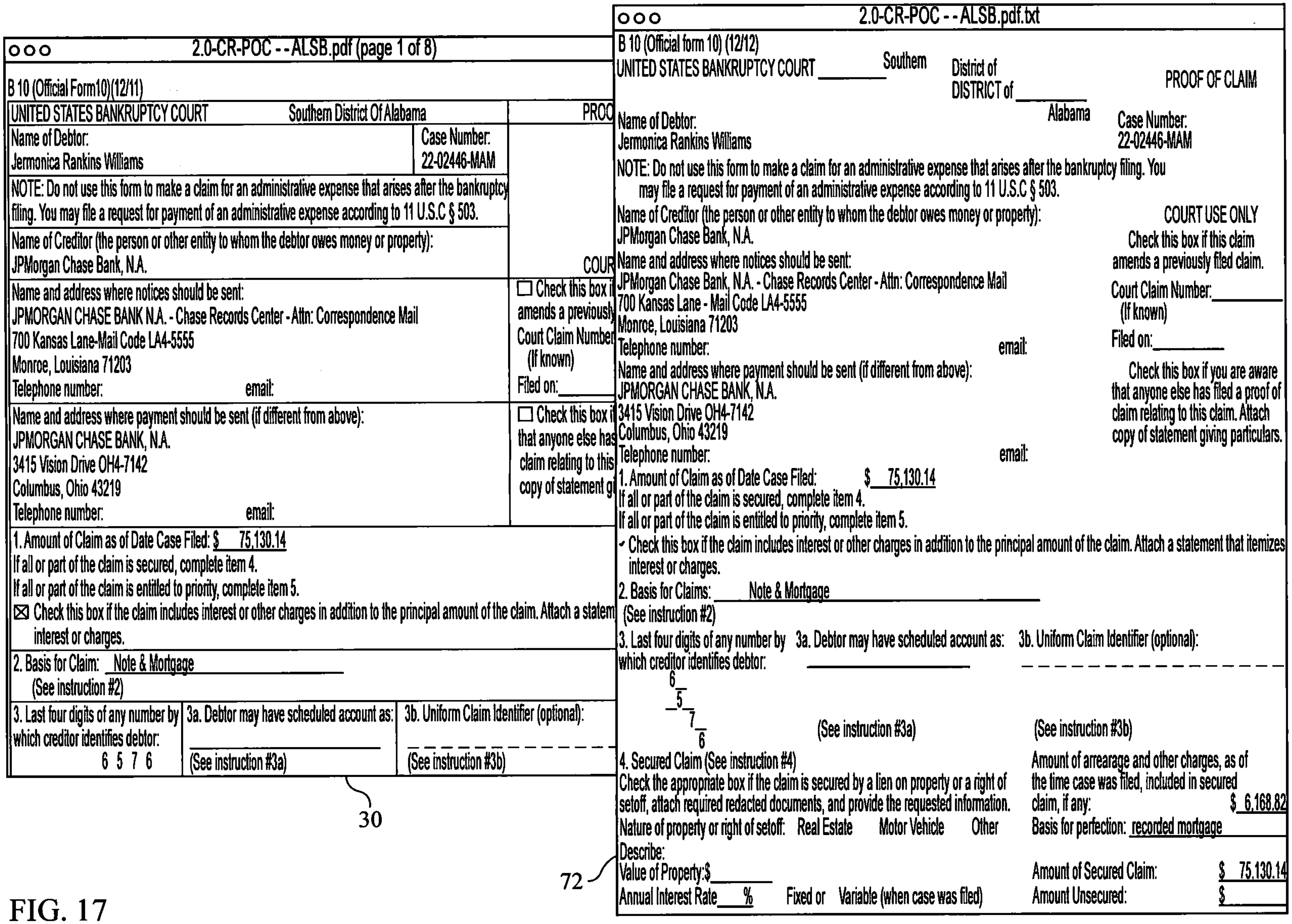
FIG. 17 illustrates an example embodiment of a text extraction which can be performed during the method of FIG. 16.

At step 214, if the controller 14 determines the document 30 to be image-based, then the system 10 performs a text extraction process. The text extraction is performed on the images, for example, using an optical character recognition (OCR) or other text extraction method. An example embodiment of step 214 is illustrated by FIG. 17. In example embodiments, the OCR can be performed using Tesseract and/or Apache TiKA OCR software. In an embodiment, the controller 14 is configured to generate a text document 72 as illustrated.

Figure 18:
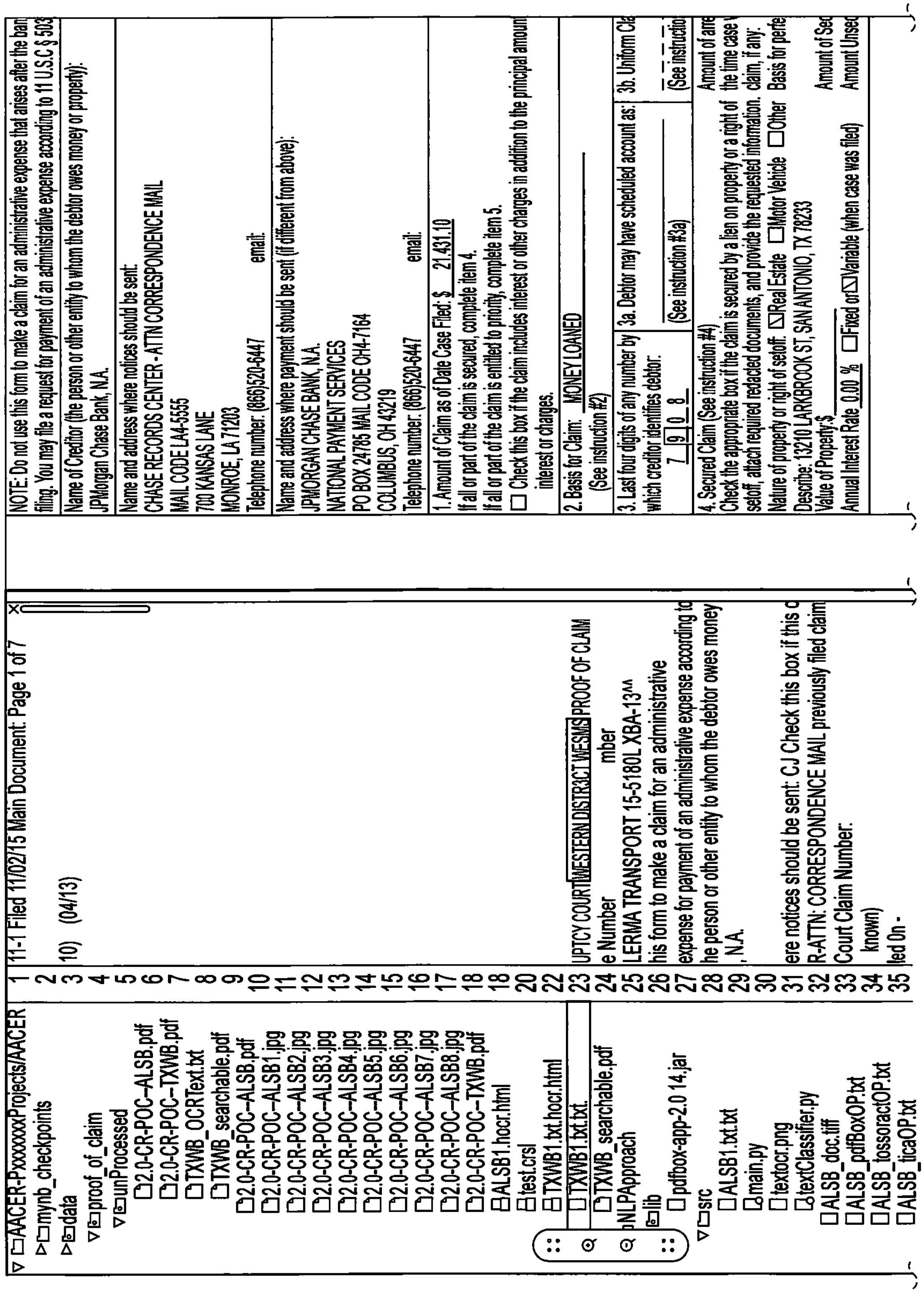
FIG. 18 illustrates an example embodiment of creation of a text-only document which can be performed during the method of FIG. 16.
Figure 18:
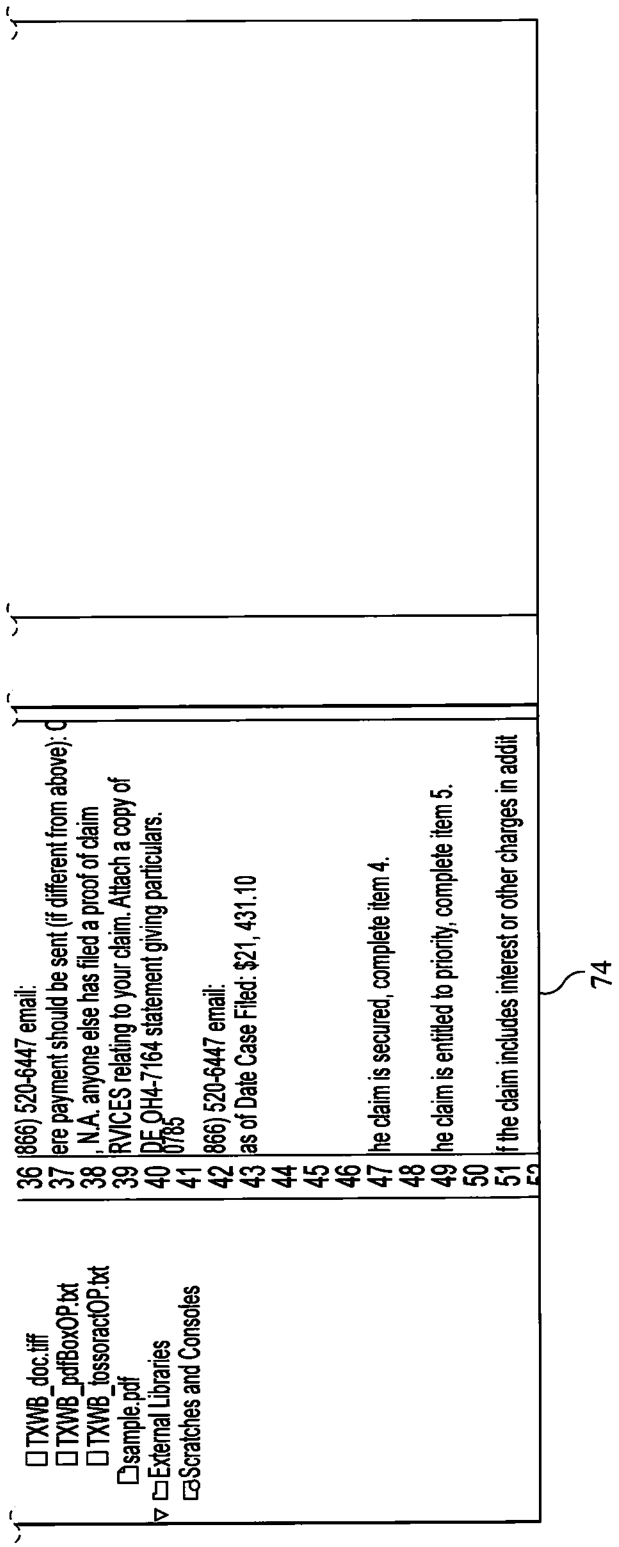

At step 216, the document 30 includes readable text, either because the readable text was present in the original document 30 or because the readable text was added at step 214. The controller 14 is therefore configured to extract all of the text from the document 30, for example, to create a text-only document 74. An example embodiment of step 216 is illustrated by FIG. 18.

Figure 19:
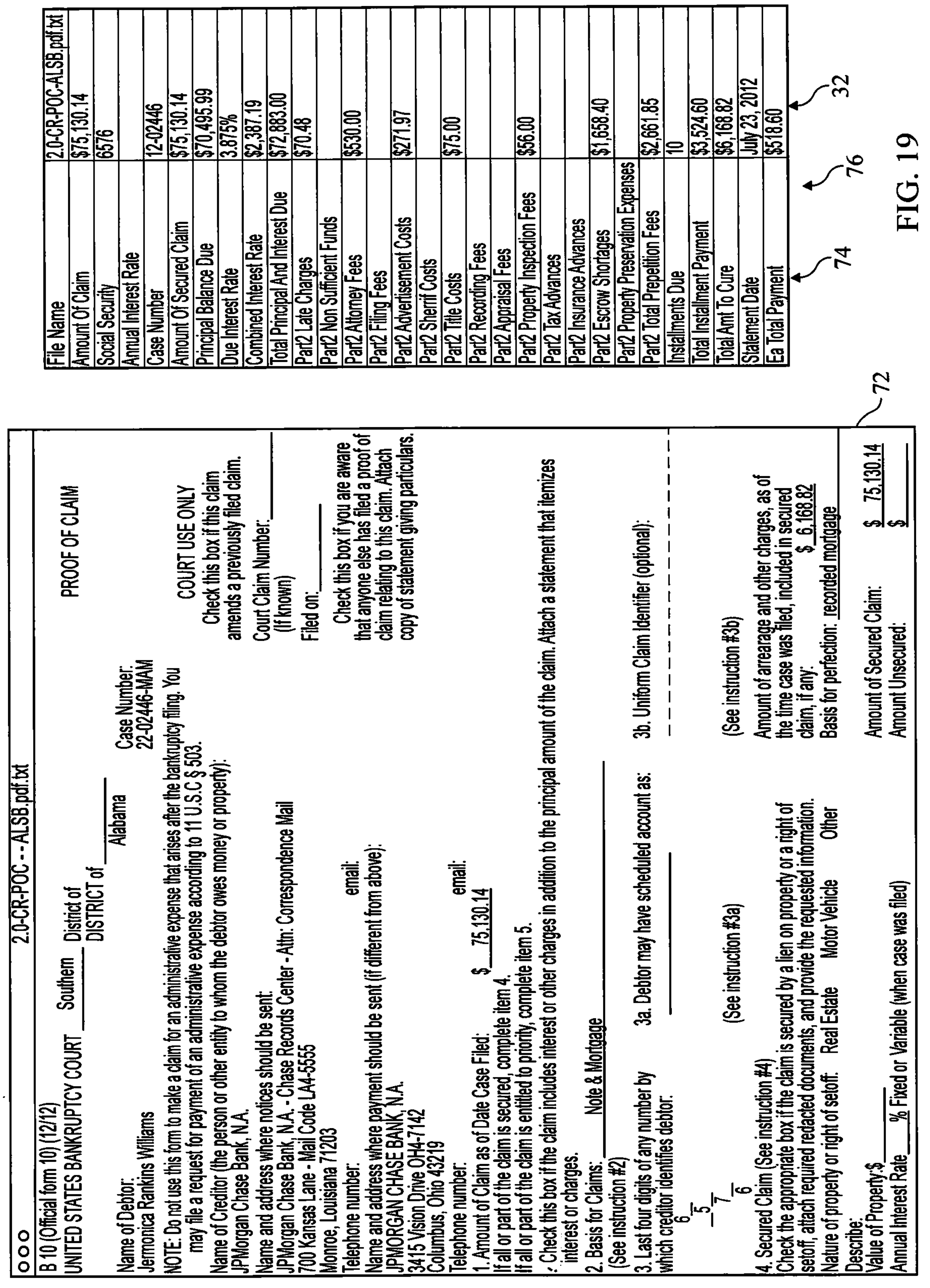
FIG. 19 illustrates an example embodiment of creation of a key-value map which can be performed during the method of FIG. 16.

At step 218, the controller 14 performs a natural language understanding (NLU) process. For example, the controller 14 can be configured to perform a zone-based NLU process. Here, relevant start and end indices can be selected for the section where a required field exists. The field name can be searched, for example, using named entity recognition (NER) on the selected zone. For example, as seen in FIG. 19, a variety of fields 74 and their corresponding target data 32 can be extracted from each document. In FIG. 19, example embodiments of fields 74 include "Amount of Claim," "Social Security," "Annual Interest Rate," "Case Number," "Amount of Secured Claim," "Principal Balance Due," "Due Interest Rate," "Combined interest Due," Total Principal and Interest Due," "Late Charges," "Non-Sufficient Funds," "Attorney Fees," "Filing Fees," Advertisement Costs," Sheriff Costs," Title Costs," "Recording Fees," "Appraisal Fees," "Property Inspection Fees," "Tax Advances," "Insurance Advances," Escrow Shortages," Property Preservation Expenses," Total Prepetition Fees," "Installments Due," "Total Installment Payment," "Total Amt to Cure," "Statement Due," and "Ea Total Payment."

Taking "Amount of Claim" as an example embodiment of a field 74, the controller 14 can be configured to find the words "Amount" and "Claim" between the relevant start and end indices of a selected zone, and can record the corresponding dollar amount. As relevant sections are filtered, accuracy and performance increases. In example embodiments, the NLU process can be performed, for example, using Rasa and/or Spacy software.

In an embodiment, the NLU/NER performed at step 218 can be a fault-tolerant or "fuzzy" search which detects misspellings or alternative spellings. In an embodiment, each category can have different parameters for the fault-tolerant search (e.g., names may require more accuracy than addresses), which can be adjusted by a user using user interface 12.

At step 220, the controller 14 builds a key-value map 76 for one or more required fields 74 being sought from the document. The required fields 74 can include, for example, names, dates, financial amounts, etc., for example, as discussed above. FIG. 19 illustrates an example embodiment of a key value map 76, in which the keys are the fields discussed above at step 218, while the values are the corresponding entries which include names, dates, dollar amounts, identification numbers, etc.

At step 222, the controller 14 determines how many of the required fields 74 were populated at step 220. If none of the required fields 74 were populated, then then the document 30 is moved to a "failed" directory at step 224. In another embodiment, if the number of populated fields 74 is less than a predetermined number, then the document 30 is moved to the "failed" directory at step 224. Likewise, if the number of populated fields 74 is greater than the predetermined number, then the controller 14 at step 226 saves the document 30 to the database D along with the original metadata, and moves the document 30 to a "processed" folder at step 228. At step 230, the documents 30 can further be exported in various forms.

In an embodiment, datasets built from the required fields 74 can then be used to train the extraction algorithm EA as discussed above. For example, controller 14 can be configured to build a label tensor 60 for each of the fields 74 similar to that shown in FIG. 11G. Using that label tensor 60 and the extracted value that corresponds to that label tensor 60, the controller 14 can train the extraction algorithm EA as discussed above. In this embodiment, the field 74 is a label 36 as discussed above.

In an embodiment, the controller 14 can build a region tensor 52 using the extracted value for each required field 74 as described above. For example, knowing the extracted value which corresponds to a field 74 (i.e., label 36), the controller 14 can be configured to build a region tensor 52 around that extracted value as discussed above. The controller 14 can then be configured to use the region tensor 52 and/or the label tensor 60 to train the extraction algorithm EA.

In an embodiment, both method 100 and method 200 can be performed by the system 10 to improve the accuracy of system 10. For example, the system 10 can train a first extraction algorithm EA using method 100 and can train a second extraction algorithm EA using method 200. Then, when extracting new target data 32 from additional documents 30, the system 10 can require correspondence between the target data 32 extracted from a document 30 using the first extraction algorithm EA and the target data 32 extracted from the document 30 using the second extraction algorithm EA. In an embodiment, only when the first and second extraction algorithms EA find the same target data 32 will the system 10 build that target data 32 into a database/spreadsheet and/or present that target data 32 to the user.

As an extraction algorithm EA created using training data from method 100 and/or method 200 extracts target data from additional documents 30, the additional documents 30 can be used to further train the extraction algorithm EA. For example, a user can review the extracted target data 32 which the extraction algorithm EA has pulled from additional documents 30, and can determine whether the extraction algorithm EA has accurately extracted the target data 32. If the extracted target data 32 is accurate, then this target data 32 can be used to further train the extraction algorithm EA as a positive example (e.g., by building tensors as discussed above). If the extracted target data 32 is not accurate, then this target data 32 can be used to further train the extraction algorithm EA as a negative example. Thus, the controller 14 can continuously train the extraction algorithm EA throughout its use. In this way, the extraction algorithm's EA, accuracy and performance increase the more it is applied to various documents 30.

The figures have illustrated the methods discussed herein using mortgage data as the target data 32, but it should be understood from this disclosure that this is an example only and that the systems and methods discussed herein are applicable to a wide variety of target data 32.

The embodiments described herein provide improved systems and methods for enabling target data to be extracted from a plurality of documents 30. By training and/or using an extraction algorithm EA as discussed herein, processing speeds and accuracy can be increased and memory space can be conserved in comparison to other systems which extract data. Further, for business enterprises storing large amounts of legacy data, the systems and methods enable use of the legacy data beyond mere record maintenance. It should be understood that various changes and modifications to the systems and methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for enabling target data to be extracted from documents, the method comprising:

accessing a database including a plurality of documents including target data;

converting each of multiple of the documents into one or more images not readable by a computer;

using the one or more images for each of the multiple of the documents, assigning a label to a target area of a document corresponding to a target category and determining label coordinate data based on coordinates of the labeled target area in a region label extraction step;

using the one or more images for each of the multiple of the documents, creating a region tensor;

using the one or more images for each of the multiple of the documents, performing a text extraction to create extracted text;

for each of the multiple of the documents, adjusting the region tensor based on an identified fixed region surrounding the extracted text of the document including the target data in a region extraction step;

for each of the multiple of the documents, creating a label tensor based on an overlapping region of the label coordinate data from the labeled target area of the target category and text coordinate data related to the extracted text in a label merging step that merges the results of the region label extraction step and the region extraction step; and using the region tensor and the label tensor, training an extraction algorithm to extract the target data from additional documents.

2. The method of claim 1, comprising enabling extraction of the target data from the additional documents using the extraction algorithm.

3. The method of claim 1, wherein at least one of the region tensor and the label tensor includes a data matrix.

4. The method of claim 1, wherein creating the region tensor includes identifying the fixed region surrounding the extracted text and creating the region tensor based on the fixed region.

5. The method of claim 1, wherein creating the label tensor includes converting the target area to the label coordinate data.

6. The method of claim 1, comprising training the extraction algorithm to extract the target data from the additional documents by outputting new label tensors corresponding to the additional documents based on new inputted region tensors corresponding to the additional documents.

7. A memory storing instructions configured to cause a processor to perform the method of claim 1.

8. A method for enabling target data to be extracted from documents, the method comprising:

accessing a database including a plurality of documents including target data;

converting each of multiple of the documents into one or more images not readable by a computer;

using the one or more images for each of the multiple of the documents, assigning a label to a target area of a document in a region label assignment step;

for each of the multiple of the documents, determining first coordinate data based on coordinates of the labeled target area in a region label extraction step;

using the one or more images for each of the multiple of the documents, extracting target text of the document including the target data in a text extraction step;

for each of the multiple of the documents, preparing a region tensor based on an identified fixed region surrounding the target text in a region extraction step;

for each of the multiple of the documents, creating a label tensor based on an overlapping region of the first coordinate data related to the label and second coordinate data related to the extracted target text in a label merging step that merges results of the region label extraction step and the region extraction step; and using the region tensor and the label tensor, training an extraction algorithm to extract the target data from additional documents.

9. The method of claim 8, comprising enabling extraction of the target data from the additional documents using the extraction algorithm.

10. The method of claim 8, wherein the region tensor includes a data matrix.

11. The method of claim 8, comprising creating the region tensor using third coordinate data corresponding to the fixed region.

12. A memory storing instructions configured to cause a processor to perform the method of claim 8.

13. A method for enabling target data to be extracted from documents, the method comprising:

accessing a database including a plurality of documents including target data;

converting each of multiple of the documents into one or more images not readable by a computer;

using the one or more images for each of the multiple of the documents, assigning a label to a target area of a document and converting the target area to first coordinate data in one or more first coordinate steps;

using the one or more images for each of the multiple of the documents, determining second coordinate data for a piece of extracted text of the document in one or more a second coordinate steps;

for each of the multiple of the documents, identifying an overlapping region of the first coordinate data and the second coordinate data to create a label tensor based on the first coordinate data and the second coordinate data in a label merging step that merges results of the one or more first coordinate steps and the one or more second coordinate steps; and using the label tensor, training an extraction algorithm to extract the target data from additional documents.

14. The method of claim 13, comprising enabling extraction of the target data from the additional documents using the extraction algorithm.

15. The method of claim 13, wherein the label tensor includes a data matrix.

16. The method of claim 13, comprising training the extraction algorithm to extract the target data from the additional documents by outputting new label tensors corresponding to the additional documents.

17. A memory storing instructions configured to cause a processor to perform the method of claim 13.

* * * * *